(12) United States Patent
Ikeda et al.

(10) Patent No.: US 6,636,551 B1
(45) Date of Patent: Oct. 21, 2003

(54) ADDITIONAL INFORMATION TRANSMISSION METHOD, ADDITIONAL INFORMATION TRANSMISSION SYSTEM, INFORMATION SIGNAL OUTPUT APPARATUS, INFORMATION SIGNAL PROCESSING APPARATUS, INFORMATION SIGNAL RECORDING APPARATUS AND INFORMATION SIGNAL RECORDING MEDIUM

(75) Inventors: Nozomu Ikeda, Tokyo (JP); Akira Ogino, Tokyo (JP); Takashi Kohashi, Tokyo (JP); Yuji Kimura, Kanagawa (JP); Hisayoshi Moriwaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/431,793

(22) Filed: Nov. 3, 1999

(30) Foreign Application Priority Data

| Nov. 5, 1998 | (JP) | ............................................. 10-314814 |
| Nov. 10, 1998 | (JP) | ............................................. 10-318835 |

(51) Int. Cl.⁷ ........................... H04L 27/04; H04B 1/69; G09C 3/00; G06K 9/36; H04N 7/08
(52) U.S. Cl. ........................ 375/130; 375/133; 375/135; 375/146; 375/296; 380/54; 382/250; 348/473
(58) Field of Search .............................. 375/130, 133, 375/135, 146, 295, 296; 380/54; 382/250; 348/473

(56) References Cited

U.S. PATENT DOCUMENTS

| 5,809,139 | A | * | 9/1998 | Girod et al. .................... 380/5 |
| 5,915,027 | A | * | 6/1999 | Cox et al. ...................... 380/54 |
| 6,154,571 | A | * | 11/2000 | Cox et al. .................... 382/250 |
| 6,332,194 | B1 | * | 12/2001 | Bloom et al. ................ 713/176 |
| 6,342,924 | B1 | * | 1/2002 | Ikeda et al. ................. 348/473 |
| 6,374,036 | B1 | * | 4/2002 | Ryan et al. .................... 386/94 |

FOREIGN PATENT DOCUMENTS

| EP | 0 778 566 | 6/1997 |
| EP | 0 847 025 | 6/1998 |
| EP | 0 855 836 | 7/1998 |
| EP | 0 855 837 | 7/1998 |
| EP | 0 899 948 | 3/1999 |

* cited by examiner

Primary Examiner—Stephen Chin
Assistant Examiner—Sam K. Ahn
(74) Attorney, Agent, or Firm—Frommer Lawrence & Haug LLP; William S. Frommer; Darren M. Simon

(57) ABSTRACT

An additional information transmission method for transmitting an information signal and additional information in the form of an electronic watermark. The electronic watermark information is generated and superimposed on the information signal for transmission so as to form a superimposition/non-superimposition pattern corresponding to first additional information and transmitting second additional information on the information signal such that one value of one-bit information is expressed by a period in which electronic watermark information is superimposed on the information signal and other values of one-bit information are expressed by a period in which the electronic watermark information is not superimposed.

44 Claims, 20 Drawing Sheets

Spectrum of Duplication Control Information Before Spectrum Spread

Spectrum of Duplication Control Information After Spectrum Spread

Spectrum of Information Signal On Which SS Duplication Control Information is Superimposed Signal Spectrum After Spectrum De-Spread

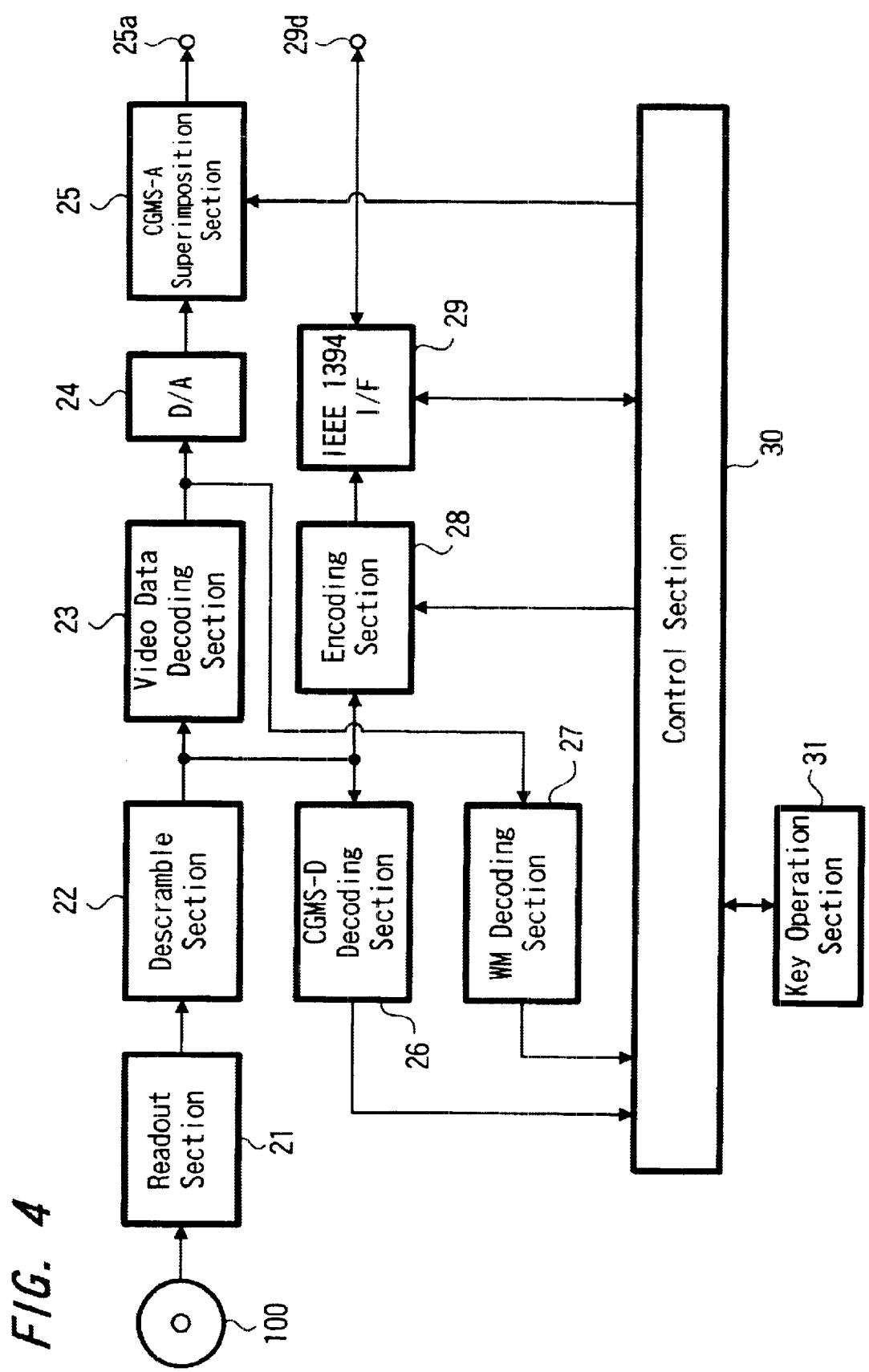

FIG. 10A Never Copy Pattern
FIG. 10B Copy Once Pattern
FIG. 10C No More Copy Pattern
FIG. 10D Copy Free Pattern

ADDITIONAL INFORMATION TRANSMISSION METHOD, ADDITIONAL INFORMATION TRANSMISSION SYSTEM, INFORMATION SIGNAL OUTPUT APPARATUS, INFORMATION SIGNAL PROCESSING APPARATUS, INFORMATION SIGNAL RECORDING APPARATUS AND INFORMATION SIGNAL RECORDING MEDIUM

BACKGROUND OF THE INVENTION

1. Field of the Invention

The present invention relates to an additional information transmission method for transmitting not only an information signal such as a video signal but also additional information on this information signal, an additional information transmission system, an information signal output apparatus used in this system, an information signal processing apparatus, an information signal recording apparatus and an information signal recording medium.

2. Description of the Related Art

Various contents information such as image information or voice information has been abundantly provided through a video tape, a digital video disk (DVD), internet or broadcasting media. On the other hand, the piracy problem due to the illegal duplication (copy) of such various contents information which have been provided through various media is emerging.

To cope with this problem, various measures are taken, which measures include, for example, adding information for duplication control or copyright information to contents information such as image information to prevent illegal duplication of the contents information and tracking parties involved in the illegal duplication of contents information.

There is also proposed a method of superimposing additional information added to the contents information by means of electronic watermark processing. This electronic watermark processing is to embed information as noise into portions which exist on image data or music data and which are not important for human perception, i.e., portions which are not redundant to music and pictures.

The additional information embedded into the image data or music data by means of such electronic watermark processing is difficult to remove from the image data or music data. Even after the image data or music data has been subjected to filtering or data compression processing, the electronic watermark added information (electronic watermark information) embedded thereinto can be extracted from the image data or music data.

By using the electronic watermark processing as stated above, it is possible to superimpose electronic watermark information on contents information so that the information cannot be easily removed or manipulated and to extract the electronic watermark information superimposed on the contents information at, for example, a recording apparatus. Thus, using the electronic watermark information superimposed on the contents information, the illegal duplication of the content information is prevented and the like.

In the meantime, one of the electronic watermark processings is to use a spectrum spread technique. This is intended to spectrum-spread additional information to turn the information into a low level, wide bandwidth signal so that it can be regarded as noise with respect to an information signal of, for example, a video signal, and to superimpose the additional information on the information signal such as a video signal.

The spectrum spreading of additional information is carried out by multiplying the additional information by a spread code which is generated in a sufficiently short cycle. If spectrum-spreading the additional information, the additional information, which is turned into a low level, wide bandwidth signal, can be extracted as an original high level, narrow bandwidth signal by conducting de-spread for multiplying it with the same spread code as that in spectrum spread at the same timing as that of spectrum spread.

Due to this, the following are proposed. If a spectrum spread signal which is spectrum-spread additional information is superimposed on a video signal, a spread code is generated to be synchronous with a vertical synchronizing signal in, for example, a one-frame cycle or two-frame cycle. Using the spread code, the spectrum-spread additional information is superimposed on the video signal.

By doing so, if the spectrum spread signal superimposed on the vide signal is extracted, the spectrum-spread additional information superimposed on the vide signal can be de-spread by generating the same spread code as that during spectrum spread at the same time while using a vertical synchronizing signal as a reference signal. Thus, it is possible to promptly and accurately extract the spectrum-spread additional information superimposed on the video signal.

Further, even if the additional information on the video signal is superimposed on the video signal with a spectrum spread signal and transmitted as stated above, it is considered that a state in which the spectrum-spread signal is superimposed on the video signal or the content of the additional information transmitted by the spectrum spread signal is illegally detected by various methods.

In that case, there is a fear that the removal or manipulation of the spectrum spread signal superimposed on the video signal is easily made based on the illegally detected information. This may possibly occur not only to a case where additional information is superimposed as a spectrum spread signal on a video signal but also to a case where additional information is superimposed as electronic watermark information on various information signals such as a voice signal and computer data and then transmitted.

Due to this, it is desired that the strength of the additional information superimposed as a spectrum spread signal on the information signal such as a video signal, is intensified against illegal attempts to thereby make it possible to surely, accurately provide the other side with the additional information on the video signal together with the video signal.

Further, a demand for superimposing not only information for duplication control (duplication control information) but also further additional information such as copyright information on the transmitted information signal on the information signal and transmitting them. That is, there is a demand for superimposing both duplication control information serving as additional information and further additional information on an information signal and transmitting the both information.

In this case, it is required to make the additional information difficult to remove or manipulate, to ensure providing the information signal to the side supplied with the information signal and to allow the side supplied with the information signal to surely and accurately detect further additional information provided after being superimposed on the information signal.

Nevertheless, it is difficult to ensure transmitting duplication control information and further additional information and to detect these pieces of information separately from each other only by superimposing further additional information in addition to the duplication control information both serving as electronic watermark information on an information signal such as a video signal.

SUMMARY OF THE INVENTION

In view of the above, an object of the present invention is to provide an additional information transmission method for making higher the concealment characteristics of additional information transmitted as electronic watermark information together with an information signal and for surely, accurately transmitting the additional information, an additional information transmission system using this method, an information signal output apparatus used in this system, an information signal processing apparatus, an information signal recording apparatus and an information signal recording medium.

Further, another object of the present invention is to provide an additional information transmission method, an additional information transmission system as well as an information signal output apparatus and an information signal processing apparatus used in the system which can superimpose a plurality of types of additional information on an information signal using electronic watermark information to surely provide the information to a receiving side and which allows the side supplied with the information signal to surely and accurately detect each of the plural additional information superimposed on the information signal.

To solve the above problems, an additional information transmission method recited in claim 1 is characterized in that the method comprises transmitting additional information on an information signal by a superimposition/non-superimposition pattern consisting of a preset combination of a block in which electronic watermark information is superimposed on the information signal and the block in which the electronic watermark information is not superimposed on the information signal.

According to the additional information transmission method recited in claim 1, the additional information on the information signal is transmitted by the superimposition/non-superimposition pattern of the electronic watermark information superimposed on the information signal.

In this way, since the additional information is transmitted while utilizing the superimposition/non-superimposition pattern of the electronic watermark information, the side supplied with the information signal on which the electronic watermark information is superimposed detects the superimposition/non-superimposition pattern of the electronic watermark information superimposed on the information signal, thereby making it possible to surely detect the additional information.

Further, the content of the additional information cannot be known by simply detecting the electronic watermark information. It is required to detect the superimposition/non-superimposition pattern of the electronic watermark information and discriminate additional information corresponding to the superimposition/non-superimposition pattern. Due to this, it is possible to transmit the additional information more surely without the leakage of the additional information during transmission or the like and it is, therefore, possible to enhance the reliability of the additional information.

Moreover, if the additional information superimposed on the information signal is to be removed or manipulated, it is required to remove or manipulate the entire superimposition/non-superimposition of the electronic watermark information. This can make it more difficult to remove or manipulate the additional information superimposed on the information signal. Also, the additional information superimposed on the information signal cannot be completely removed or manipulated only by removing or manipulating part of the superimposition/non-superimposition pattern of the electronic watermark information. Thus, the strength of the additional information superimposed on the information signal can be intensified and the reliability of the additional information can be thereby enhanced.

Further, an additional information transmission method recited in claim 2 is the additional information transmission method according to claim 1 and characterized in that a plurality of the superimposition/non-superimposition patterns are set to correspond to a plurality of additional information, respectively; and the method comprises detecting a superimposition/non-superimposition pattern of the electronic watermark information superimposed on the information signal transmitted, and discriminating corresponding additional information from among the plurality of additional information based on the superimposition/non-superimposition pattern.

According to the additional information transmission method recited in claim 2, there are a plurality of additional information on the information signal to be transmitted together with the information signal and a plurality of superimposition/non-superimposition patterns corresponding to the plural additional information are preset. Then, based on the superimposition/non-superimposition patterns of the additional information transmitted together with the information signal, the electronic watermark information is superimposed on the information signal.

By doing so, it is possible to surely transmit all of the plurality of additional information on the information signal by the superimposition/non-superimposition patters of the plural electronic watermark information.

Also, an additional information transmission method recited in claim 3 is the additional information transmission method according to claim 1 or 2, and is characterized in that the information signal is a video signal, the block in which the electronic watermark information is superimposed or not superimposed is set as a block synchronous with a video synchronizing signal, and the electronic watermark information is a spectrum spread signal formed by using a spread code generated synchronously with the video synchronizing signal.

According to the additional information transmission method recited in claim 3, the spectrum spread signal serving as electronic watermark information is formed by using the spread code generated synchronously with the video synchronizing signal, the block in which the spectrum spread signal is superimposed or not superimposed is set as a block synchronous with the video synchronizing signal such as one block consisting of one frame or one block consisting of two frames.

This makes it possible to transmit the additional information by superimposing it on the information signal by the superimposition/non-superimposition pattern of the electronic watermark information. The side supplied with the video signal on which the additional information is superimposed generates a de-spread spread code using the video synchronizing signal of the supplied video signal as a reference signal, thereby making it possible to promptly and accurately detect the superimposition/non-superimposition pattern of the spectrum spread signal superimposed on the video signal and to promptly and accurately detect the additional information corresponding to the superimposition/non-superimposition pattern.

In addition, an additional information transmission method recited in claim 4 is the additional information transmission method according to claim 1, and is characterized in that synchronism detection electronic watermark information for detecting a superimposition/non-superimposition pattern of the electronic watermark information superimposed on the information signal, is superimposed on the information signal between one the superimposition/non-superimposition pattern and another the superimposition/non-superimposition pattern or in the forefront of the superimposition/non-superimposition pattern.

According to the additional information transmission method recited in claim 4, it is possible to surely match synchronism when detecting the superimposition/non-superimposition pattern of the electronic watermark information by detecting synchronism detection electronic watermark information.

For example, even if the superimposition/non-superimposition pattern of electronic watermark information is superimposed on an information signal, such as a voice signal or computer data transmitted between computers, which does not have a synchronizing signal unlike a video signal, it is possible to ensure detecting the superimposition/non-superimposition pattern of the electronic watermark information and ensure discriminating the additional information corresponding to the superimposition/non-superimposition pattern.

Moreover, an additional information transmission method recited in claim 5 is the additional information transmission method according to claim 4, and is characterized in that the electronic watermark information for forming the superimposition/non-superimposition pattern and the synchronism detection electronic watermark information are spectrum spread signals formed by using different spread codes.

According to the additional information transmission method recited in claim 5, the electronic watermark information for forming a superimposition/non-superimposition pattern and the synchronism detection electronic watermark information are formed by using different spread codes. Due to this, it is possible to surely detect both of the information without taking one for another.

As a result, it is possible to surely transmit the additional information by the superimposition/non-superimposition pattern of the electronic watermark information to the other side and to cause the other side to detect synchronism detection electronic watermark information and to thereby match synchronizing timing, surely and accurately detect the superimposition/non-superimposition pattern of the electronic watermark information and discriminate the additional information superimposed on the transmitted information signal.

Furthermore, an additional information transmission method recited in claim 6 is the additional information transmission method according to claim 1 or 2, and is characterized in that the electronic watermark information for forming the superimposition/non-superimposition pattern and synchronism detection electronic watermark information for detecting the superimposition/non-superimposition pattern of the electronic watermark information superimposed on the information signal are formed for the information signal by using different spread codes and are superimposed on the information signal in the same time range of the information signal.

According to the additional information transmission method recited in claim 6, the electronic watermark information for forming a superimposition/non-superimposition pattern and the synchronism detection electronic watermark information are formed by using different spread codes. owing to this, even if the both information are superimposed on the information signal in the same time range, they can be surely detected, individually.

As a result, by surely transmitting the additional information by the superimposition/non-superimposition pattern of the electronic watermark information to the other side and causing the other side to detect the synchronism detection electronic watermark information, it is possible to match synchronizing timing, to surely and accurately detect the superimposition/non-superimposition pattern of the electronic watermark information and to discriminate the additional information superimposed on the transmitted information signal.

It is noted that it is also possible to transmit additional information by the reversal/non-reversal pattern of the electronic watermark information between the block in which the electronic watermark information is superimposed as it is and that in which the electronic watermark information is superimposed with its phase reversed instead of transmitting the additional information by the superimposition/non-superimposition pattern of the electronic watermark information.

In this way, if a block in which the electronic watermark information is superimposed on the video signal as it is and a block in which the electronic watermark information is superimposed with its phase reversed are generated, it is possible to make the difference in the level of the electronic watermark information larger between the block in which the electronic watermark information is superimposed as it is and that in which the electronic watermark information is superimposed with its phase reversed.

Thus, it is possible to decrease the influence of the information signal on the electronic watermark information superimposed on the information signal and to thereby surely transmit and detect the electronic watermark information. Besides, in that case, the block in which the electronic watermark information is not superimposed is not used, so that it is possible to intensify the strength of the electronic watermark information against illegal attempts such as the removal or manipulation of the electronic watermark information.

BRIEF DESCRIPTION OF THE DRAWINGS

FIG. 4 is a block diagram for describing a video signal reproduction apparatus to which one embodiment of an information signal processing apparatus according to the present invention is applied;

DESCRIPTION OF THE PREFERRED EMBODIMENTS

Figure 1:
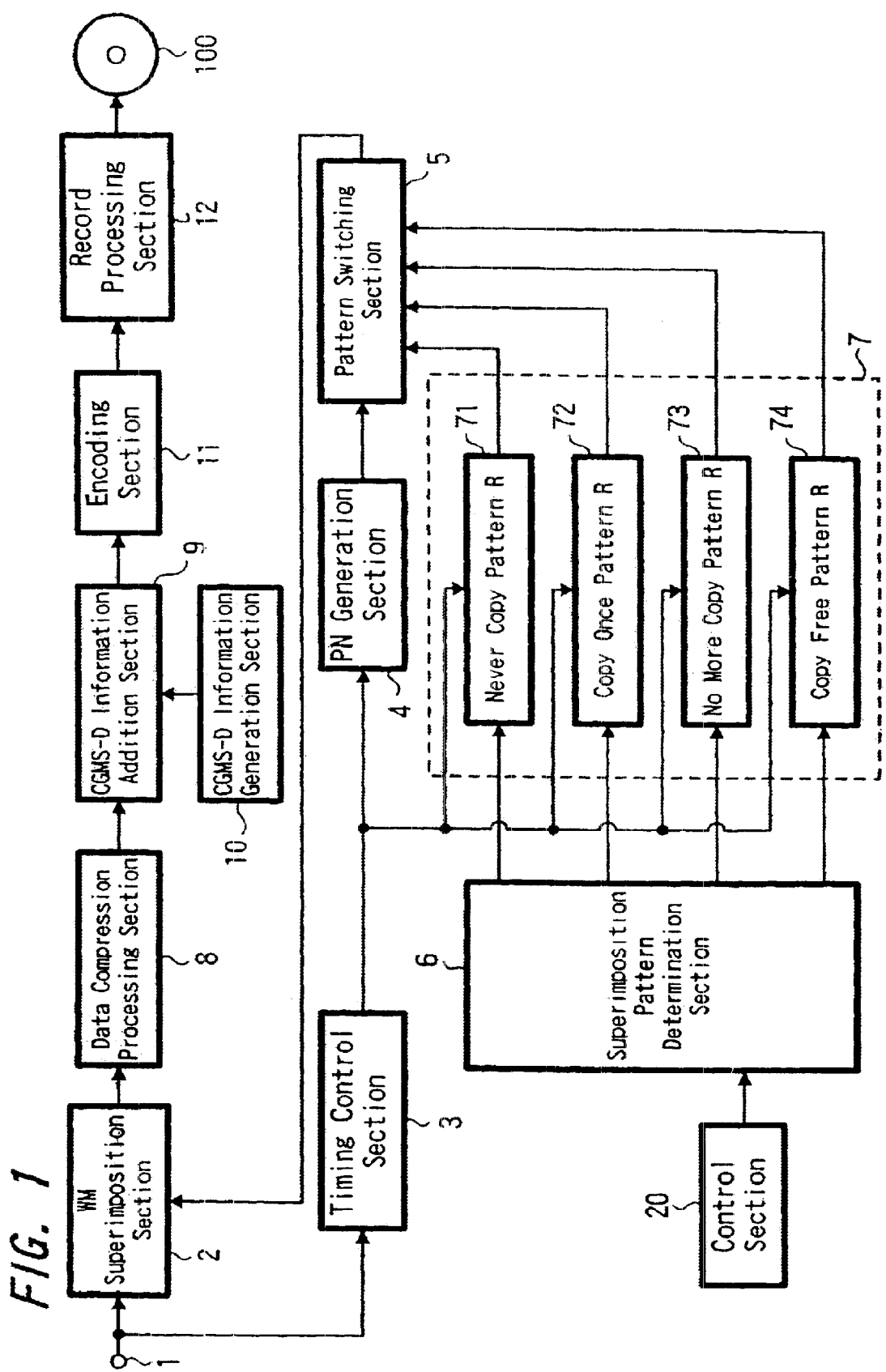
FIG. 1 is a block diagram for describing a video signal recording apparatus (authoring apparatus) to which one embodiment of an information signal output apparatus according to the present invention is applied.

Now, description will be given to one embodiment of an additional information transmission method, an additional information transmission system employing this method, an information signal output apparatus used in this system, an information signal processing apparatus, an information signal recording apparatus and an information signal recording medium according to the present invention, with reference to the drawings.

In the embodiments to be described hereinafter, description will be given while assuming that an information signal output apparatus according to the present invention is applied to a video signal recording apparatus (authoring apparatus) used by a contents information provider recording contents information such as a video signal on a digital video disk (to be referred to as "DVD" hereinafter) and providing the information. The authoring apparatus in the embodiment to be described later, therefore, creates, as an information signal recording medium according to the present invention, a DVD on which a video signal is recorded.

In addition, description will be given while assuming that an information signal processing apparatus according to the present invention is applied to a video signal reproduction apparatus (reproduction apparatus for a DVD) for reproducing a video signal from the DVD on which the video signal is recorded by the video signal recording apparatus and that an information signal recording apparatus according to the present invention is applied to a DVD recording apparatus for consumers, supplied with the video signal reproduced by the DVD reproduction apparatus, for recording the video signal on the DVD (RAM disk).

Furthermore, in the embodiment described hereinafter, the authoring apparatus in designed to superimpose duplication control information (additional information), if a video signal is recorded on the DVD, for preventing the recorded video signal from being illegally duplicated as electronic watermark information on the video signal.

The video signal recording apparatus is intended to superimpose duplication control information (first additional information) on a video signal to prevent a recorded video signal from being illegally duplicated if the video signal is recorded on the DVD, to superimpose further additional information (second additional information) such as copyright information as electronic watermark information at the request of the copyright owner of the video signal and to transmit the superimposed information together with the video signal.

In this case, the electronic watermark information is a spectrum signal formed by using a spread code. This spectrum spread signal is formed by using a PN (Pseudo Random Noise) series code (to be referred to as "PN code" hereinafter) generated synchronously with a vertical synchronizing signal in the embodiments to be described hereinafter.

As will be described later in detail, a spectrum spread signal for transmitting duplication control information is superimposed on the video signal so as to generate blocks in which the spectrum spread signal is superimposed on the video signal and those in which the spectrum spread signal is not superimposed thereon or to generate superimposition blocks in which the spectrum spread signal is superimposed without changing its phase and blocks in which the spectrum spread signal is superimposed with its phase reversed.

The superimposition/non-superimposition pattern of this spectrum spread signal or the reversal/non-reversal pattern of the spectrum spread signal notifies a duplication control state in which the duplication of the video signal on which the spectrum spread signal is superimposed is prohibited, permitted once, prohibited any more or permitted freely.

That is, the duplication control information is transmitted by superimposing a spread signal in a preset superimposition/non-superimposition pattern or reversal/ non-reversal pattern on a video signal. An apparatus supplied with this video signal discriminates the superimposition/non-superimposition pattern or reversal/non-reversal pattern of the spectrum spread signal superimposed on the video signal, whereby the apparatus can detect the duplication control information superimposed on the video signal, control the output of the reproduced video signal using the detected duplication control information and control the recording of the video signal on a recording medium.

Moreover, further additional information as the second additional information is superimposed by superimposing a spectrum spread signal on the video signal so as to generate blocks in which the spectrum signal is superimposed on the video signal and those in which the spectrum spread signal is not superimposed thereon or to generate blocks in which the spectrum spread signal is superimposed on the video signal without changing its phase and those in which spectrum spread signal is superimposed thereon with its phase reversed.

In this case, the blocks in which the spectrum spread signal is superimposed on the video signal and those in which the spectrum spread signal is not superimposed thereon, or the blocks in which the spectrum spread signal is superimposed thereon as it is and those in which the spectrum spread signal is superimposed thereon with its phase reversed are designed to represent one-bit information, respectively, to thereby allow transmitting further additional information of a plurality of bits.

An authoring apparatus, a DVD reproduction apparatus and a DVD recording apparatus in the embodiments to be described later can record or reproduce a voice signal besides a video signal. For making description simple, a voice system will not be described hereinafter. In addition, in the following embodiments, a recording apparatus and a reproduction apparatus capable of conducting duplication generation limitation processing based on duplication control information serving as additional information added to the video signal is referred to as compliant apparatuses and those does not comply with the duplication generation limitation processing are referred to as non-compliant apparatuses.

[Video Signal Recording Apparatus (Authoring Apparatus)]

FIG. 1 is a block diagram for describing an authoring apparatus in this embodiment. As shown in FIG. 1, the authoring apparatus in this embodiment comprises a video signal input terminal 1, an electronic watermark information superimposition section (to be referred to as "WM superimposition section" hereinafter) 2, a timing control section 3, a PN generation section 4, a pattern switching section 5, a superimposition pattern determination section 6, a superimposition pattern generation section 7, a data compression processing section 8, a CGMS-D information addition section 9, a CGMS-D information generation section 10, an encoding section 11 and a record processing section 12.

In the authoring apparatus shown in FIG. 1, a video signal to be recorded on a DVD 100 is supplied to the WM superimposition section 2 and the timing control section 3 through the input terminal 1. The WM superimposition section 2 is designed to, as will be described later, superimpose a spectrum spread signal for transmitting duplication control information in a preset superimposition/non-superimposition pattern on the video signal which has been inputted through the input terminal 1.

The timing control section 3 comprises a synchronism detection circuit and a PLL circuit, and detects a vertical synchronizing timing signal V and a horizontal synchronizing timing signal H from the supplied video signal. Using the detected vertical synchronizing timing signal V and the horizontal synchronizing timing signal H as reference signals, the timing control section 3 generates various timing signals such as a PN code reset timing signal RE indicating timing at which the generation of a PN code starts (to be referred to as "reset signal RE" hereinafter), a PN generation enable signal EN indicating a block in which the PN code is generated (to be referred to as "enable signal EN" hereinafter), a block signal KS indicating a block in which the spectrum spread signal is superimposed and that in which the spectrum spread signal is not superimposed, i.e., a block (unit block) in which the spectrum spread signal is superimposed or not superimposed and a PN clock signal PNCLK.

In this embodiment, the reset signal is designed to generate a PN code string from its leading portion for each frame, and the enable signal EN is designed to turn the PN generation section 4 into a state in which a PN code can be generated (enable state) in any frame. The block signal KS is designed to set a block for each frame at a superimposition/non-superimposition block of a PN code string PS as a spectrum spread signal.

In this embodiment, the reset signal RE, the enable signal EN and PN clock signal PNCLK generated by the timing control section 3 are supplied to the PN generation section 4, and the block signal KS is supplied to the superimposition pattern generation section 7.

The PN generation section 4 generates an M-series PN code string PS based on the enable signal EN, the PN clock signal PNCLK and the reset signal RE, comprises a plurality of stages of shift registers which are not shown and is constituted by several exclusive OR circuits which operate the appropriate tap output of the shift registers.

The PN generation section 4 is turned into an enable state by the enable signal EN and generates a PN code by one chip for each clock of the clock signal PNCLK, thereby generating a PN code string PS having a preset code pattern reset in a one vertical cycle and supplying the PN code string PS to the pattern switching section 5.

The PN code string PS thus obtained from the PN generation section 4 is used as a spectrum spread signal for transmitting duplication control information. As stated above, the duplication control information is transmitted by the superimposition/non-superimposition pattern of the spectrum spread signal consisting of blocks in which the spectrum spread signal is superimposed and those in which the spectrum spread signal is not superimposed.

Due to this, the pattern switching section 5 is supplied with pattern information for determining the superimposition/non-superimposition pattern of the PN code string PS (to be referred to as "attribute pattern" hereinafter) from the superimposition pattern generation section 7. Then, based on the attribute pattern, the superimposition/non-superimposition of the PN code string PS1 is switched.

In this embodiment, attribute patterns corresponding to four duplication control states, i.e., 1. Never Copy, 2. Copy Once (one generation), 3. No More Copy and 4. Copy Free, respectively are preset.

That is to say, if the superimposition of the spectrum spread signal and the non-superimposition thereof are represented by "1" and "0", respectively, the attribute patterns corresponding to the above-stated four duplication control states are preset as follows.

In this embodiment, the attribute pattern indicating Never Copy is "10011100", that indicating Copy Once is "11011000", that indicating No More Copy is "11100111" and that indicating Copy Free is "11110011".

As shown in FIG. 1, the superimposition pattern generation section 7 comprises a Never Copy pattern register 71, a Copy Once pattern register 72, a No More Copy pattern register 73 and a Copy Free pattern register 74. Each of these pattern registers 71 to 74 holds eight-bit information corresponding to the above-stated preset attribute pattern in advance.

Each of the pattern registers 71 to 74 of the superimposition pattern generation section 7 generates an attribute pattern in which one frame is a block (unit block) of the superimposition/non-superimposition of the PN code string PS and eight frames are a repetition cycle, based on the eight-bit information corresponding to the attribute pattern which the register itself holds and the block signal KS supplied from the timing control section 3.

In this embodiment, therefore, one duplication control state is expressed by an eight-frame superimposition/non-superimposition pattern formed by the superimposition/non-superimposition of the PN code string of each of the frames constituting consecutive eight frames. In other words, if the block (unit block) of the superimposition/non-superimposition of the PN code string consists of one frame and the repetition cycle of an attribute pattern is an eight-frame cycle, one-bit information is expressed by one frame (one unit frame) of the video signal and one duplication control state is expressed by eight-bit information indicated by consecutive eight frames (eight unit blocks).

Figure 2:
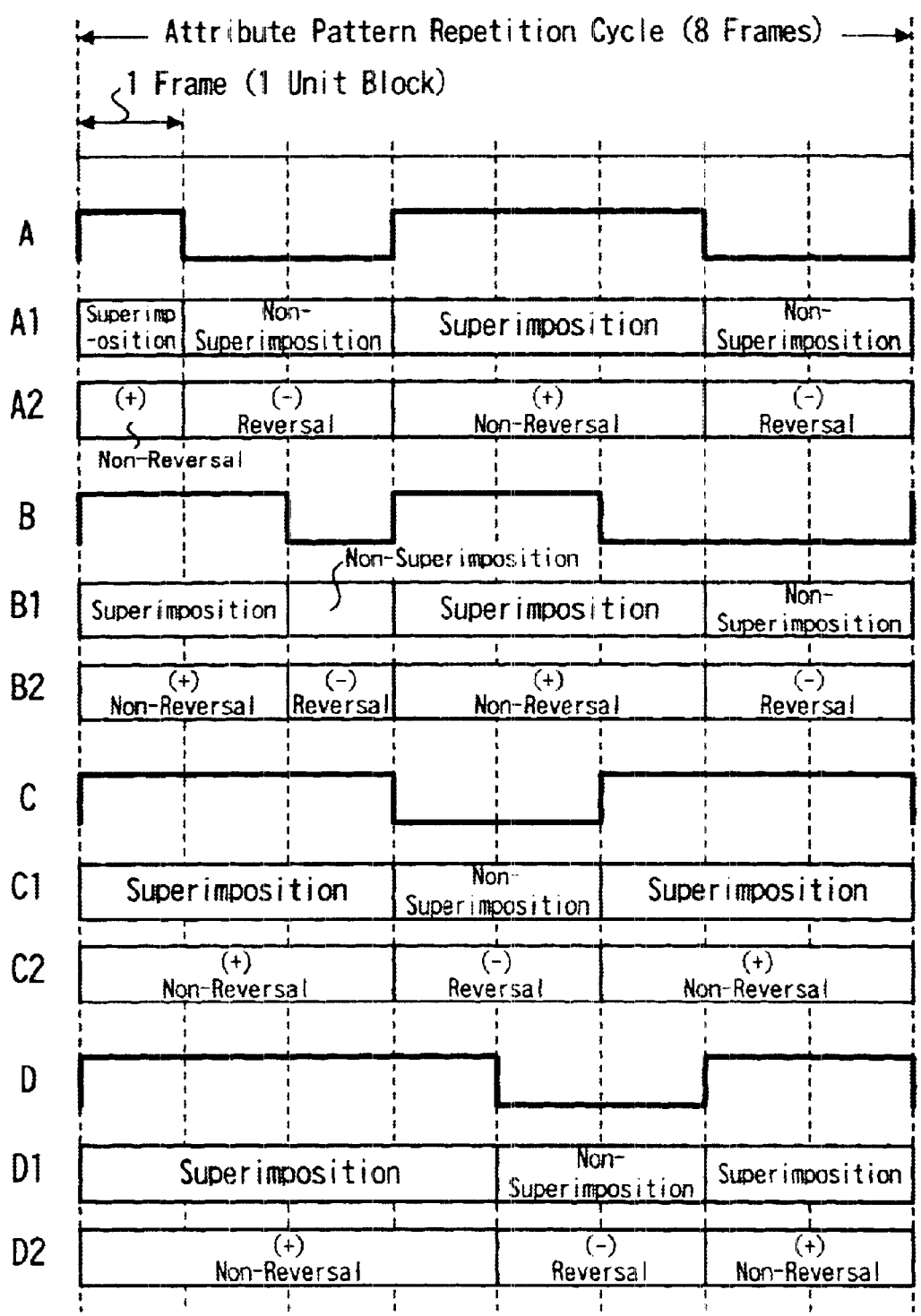
FIG. 2 is a view for describing attribute patterns for transmitting additional information.

FIG. 2 is a view for describing an example of attribute patterns generated in the registers 71 to 74 of the superimposition pattern generation section 7, respectively. Each of the pattern registers 71 to 74 of the superimposition pattern generation section 7 generates an attribute pattern based on the eight-bit information corresponding to the attribute pattern which the register holds itself and the block signal KS, as will be described hereinafter.

The Never Copy pattern register 71 generates an attribute pattern for indicating that the reproduction of a video signal is prohibited in which the first one unit block (one frame) is a high level, the next two unit blocks (two frames) are a low level, the next three unit blocks (three frames) are a high level and the last two unit blocks (two frames) are a low level, as shown in FIG. 2A.

Likewise, the No More Copy pattern register 72 generates an attribute pattern for indicating that the reproduction of a video signal is permitted once in which the first two unit blocks (two frames) are a high level, the next one unit block (one frame) is a low level, the next two unit blocks (two frames) are a high level and the last three unit blocks (three frames) are a low level, as shown in FIG. 2B.

Also, the No More Copy pattern register 73 generates an attribute pattern for indicating that the reproduction of a video signal is not permitted any more in which the first three unit blocks (three frame) are a high level, the next two unit blocks (two frames) are a low level and the last three unit blocks (three frames) are a low level, as shown in FIG. 2C.

Further, the Copy Free pattern register 74 generates an attribute pattern for indicating that the reproduction of a video signal is freely permitted in which the first four unit blocks (four frames) are a high level, the next two unit blocks (two frames) are a low level and the last two unit blocks (two frames) are a low level, as shown in FIG. 2D.

In this way, the pattern registers 71 to 74 of the superimposition pattern generation section 7 can generate attribute patterns preset in accordance with duplication control information, as additional information superimposed on the video signal, for notifying duplication control states, respectively.

The superimposition pattern determination section 6 controls an attribute pattern from which register among the four registers of the superimposition pattern generation section 7 is to be used. The superimposition pattern determination section 6 is controlled by a control section 20.

That is to say, the control section 20, which is a microcomputer comprising a CPU, a ROM, a RAM and the like, controls the respective sections of this authoring apparatus in accordance with indication input information inputted from the user of the authoring apparatus. Owing to this, if the duplication control state of a video signal to be recorded on the DVD 100 is indicated by the user of this authoring apparatus through, for example, a key operating section, which is not shown, of the authoring apparatus, then the control section 20 supplies a signal indicating that a register which generates an attribute pattern in accordance with the indication input from the user should be selected, to the superimposition pattern determination section 6.

The superimposition determination section 6 selects a register which generates an attribute pattern for notifying a duplication control state in accordance with the user's indication based on the signal from the control section 20, and supplies a generation instruction signal instructing the selected register to generate the attribute pattern.

Then, the pattern register supplied with the generation instruction signal from the superimposition pattern determination section 6 among the four registers 71 to 74 of the superimposition pattern generation section 7 generates an attribute pattern with one unit block consisting of one frame and with a repetition cycle set at an eight-frame cycle based on the eight-bit information corresponding to the attribute pattern which the register holds itself and on the block signal KS from the timing control section 3, and supplies the generated attribute pattern to the pattern switching section 5.

The pattern switching section 5 switches the superimposition/non-superimposition of the PN code string PS from the PN generation section 4 based on the supplied attribute pattern. Namely, the pattern switching section 5 outputs a PN code string in a unit block in which the attribute pattern from the superimposition pattern generation section 7 is a high level, and does not output a PN code string in a unit block in which the attribute pattern is a low level.

As can be seen from the above, the pattern switching section 5 supplies the PN code string PS from the PN generation section 4 to generate a superimposition block and non-superimposition block based on the attribute pattern from the superimposition generation section 7, to the WM superimposition section 2.

The WM superimposition section 2 superimposes the PN code string PS switched to be superimposed or not superimposed, as a spectrum spread signal, to the video signal supplied through the input terminal 1.

As already stated above, the pattern switching section 5 outputs a PN code string only in blocks in which the attribute pattern is a high level. Due to this, if the attribute pattern supplied to the pattern switching section 5 is one shown in FIG. 2A (Never Copy pattern) from the Never Copy pattern register 71, the PN code string PS is superimposed on the video signal in a superimposition/non-superimposition pattern indicated by a pattern A1 in FIG. 2.

Likewise, if the attribute pattern is one shown in FIG. 2B (Copy Once pattern) from the Copy Once pattern register, the PN code string PS1 is superimposed on the video signal in a superimposition/non-superimposition pattern indicated by a pattern B1 in FIG. 2.

Also, if the attribute pattern is one shown in FIG. 2C (No More Copy pattern) from the No More Copy pattern register 73, the PN code string PS is superimposed on the video signal in a superimposition/non-superimposition pattern indicated by a pattern C1 in FIG. 2. If the attribute pattern is one shown in FIG. 2D (Copy Free pattern) from the Copy Free pattern register, the PN code string PS1 is superimposed on the video signal in a superimposition/non-superimposition pattern indicated by a pattern D1 in FIG. 2.

In this case, the superimposition level of the PN code string PS supplied to the WM superimposition section 2 is adjusted so as not to deteriorate the video signal on which the PN code string PS is superimposed. In this embodiment, the superimposition level of the PN code string is adjusted such that the PN code string PS is superimposed at a lower level than that of the dynamic range of the video signal. Then, the video signal on which the PN code string PS as a spectrum spread signal is superimposed in a superimposition/non-superimposition pattern (attribute pattern) predetermined according to the selected duplication control state by the WM superimposition section 2, is supplied to the data compression processing section 8.

The data compression processing section 8 conducts data compression of MPEG system to the video signal supplied thereto. In this embodiment, in order to add duplication control information of CGMS (Copy Generation Management System) to the data-compressed video signal, the data-compressed video signal is supplied to the CGMS-D information addition section 9.

In the CGMS system, if the video signal is, for example, an analog video signal, two-bit additional information for duplication control (to be referred to as "CGMS-A information" hereinafter) is superimposed on a specific one horizontal block within the vertical blanking period of the video signal, and if the video signal is a digital image signal, two-bit additional information for duplication control (to be referred to as "CGMS-D information" hereinafter) is added to the digital image data and then transmitted.

The CGMS-D information addition section 9 adds the CGMS-D information supplied from the CGMS-D generation section 10 to the data-compressed digital video signal. The CGMS-D information generation section 10 generates CGMS-D information added to the video signal to be transmitted, based on the control signal from the control section 20. The CGMS-D information generated by the CGMS information generation section 10 signifies one of "Copy [00]", "Copy Once [10]" and "Never Copy [11]".

The video signal to which the CGMS-D information is added by the CGMS-D information addition section 9 is supplied to the encoding section 11. In this embodiment, the encoding section 11 conducts encoding processing of CSS (Contents Scramble System) system to the video signal. The encoding processing of the CSS system is a system conducted to an information signal if the information signal such as a video signal is recorded on and provided to a disk medium such as a DVD.

The video signal which has been subjected to encoding processing by the encoding section 11 is supplied to the record processing section 12. The record processing section 12 conducts adjustment processing or the like to the supplied video signal so as to record the video signal on the DVD 100 and records the video signal on the DVD 100.

By doing so, the video signal on which the PN code string PS as a spectrum spread signal is superimposed so as to generate superimposition blocks and non-superimposition blocks, is recorded on the DVD 100 and is supplied to the used with this DVD 100 as a transmission medium. In this case, the duplication control information notifying a duplication control state is transmitted by a superimposition/non-superimposition pattern in accordance with the attribute pattern of the PN code string PS superimposed on the video signal recorded on the disk 100.

In this case, even if the PN code string PS1 serving as a spectrum spread signal is superimposed on the video signal, the video signal is not deteriorated. Further, the spectrum spread signal superimposed on the video signal is difficult to remove or manipulate. Due to this, it is possible to ensure supplying the spectrum spread signal together with the information signal such as a video signal to the recording apparatus or the reproducing apparatus, and it is possible for the apparatus supplied with the signal to detect the spectrum spread signal to thereby ensure, for example, duplication control or reproduction control.

FIG. 3 shows the relationship between the duplication control information superimposed as spectrum spread signals on the video signal and the video signal in the form of spectrums. For example, the duplication control information indicates Never Copy, Copy Once (One Generation), No More Copy or Copy Free as stated above. The information is small in amount and is a low-bit rate, narrow-bandwidth signal as shown in FIG. 3(a).

Figure 3A:
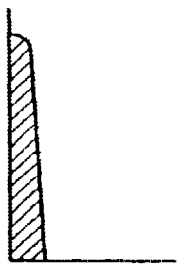
FIG. 3 is a view for describing the relationship among an information signal, duplication control information and spectrum-spread duplication control information (spectrum spread signal)
Figure 3B:
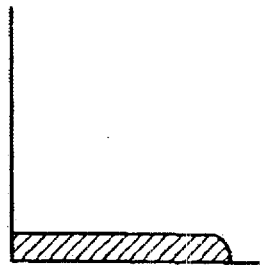

If the duplication control information is subjected to spectrum-spread, that is, the duplication control information is spectrum-spread using a PN code string generated in a sufficiently short cycle to thereby form a spectrum spread signal, or if the PN code string is used as a spectrum spread signal per se as stated above to indicate a duplication control state according to the superimposition/non-superimposition pattern of the PN code string, then the duplication control information turns into a signal in wide bandwidth as shown in FIG. 3(b). At this moment, the spectrum spread signal level becomes smaller in an inversely proportional manner to the increase rate of the bandwidth.

Figure 3C:
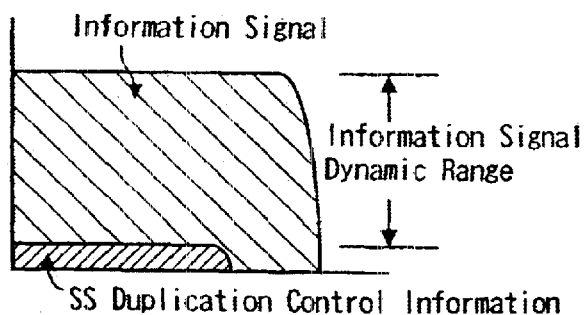

The spectrum spread signal is superimposed on the video signal by the WM superimposition section 2. In this case, as shown in FIG. 3(c), the spectrum spread signal is superimposed thereon at a lower level than that of the dynamic range of the video signal serving as an information signal. This makes it possible to hardly cause the deterioration of the main information signal. Therefore, as stated above, the video signal on which the spectrum spread signal is superimposed, is supplied to a monitor receiver. If the video signal is reproduced, a good reproduction picture can be obtained with less influence of the spectrum spread signal.

Figure 3D:
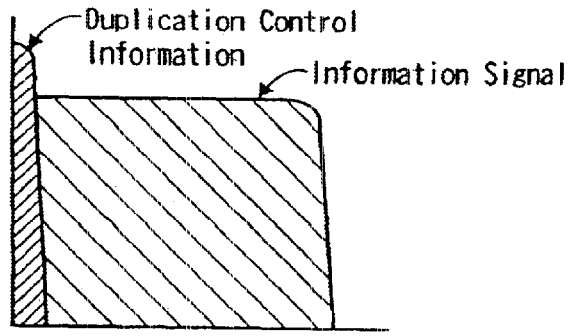

Meanwhile, as will be described later, if inverse spectrum spread (de-spread) is conducted to detect a spectrum spread signal, the spectrum spread signal is reproduced as a signal in a narrow bandwidth as shown in FIG. 3(d). By applying a sufficient bandwidth spread rate, the power of the duplication control information after being de-spread exceeds that of the information signal and can be detected.

Further, as stated above, if the PN code strings are used as spectrum spread signals per se, the duplication control state is expressed according to the superimposition/non-superimposition pattern of the PN code string and the de-spread is conducted, then the portions on which the spectrum spread signals are superimposed have high level of the output obtained as a result of de-spread, so that the blocks in which the spectrum spread signals are superimposed on the video signal can be discriminated from those in which the spectrum spread signals are not superimposed thereon.

In this case, since the spectrum spread signals superimposed on the video signal are superimposed at the same time with the same frequency, it is impossible to remove or correct the spectrum spread signals by using a frequency filter or simply by replacing information.

Thus, the spectrum spread signals superimposed on the video signal are not removed and difficult to manipulate, so that it is possible to ensure transmitting the duplication control information and the further additional information together with the video signal.

Moreover, since the authoring apparatus in this embodiment conducts spectrum spread using a PN code string in a one-frame cycle with a vertical synchronizing signal used as a reference signal, use of the vertical synchronizing signal as a reference signal allows a PN code string for de-spread to be generated for the video signal at the same timing as that of the spectrum spread and the spectrum spread signal can be, therefore, promptly extracted.

Furthermore, as already stated above, the authoring apparatus in this embodiment employs a PN code string PS as a spectrum spread signal and notifies a duplication control state by a superimposition/non-superimposition pattern in accordance with the attribute pattern of the PN code string. As stated above, attribute patterns for determining superimposition/non-superimposition patterns of the PN code string are preset in accordance with four duplication control states, respectively.

Owing to this, as will be described later, a reproduction apparatus for reproducing the DVD on which the video signal is recorded by this authoring apparatus detects the superimposition/non-superimposition pattern of the PN code string superimposed on the video signal and discriminates which duplication control state the superimposition/non-superimposition pattern corresponds to, whereby the reproduction apparatus can determine the duplication control state of the video signal is Never Copy, Copy Once, No More Copy or Copy Free.

In this case, the duplication control information can be transmitted by the superimposition/non-superimposition pattern of the PN code string PS. Thus, the meaning of the information transmitted by the spectrum spread signal or, in this embodiment, duplication control information for notifying a duplication control state cannot be discriminated by simply detecting the spectrum spread signal superimposed on the video signal.

Therefore, it is not only difficult to simply remove or manipulate the duplication control information superimposed as a spectrum spread signal on the video signal, but also it is possible to ensure providing the duplication control information together with the video signal with the receiving side such as the reproduction apparatus or the other recording apparatus for the video signal, without easily leaking the meaning of the duplication control information superimposed on the video signal by the spectrum spread signal during, for example, transmission. That is to say, it is possible to enhance the concealment characteristic of the duplication control information on the video signal to thereby make it more difficult to remove or manipulate the duplication control information on the video signal.

Furthermore, the duplication control information on the video signal is transmitted by the superimposition/non-superimposition pattern of the PN code string PS superimposed on the video signal. Thus, if the duplication control information on the video signal is to be removed or manipulated, it is required to do so per superimposition/non-superimposition pattern of the PN code string.

This makes it possible to intensify the strength against illegal actions such as the removal or manipulation of the spectrum spread signal which is superimposed on the video signal so as to transmit duplication control information. Accordingly, the reliability of the duplication control information superimposed on the video signal by means of the spectrum spread signal can be enhanced.

[Reproduction Apparatus]

FIG. 4 is a block diagram for describing a DVD reproduction apparatus for reproducing and outputting a video signal recorded on the DVD 100 from the DVD 100 created by the authoring apparatus described above with reference to FIG. 1.

As shown in FIG. 4, the reproduction apparatus in this embodiment comprises a readout section 21, a descramble section 22, a video data decoding section 23, a D/A converter circuit 24, a CGMS-A superimposition section 25, an analog vide signal output terminal 25a, a CGMS-D decoding section 26, a WM decoding section 27, an encoding section 28, an IEEE1394 interface 29, a digital video signal output terminal 29d, a control section 30 and a key operating section 31.

If a user gives an instruction to reproduce a video signal recorded on a DVD 100 through the key operating section 31, the readout section 21 reads out the video signal from the DVD 100. The video signal read out by the readout section 21 is supplied to the descramble section 22 and descramble processing for descrambling the scramble of the video signal is conducted.

The descrambled video signal is supplied to the video decoding section 23. Since the descrambled video signal is MPEG-compressed, the video signal is MPEG-decoded and expanded by the video data decoding section 23 so as to supply the video signal to, for example, a display monitor device. The MPEG-decoded video signal is supplied to the D/A converter circuit 24 and converted into an analog signal.

The video signal converted into the analog signal is supplied to the CGMS-A superimposition section 25, where CGMS-A information is superimposed on a predetermined horizontal block in a vertical blanking period based on information from the control section 30. The control section 30, in this case, sets CGMS-A information superimposed on the outputted analog video signal based on CGMS-D information from the CGMS-D decoding section 26 to be described later and duplication control information from the WM decoding section 27 and supplies the CGMS-A information to the CGMS-A superimposition section 25 to thereby superimpose the CGMS-A information on the analog video signal.

The analog video signal on which the CGMS-A information is superimposed in the CGMS-A superimposition section 25 is outputted, through the analog video signal output terminal 25a, to, for example, a display monitor device or a recording apparatus. In this way, the CGMS-A information and the duplication control information transmitted by the superimposition/non-superimposition pattern of the PN code string PS serving as a spectrum spread signal are superimposed on the video signal outputted through the analog video signal output terminal 25a.

Also, in this embodiment, the MPEG-compressed video signal from the descramble section 22 can be outputted as a digital signal through an IEEE1394 standard interface bus.

The IEEE1394 standard interface encodes the transmission digital information so as to prevent illegal duplication. Also, the interface verifies whether the output receiving side is a compliant apparatus and verifies the CGMS-D information and duplication control information from the WM decode 27 which are information for duplication control. In accordance with the verification results, it is determined whether or not a key for decoding the code is transmitted to the output receiving side.

This communication control system stated above is referred to as an IEEE 1394 secure bus and the digital interface can effectively prevent duplication.

The video signal outputted from the descramble section 22 is supplied to the CGMS-D decoding section 26 and CGMS-D information added to the video signal is extracted. The CGMS-D information is extracted as two-bit information at a specified position separated from video data in the CGMS-D information decoding section 26 and the two-bit information is supplied to the control section 30.

Further, the video signal which has been MPEG-decoded in the video data decoding section 23 is supplied to the electronic watermark information decoding section (to be referred to as "WM decoding section" hereinafter) 27, and the spectrum spread signal added to the video signal is extracted.

Figure 5:
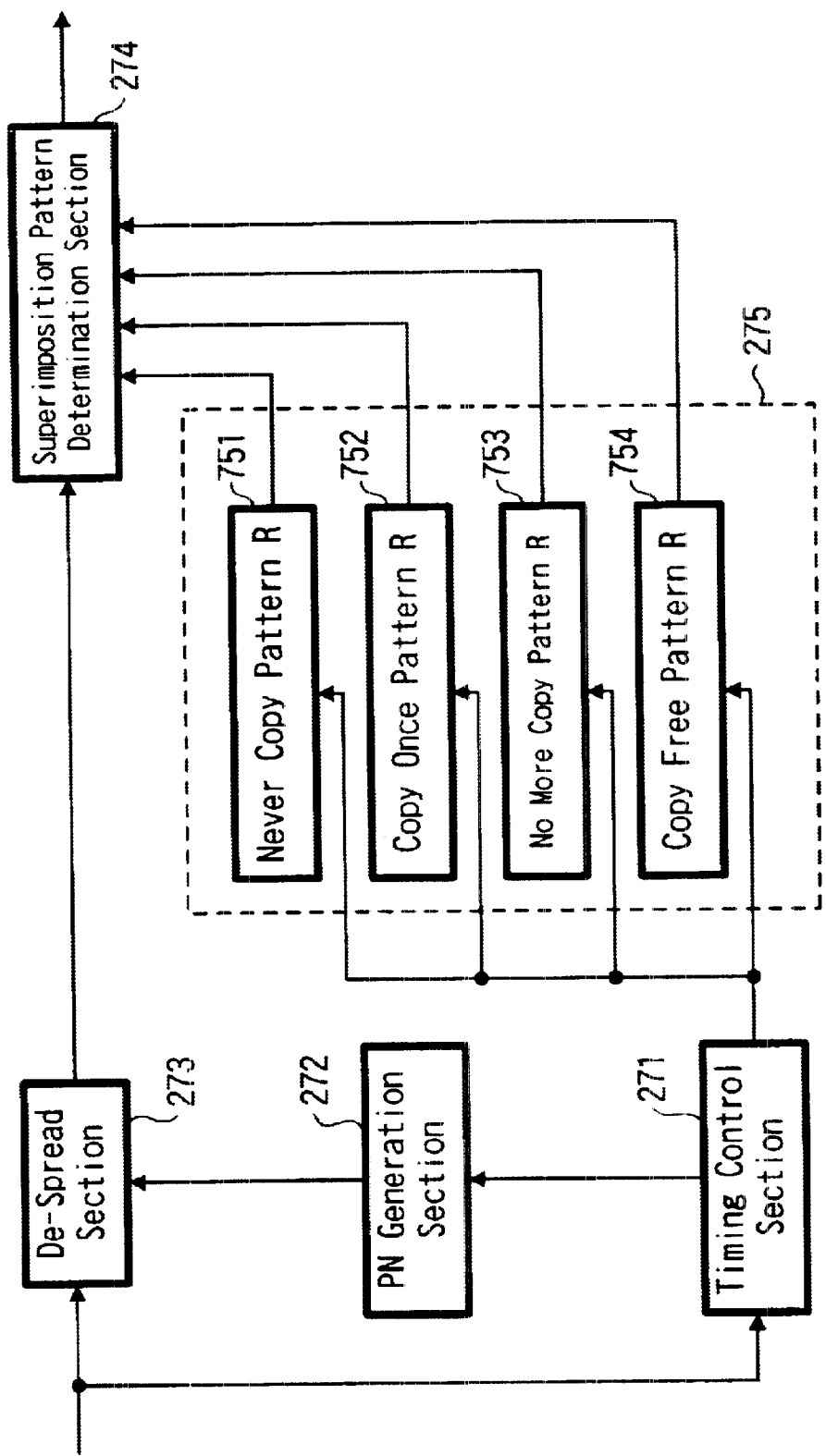
FIG. 5 is a view for describing a WM decoding section 26 in the video signal reproduction apparatus shown in FIG. 4.

FIG. 5 is a block diagram for describing the WM decoding section 27. As shown in FIG. 5, in this embodiment, the WM decoding section 27 comprises a timing control section 271, a PN generation section 272, a de-spread section 273, a superimposition pattern determination section 274 and a superimposition pattern generation section 275. Here, the timing control section 271 of the WM decoding section 27 is constituted in the same manner as the timing control section 3 of the authoring apparatus described above with reference to FIG. 1 and comprises a synchronizing detection circuit and a PLL circuit.

The MPEG-decoded video signal from the video decoding section 23 is supplied to both the de-spread section 273 and the timing control section as shown in FIG. 5. In the timing control section 271, a vertical synchronizing timing signal V and a horizontal synchronizing timing signal H are detected from the supplied video signal. Then, using the detected vertical synchronizing timing signal V and the horizontal synchronizing timing signal H as reference signals, the timing control section 271 forms various PN clock signals such as a rest signal RE, an enable signal EN, a superimposition unit block signal KS indicating a superimposition unit block and a PN clock signal PNCLK.

Namely, the timing control section 271 forms various timing signals for providing the same timing as that of the reset signal RE, the enable signal EN, the block signal KS and PN clock signal PNCLK, respectively, used in the above-stated authoring apparatus for the inputted video signal.

In the reproduction apparatus in this embodiment, therefore, the reset signal RE is a signal in a one-frame cycle and the enable signal EN is a signal for generating a de-spread PN code string in any frame for the video signal. In addition, the block signal KS is a signal in a one-frame cycle and the PN clock signal PNCLK is a signal for providing the same timing as that of the PN clock signal used by the authoring apparatus to generate a PN code string.

Then, the reset signal RE, the enable signal EN and PN clock signal PNCLK formed in the timing control section 271 are supplied to the PN generation section 272, whereas the block signal KS is supplied to the superimposition pattern generation section 275.

The PN generation section 272 is constituted in the same manner as the PN generation section 4 of the above-stated authoring apparatus. The PN generation section 272 generates for the video signal based on the timing signal from the timing control section 271, a de-spread PN code string PS of the same series as that of the PN code string PS as a spectrum spread signal at the same timing as that at which the PN code string PS as a spectrum spread signal is superimposed on the video signal and supplies the de-spread PN code string PS to the de-spread section 273.

The de-spread section 273 conducts de-spread using the de-spread PN code string PS from the PN generation section 272 and detects the spectrum spread signal superimposed on the video signal supplied to the de-spread section 273. The detection output from the de-spread section 273 is supplied to the superimposition pattern determination section 274.

In this embodiment, as already described above, the PN code string PS as a spread code signal is superimposed on the video signal recorded on the DVD 100 in a superimposition/non-superimposition pattern in accordance with the preset attribute pattern to indicate the duplication control state of this video signal so as to generate superimposition blocks and non-superimposition blocks.

Owing to this, if the PN code string PS superimposed on the video signal in the authoring apparatus shown in FIG. 1 is generated as a de-spread PN code string for the video signal at the same timing as that during superimposition and de-spread is conducted using the generated PN code string PS, then de-spread detection output with respect to the blocks in which the PN code string PS is superimposed becomes a high level signal and that with respect to the blocks in which the PN code string is not superimposed becomes a low level signal.

In accordance with the level of the detection output from this de-spread section 272, it is possible to discriminate a block in which the PN code string PS is superimposed from a block in which the PN code string PS is not superimposed, and the superimposition/non-superimposition pattern of the PN code string is detected in the superimposition pattern determination section 274.

Then, it is required to discriminate which attribute pattern the detected superimposition/non-superimposition pattern of the PN code string corresponds. To do so, the superimposition pattern generation section 275 of this reproduction apparatus is provided with four pattern registers 751 to 754 for generating attribute patterns corresponding to the above-stated four duplication control states, respectively.

Thereafter, each of the pattern registers 751 to 754 of the superimposition pattern generation section 275 generates an attribute pattern with one frame set as one block (unit block) of the superimposition/non-superimposition of the PN code string and with an eight-frame cycle set as a repetition cycle, based on the block signal KS.

That is to say, the pattern registers 751 to 754 of this superimposition pattern generation section 275 are constituted in the same manner as the pattern registers 71 to 74 of the superimposition pattern generation section 7 in the authoring apparatus described above with reference to FIG. 1, respectively. The Never Copy pattern register 751 of this superimposition pattern generation section 275 generates an attribute pattern shown in FIG. 2A for indicating that the duplication of the video signal is prohibited and the Copy Once pattern register 752 generates an attribute pattern shown in FIG. 2B for indicating that the duplication of the video signal is permitted once.

Likewise, the No More Copy pattern register 763 generates an attribute pattern shown in FIG. 2C for indicating that the duplication of the video signal is not permitted any more and the Copy Free pattern register 274 generates an attribute pattern shown in FIG. 2D for indicating that the video signal can be freely duplicated.

As can be understood from the above, in the video signal reproduction apparatus in this embodiment, the attribute patterns generated by the respective pattern registers 751 to 754 of the superimposition pattern generation section 275 are simultaneously supplied to the superimposition pattern discrimination section 274.

The superimposition pattern discrimination section 274 discriminates which attribute pattern the superimposition/ non-superimposition pattern of the PN code string PS superimposed on the video signal corresponds, based on the detection output from the de-spread section 272 and the attribute patterns from the respective pattern registers 751 to 754 and supplies the determination result to the control section 30 of this video signal reproduction apparatus.

If the attribute pattern coincident with the superimposition/non-superimposition pattern of the PN code string PS1 indicates, for example, Never Copy, Copy Once, No More Copy and Copy Free, information indicating the determination results of "11", "01", "10" and "00" are supplied to the control section 30, respectively. The information indicating these determination results are set according to the respective attribute patterns and managed by the superimposition pattern discrimination section 274.

It is noted that if the superimposition pattern discrimination section 274 cannot determine an attribute pattern coincident with the superimposition/non-superimposition pattern of the PN code string superimposed on the video signal even after conducting pattern discrimination throughout eight frames (one repetition cycle) with the unit block of the superimposition/non-superimposition of the spectrum spread signal set at one frame, based on the block signal from the timing control section 271, the superimposition pattern discrimination section 274 notifies the timing control section 271 that an attribute pattern cannot be determined.

In this case, the timing control section 271 shifts the repetition cycle block signal KS of the spectrum spread signal by one frame and shifts the leading frame of the repetition cycle of the spectrum spread signal, thereby synchronizing the repetition cycle of the superimposition/non-superimposition pattern of the PN code string with that of the superimposition/non-superimposition pattern of the PN code string PS formed and used by this video signal reproduction apparatus.

In this way, the timing control section 271 can synchronize the PN code string PS superimposed on the video signal with the repetition cycle of the superimposition/non-superimposition pattern of the PN code string formed and used by this video signal reproduction apparatus based on the information from the superimposition pattern determination section 274.

As a result, this video signal reproduction apparatus can obtain duplication control information transmitted by the superimposition/non-superimposition pattern of the PN code string PS. Also, as described above, the control section 30 is supplied with the CGMS-D information from the CGMS-D decoding section 26.

Due to this, the control section 30 determines whether or not an encoding key for decoding the video signal encoded and outputted through the IEEE1394 interface 29 while taking account of the CGMS-D information from the CGMS-D decoding section 26 and the duplication control information from the WM decoding section 27.

That is, the output data of the descramble section 22 is also supplied to the encoding section 28, where the compressed video data is encoded based on different encoding keys according to communications under the control of the control section 30. The encoded data from the encoding section 28 is supplied to an electronic equipment to which the data is outputted through the IEEE1394 interface 29 and through the output terminal 29d. The IEEE1394 interface 29 converts the data so as to comply with the IEEE1394 interface standard and then outputs the data.

At this moment, the control section 30 communicates with the equipment to which the data is outputted through the IEEE1394 interface 29, discriminates whether the equipment is a compliant apparatus and discriminates, if it is a compliant apparatus, whether or not the equipment is a recording apparatus.

Then, the control section 30 determines whether or not encoding key information for decoding encoded data at the encoding section 28 is transmitted to the side to which the data is outputted, using the CGMS-D information from the CGMS-D decoding section 26, the duplication control information from the WM decoding section 27 and the discrimination information on the equipment to which the data is outputted through the IEEE1394 interface 29.

If the side to which the data is outputted is, for example, a non-compliant apparatus, the encoding key information is not fed to the apparatus. Even if the side to which the data is outputted is a compliant apparatus, the encoding key information is not fed to the apparatus when the apparatus is a recording apparatus and the CGMS information is [11] indicating "Never Copy" or the electronic watermark information indicates "Never Copy".

In this way, the reproduction apparatus in this embodiment reads out the video signal on which the spectrum spread signal is superimposed and also the CGMS information as another duplication control information is superimposed and which is recorded on the DVD 100, and conducts necessary processing such as descramble processing (decoding processing), expansion processing of the data-compressed digital video signal and output signal formation processing, thereby forming and outputting an analog video signal supplied to a monitor receiver and a digital video signal outputted through a digital interface.

If the digital video signal is outputted through the digital interface, it is ensured that illegal reproduction is prevented by the function of the digital interface IEEE1394 or based on the duplication control state indicated by the superimposition/non-superimposition pattern of the spectrum spread signal as well as CGMS information as described above.

Furthermore, as described above, the control section 30 appropriately determines CGMS information supplied to the CGMS-A superimposition section 25 based on the CGMS-D information from the CGMS-D decoding section 26 and the duplication control information from the WM decoding section 27, and supplies the CGMS information to the CGMS-A superimposition section 25.

By doing so, it is possible to add appropriate CGMS-A information to the outputted analog video signal. Thus, the side supplied with the analog video signal, e.g., a recording apparatus such as a VTR can conduct duplication control using the CGMS-A information superimposed on the analog video signal and the duplication control information transmitted by the superimposition/non-superimposition pattern of the spectrum spread signal.

As can be seen from the above, the video signal reproduction apparatus in this embodiment can detect duplication control information transmitted by the superimposition/non-superimposition pattern of the PN code string PS, as a spectrum spread signal, superimposed on the video signal and determine the duplication control state.

Additionally, even if an attempt such as removal of one frame of the signal is made against the spectrum spread signal superimposed on the video signal, it is possible to discriminate the superimposition/non-superimposition of the spectrum spread signal, i.e., the attribute pattern thereof from the superimposition/non-superimposition state of the spectrum spread signal, to surely determine the duplication control state of the video signal on which the spectrum spread signal is superimposed and to surely and appropriately control the output of the information through the digital interface. It is further possible to superimpose appropriate CGMS-A information on the outputted analog video signal and to output the signal.

[Compliant Video Signal Recording Apparatus]

Figure 6:
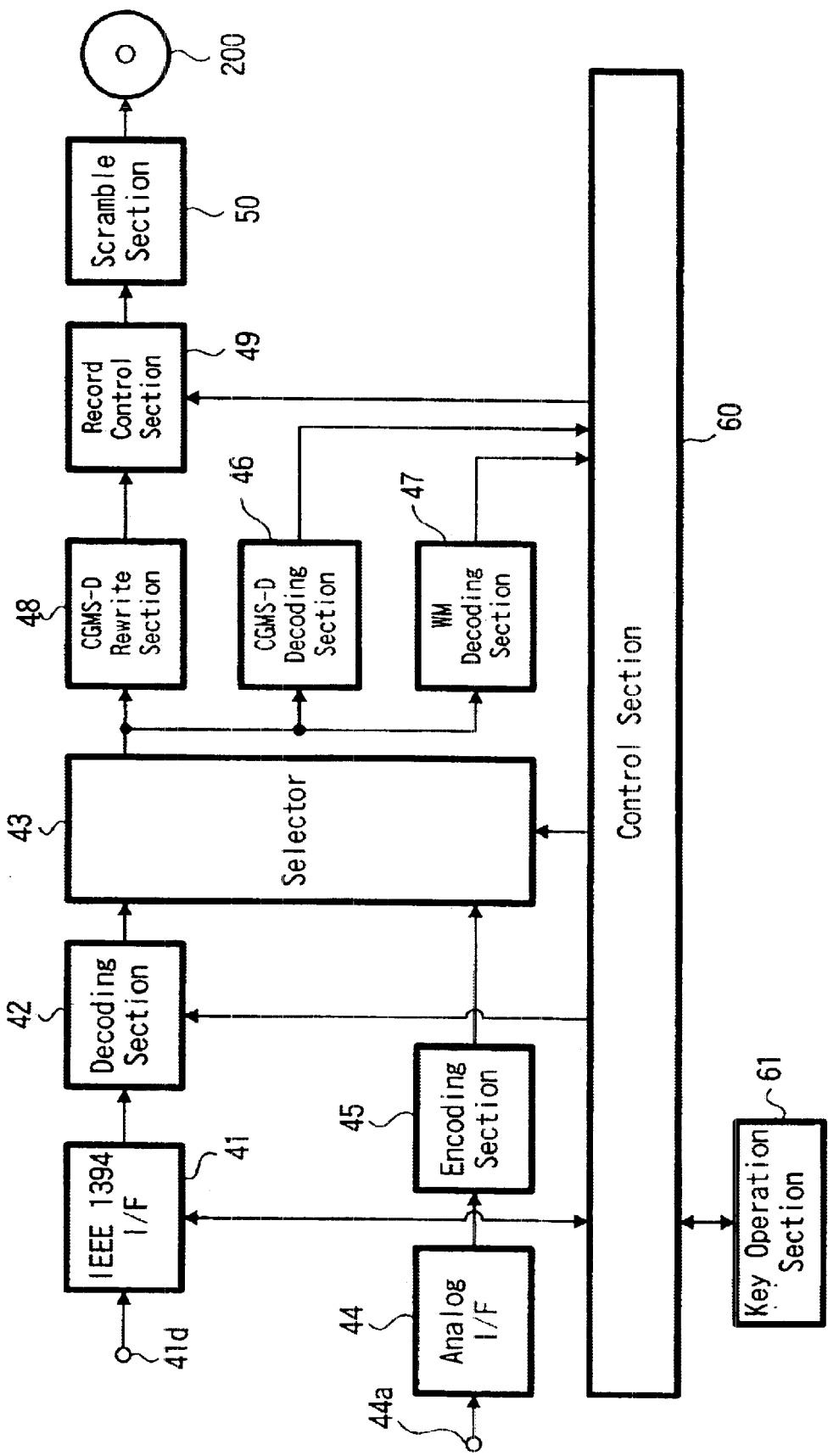
FIG. 6 is a block diagram for describing a video signal recording apparatus to which one embodiment of an information signal recording apparatus according to the present invention is applied.

FIG. 6 is a block diagram showing an example of the constitution of the compliant DVD recording apparatus supplied with the video signal reproduced by the video signal reproduction apparatus shown in FIG. 4 and recording the video signal on a DVD 200 as an RAM disk.

As shown in FIG. 6, this compliant recording apparatus comprises a digital input terminal 41d and an analog input terminal 44a for an IEEE1394 interface. The digital input terminal 41d is connected to an IEEE1394 interface 41.

This IEEE1394 interface 41 conducts processing for recovering the data converted so as to comply with the IEEE1394 bus interface standard. In addition, the control section 60 can discriminate the type of equipment which supplies digital video data by communicating with the equipment through this IEEE1394 interface 41.

Data from the IEEE1394 interface 41 is supplied to the decoding section 42. As already stated above, as for the information determined by the equipment connected to the digital input terminal 41d that the information signal can be duplicated, encoding key information for decoding the encoded data is fed from the equipment. The decoding section 42 can decode data from the IEEE1394 interface 41, when the encoding key information is obtained and recover the compressed video data. The compressed video data thus recovered is supplied to a selector 43.

Further, the video information inputted through the analog input terminal 44a is supplied to the compression encoding section 45 through the analog interface 44, MPEG-compressed and then supplied to the selector 43.

The selector 43 selects and outputs either the data from the decoding section 42 or that from the encoding section 45 by a selector control signal in accordance with the selection input from the user inputted through the key operation section 51. The output data of this selector 43 is supplied to a record control section 48 through a CGMS-D rewrite section 48. The output data of the selector 43 is also supplied to a CGMS-D decoding section 46 and a WM decoding section 47.

The CGMS-D decoding section 46 is constituted in the same manner as the CGMS-D decoding section 26 of the video signal reproduction apparatus described above with reference to FIG. 4. Further, the WM decoding section 47 is constituted almost in the same manner as the WM decoding section 27 provided in the above-described reproduction apparatus and described above with reference to FIG. 5. The WM decoding section 47 is also provided with MPEG decoding function.

That is, the WM decoding section 47 of the recording apparatus also has function of MPEG-decoding the supplied digital video signal which data is compressed by the MPEG system and can surely and accurately extract the electronic watermark information superimposed on the prior-to-compressed video signal.

The CGMS-D decoding section 46 and the WM decoding section 47 extract and discriminate CGMS-D information and electronic watermark information as in the same manner as the CGMS-D decoding section 26 of the reproduction apparatus described above with reference to FIG. 4 and the WM decoding section 27 described above with reference to FIG. 5 and the discrimination outputs of the CGMS-D information and the electronic watermark information are supplied to the control section 60.

In other words, in the CGMS-D decoding section 46, the CGMS-D information is extracted as two-bit information at a specified position separated from the video data and the two-bit information is supplied to the control section 60.

Further, the WM decoding section 47 has function of MPEG-decoding the video signal from the selector 43 as stated above and is also constituted in the same manner as the WM decode 27 shown in FIG. 5. Description will now be given while assuming that the WM decode 47 is constituted as shown in FIG. 5.

The WM decoding section 47 MPEG-decodes the video signal from the selector 43 and the video signal which has been MPEG-decoded is supplied to the timing control section 271 and the de-spread section 273.

The timing control section 271 detects a vertical synchronizing timing signal V and a horizontal synchronizing timing signal H from the supplied video signal as already stated above. Using these signals as reference signals, the timing control section 271 forms various types of timing signals such as a reset signal RE, an enable signal EN, a superimposition unit block signal KS indicating a superimposition unit block and a PN clock signal PNCLK.

These timing signals are intended to provide the video signal supplied to this WM decoding section 47 with the same timing as that of the respective timing signals used when the PN code string PS is formed as a spectrum spread signal and superimposed on the video signal in the authoring apparatus shown in FIG. 1.

The PN generation section 272 generates, for the video signal, a PN code string PS having the same series as that of the PN code string PS superimposed, as a spectrum spread signal, on the video signal using the reset signal RE, the enable signal EN and the PN clock PNCLK from this timing control section 47, and supplies the PN code string PS to the de-spread section 273.

The de-spread section 273 conducts de-spread using the PN code string PS from the PN generation section 272 and supplies the detection output to the superimposition pattern determination section 274. This superimposition pattern determination section 274 is supplied with four types of attribute patterns formed by the respective pattern registers 751 to 754 of the superimposition pattern generation section 275 as stated above with reference to FIG. 2.

The superimposition pattern determination section 274 discriminates which attribute pattern the superimposition/non-superimposition pattern of the spectrum spread signal superimposed on the supplied video signal corresponds to, based on the detection output from the de-spread section 272 and the four types of attribute patterns from the superimposition pattern generation section 275, and supplies the discrimination result to the control section 50.

In the DVD recording apparatus shown in FIG. 6, too, the superimposition pattern determination section 274 supplies, to the control section 60, information (duplication control information) indicating a determination result of "11" when an attribute pattern coincident with the superimposition/non-superimposition pattern of the PN code string PS1 shows Never Copy, that of "01" when Copy Once, that of "10" when an attribute pattern coincident with the superimposition/non-superimposition pattern of the PN code string PS1 shows No More Copy and "00" when an attribute pattern coincident with the superimposition/non-superimposition pattern of the PN code string PS1 shows Copy Free.

The control section 60 discriminates whether or not input information can be recorded (duplicated) based on the CGMS-D information from the CGMS-D decode 46 and the duplication control information from the WM decoding section 47, and, if discriminating that it can be recorded (duplicated), discriminates whether the CGMS-D information for duplication control needs to be rewritten.

Then, when discriminating that the recording of the input information is prohibited, the control section 60 controls the record control section 49 such that recording is not executed.

Further, if discriminating that the input information can be recorded or duplicated once, the control section 60 controls the record control section 49 such that recording is executed and the recorded data is subjected to specific scramble from the scramble section 50 to be recorded on the DVD 200. If discriminating that the input information can be duplicated once, the control section 60 causes the CGMS-D rewrite section 48 to execute the rewriting of the CGMS-D information.

The CGMS rewrite section 48 in this case may be constituted such that two-bit data is extracted to rewrite a state [10] to a state [11] since the CGMS information is the two-bit data at a specific position in the data stream from the decoding section 42.

In this embodiment, the duplication control information transmitted by the superimposition/non-superimposition pattern of the PN code string PS is not rewritten. This is because the generation of the video signal can be limited based on information indicating a medium type recorded on the DVD as a recording medium and duplication control information as follows.

That is to say, the recording apparatus reads out the medium type of the DVD on which the video signal is recorded. If this medium type is a writable RAM disk and duplication control information indicates Copy Once, it is possible to discriminate that the vide signal on which the duplication control information indicating Copy Once is superimposed and which is recorded on the RAM disk has been duplicated (copied) on the RAM disk. In that case, the recording apparatus sets that duplication is not permitted any more.

In this way, by considering even a medium type, it is possible to conduct duplication generation limitation control to the video signal without rewriting the duplication control information transmitted by the superimposition/non-superimposition pattern of the PN code string PS.

It is noted that the duplication control information transmitted by the superimposition/non-superimposition pattern of the PN code string PS can be rewritten. In that case, after the superimposition/non-superimposition pattern of the PN code string PS which has already been superimposed on the video signal is removed, the superimposition/non-superimposition pattern of the PN code string PS indicating No More Copy may be superimposed on the video signal.

Alternatively, it is possible to superimpose a superimposition/non-superimposition pattern indicating No More Copy on the video signal using, for example, a PN code string of different series. In that case, new duplication control information can be superimposed on the video signal by the superimposition/non-superimposition pattern of a new PN code string without the need to remove the superimposition/non-superimposition pattern of the PN code string which has been already superimposed on the video signal.

As can be understood from the above, a so-called compliant recording apparatus can detect the superimposition/non-superimposition pattern of a spectrum spread signal superimposed on a supplied video signal, discriminate duplication control information corresponding to the superimposition/non-superimposition pattern and ensure conducting duplication control.

Additionally, in this case, if a duplication control state indicated by CGMS information differs from that indicated by the duplication control information transmitted by the superimposition/non-superimposition pattern, the state close to Never Copy may be preferentially used, the duplication control transmitted by the superimposition/non-superimposition pattern of the spectrum spread signal may be preferentially used in view of high reliability to thereby control the record control section 49.

In this way, the duplication control information transmitted by the superimposition/non-superimposition pattern of the PN code string PS is superimposed on the video signal supplied to the DVD recording apparatus from the DVD reproduction apparatus. In this case, as already described above, it is impossible to discriminate the meaning of the duplication control information transmitted by means of the spectrum spread signal by simply detecting the spectrum spread signal superimposed on the video signal.

Therefore, it is not only difficult to remove or manipulate the duplication control information superimposed as a spectrum spread signal on the video signal but also it is possible to surely provide the duplication control information together with the video signal to the DVD recording apparatus without easily leaking the meaning of the duplication control information superimposed on the video signal by means of the spectrum spread signal.

Thus, the duplication control information superimposed on the video signal is represented by the superimposition/non-superimposition pattern of the PN code string PS, it is possible to transmit the duplication control information while making higher the concealment characteristics of the duplication control information and make it more difficult to remove or manipulate the duplication control information on the video signal.

Furthermore, the DVD recording apparatus can surely discriminate the duplication control information superimposed on the supplied video signal and appropriately conduct duplication control over the video signal.

[Transmission of Duplication Control Information by Reversal/nonreversal Pattern]

In the preceding embodiment, duplication control information is transmitted by the superimposition/non-superimposition pattern of a spectrum spread signal. It is, however, possible to transmit information by the reversal/non-reversal of the spectrum spread signal between a block in which the spectrum spread signal is superimposed as it is and that in which the spectrum spread signal is superimposed with its phase reversed instead of transmitting the information by the superimposition/non-superimposition pattern of the spectrum spread signal.

For example, based on the attribute patterns consisting of eight-bit information stated above with reference to FIG. 2, a PN code string PS which is a spectrum spread signal is superimposed on a video signal as it is in high level blocks of the attribute patterns and the PN code string PS is superimposed thereon with its phase reversed in low level blocks thereof.

By doing so, an attribute pattern is expressed by the reversal/non-reversal pattern of the spectrum spread signal and duplication control information can be transmitted by the reversal/non-reversal pattern of this spectrum spread signal.

Namely, in a case where an attribute pattern is the Never Copy pattern shown in FIG. 2A, the PN code string PS is superimposed on the video signal in the reversal/non-reversal pattern indicated by the pattern A2 of FIG. 2.

Likewise, in a case where an attribute pattern is the Copy Once pattern shown in FIG. 2B, the PN code string PS is superimposed on the video signal in the reversal/non-reversal pattern indicated by the pattern B2 of FIG. 2.

Further, in a case where an attribute pattern is the No More Copy pattern shown in FIG. 2C, the PN code string PS is superimposed on the video signal in the reversal/non-reversal pattern indicated by the pattern C2 of FIG. 2. In a case where an attribute pattern is the Copy Free pattern shown in FIG. 2D, the PN code string PS is superimposed on the video signal in the reversal/non-reversal pattern indicated by the pattern D2 of FIG. 2.

In this way, if information is transmitted by the reversal/non-reversal of the spectrum spread signal superimposed on the video signal, the pattern switching section 5 of the authoring apparatus described above with reference to FIG. 1 may control the reversal/non-reversal of the spectrum spread signal based on the attribute pattern from the superimposition pattern generation section.

Furthermore, in the video signal reproduction apparatus shown in FIG. 4 for discriminating the blocks of the reversal/non-reversal of the spectrum spread signals superimposed on the video signal, the detection output from the de-spread section 272 of the WM decoding section 27 is positive (+) in non-reversal blocks and negative (−) in reversal blocks. Thus, based on these codes of the detection output, it is possible to discriminate the blocks in which the spectrum spread signal is reversed or not reversed.

As can be seen from the above, if there are the blocks in which the spectrum spread signal is superimposed on the video signal as it is and those in which the spectrum spread signal is superimposed on the video signal with its phase reversed, it is possible to increase the difference in the level of the spectrum spread signal between the blocks in which the spectrum spread signal is superimposed as it is and those in which the spectrum spread signal are superimposed with its phase reversed, compared with a case of the superimposition/non-superimposition of the spectrum spread signal.

Thus, if the reversal/non-reversal of the spectrum spread signal is conducted, it is possible to decrease the influence of the video signal on the spectrum spread signal superimposed on the video signal and, therefore, to transmit and detect the spectrum spread signal more surely.

In this embodiment, a block of the superimposition/non-superimposition of a spectrum spread signal and that of the reversal/non-reversal thereof consist of one frame, respectively and duplication control information is transmitted by the superimposition/non-superimposition pattern or reversal/non-reversal pattern in an eight-frame cycle. The present invention should not be, however, limited thereto.

The length of a superimposition/non-superimposition block or reversal/non-reversal block, that is, a unit block can be set larger than that in the preceding embodiment, such as two frames, three frames, . . . In this way, by setting the length of the unit block large, it is possible to intensify the strength of the spectrum spread signal superimposed on the video signal against, for example, filtering or various attempts.

Furthermore, the length of the unit block can be set smaller than that in the embodiment stated above, such as ½ frame, ⅓ frame. It goes without saying that a superimposition/non-superimposition block or reversal/non-reversal block may be set using a horizontal synchronizing signal instead of a vertical synchronizing signal.

Moreover, the repetition cycle of the superimposition/non-superimposition pattern or reversal/non-reversal pattern should not be limited to an eight-frame cycle and can be longer or shorter than that in the embodiment described above.

Also, the superimposition/non-superimposition pattern or reversal/non-reversal pattern should not be limited to the above-stated embodiment and various patterns can be used. In that case, a pattern which does not cause erroneous detection even if detection synchronism is shifted during the detection of the superimposition/non-superimposition pattern or reversal/non-reversal pattern, should be used.

Second Embodiment

In the above-stated embodiment, description has been given to a case where duplication control information is superimposed on a video signal using a spectrum spread signal. The information signal should not be limited to the video signal. It is possible to superimpose duplication control signal as a spectrum spread signal on an information signal such as a voice signal.

In that case, too, additional information such as duplication control information can be transmitted by the superimposition/non-superimposition or reversal/non-reversal of the spectrum spread signal with respect to such a voice signal for each preset block. In this case, a superimposition/non-superimposition block (unit block) or a reversal/non-reversal block (unit block) may be set according to the preset data amount or time length of the information signal such as a voice signal.

If an information signal is, for example, a digital signal, a superimposition/non-superimposition block or reversal/non-reversal block may be set based on preset unitary data such as a block for processing the digital information or based on time length, such as one block for 0.5 second or one block for one second.

In case of the information signal such as a voice signal unlike a video signal, however, a video synchronizing signal cannot be employed as a reference signal. Considering this, preset start information and end information on a spectrum spread signal are contained in the superimposition/non-superimposition pattern or reversal/non-reversal pattern superimposed on an information signal such as a voice signal or a synchronizing signal for detecting a superimposition/non-superimposition pattern or reversal/non-reversal pattern is superimposed as a spectrum spread signal.

Figure 7:
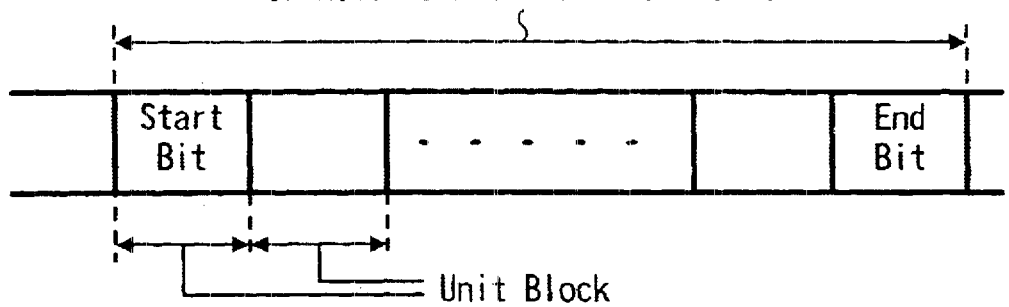
FIG. 7 is a view for describing an example of a case where additional information is superimposed, as electronic watermark information, on an information signal such as a voice signal.

FIGS. 7 and 8 are views for describing a case where the superimposition/non-superimposition pattern or reversal/non-reversal pattern of a spectrum spread signal for transmitting additional information such as duplication control information is superimposed on an information signal such as a voice signal.

In the example shown in FIG. 7, preset start information and end information as a spectrum spread signal is contained in the superimposition/non-superimposition pattern or reversal/non-reversal pattern of a spectrum spread signal for transmitting additional information, and the respective blocks of the superimposition/non-superimposition pattern or reversal/non-reversal pattern are synchronized with one another using the start information and end information. In this case, the start bit (start information) and the end bit (end information) are information of the forefront and last blocks, respectively, within a plurality of blocks constituting the superimposition/non-superimposition or reversal/non-reversal pattern.

When the preset start bit is detected, it is judged that the superimposition/non-superimposition pattern or reversal/non-reversal pattern of the spectrum spread signal is superimposed and the superimposition/non-superimposition or reversal/non-reversal of the spectrum spread signal for every unit block until the preset end bit is detected, is detected, whereby the superimposition/non-superimposition pattern or reversal/non-reversal pattern can be detected.

In this case, a spectrum spread signal forming the start bit and the end bit and that superimposed on the respective unit blocks put between the start and end bits can be formed by using the same series of PN code strings.

Figure 8A:
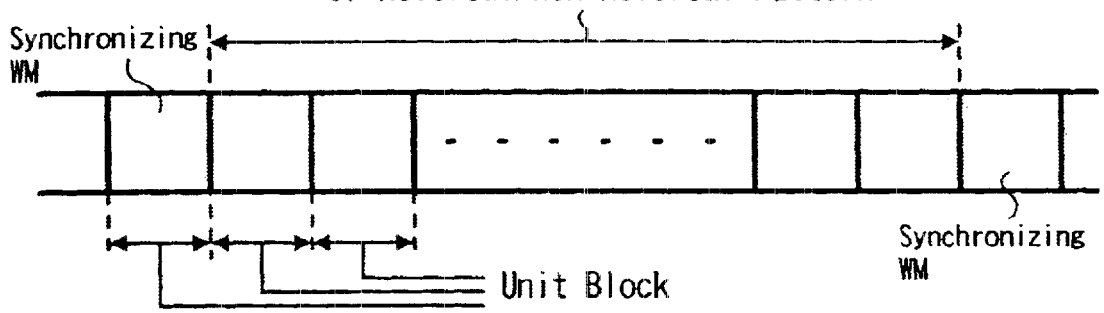
FIG. 8 is a view for describing another example of a case where additional information is superimposed, as electronic watermark information, on an information signal such as a voice signal.

In the example shown in FIG. 8A, a spectrum spread signal for generating a synchronizing pulse is added to the superimposition/non-superimposition pattern or reversal/non-reversal pattern. That is, as shown in FIG. 8A, a spectrum spread signal as a synchronizing signal (which is described as synchronizing WM in FIG. 8B) is added in front of the superimposition/non-superimposition pattern or reversal/non-reversal pattern.

Then, if the synchronizing WM is detected, it is judged that either a superimposition/non-superimposition pattern or a reversal/non-reversal pattern is superimposed in back of the synchronizing WM to thereby allow detecting the superimposition/non-superimposition pattern or reversal/non-reversal pattern. In this case, the synchronizing WM and the superimposition/non-superimposition pattern or reversal/non-reversal pattern can be formed by using the same series of PN code strings.

Figure 8B:
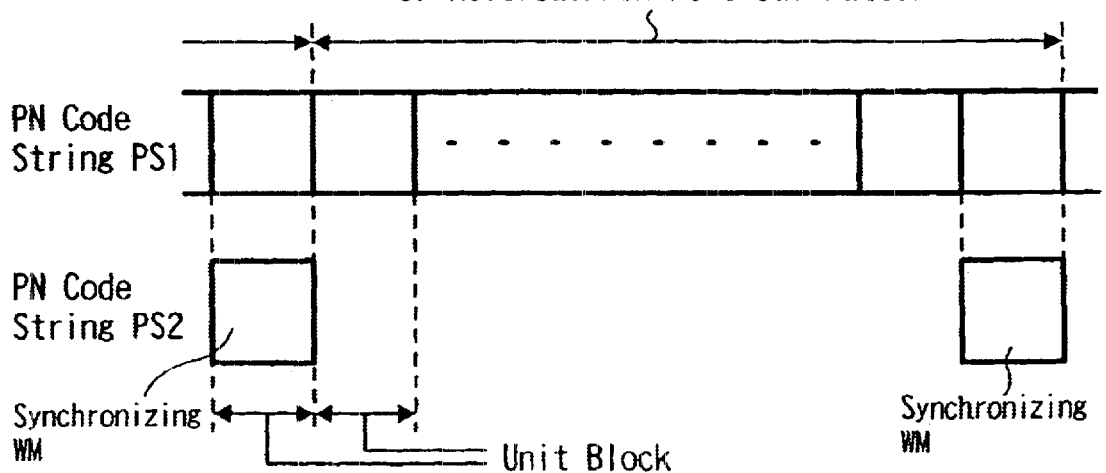

Needless to say, it is possible to form the synchronizing WM and the superimposition/non-superimposition pattern or reversal/non-reversal pattern by using PN code strings of different series. As shown in FIG. 8B, for example, the superimposition/non-superimposition pattern or reversal/non-reversal pattern is formed using a PN code string PS1, whereas the synchronizing WM is formed using a PN code string PS2.

In this way, while the synchronizing WM and the superimposition/non-superimposition pattern or reversal/non-reversal pattern are transmitted by spectrum spread signals formed by different PN code strings, respectively, they can be surely detected even if they are superposed on each other in the same time range. Owing to this, as shown in FIG. 8B, it is also possible to superimpose the synchronizing WM and the superimposition/non-superimposition pattern or reversal/non-reversal pattern on an information signal such as a voice signal while the synchronizing WM and the superimposition/non-superimposition or reversal/non-reversal pattern are superposed on each other.

In that case, it is judged that a superimposition/non-superimposition or reversal/non-reversal pattern is started at the block next to the information signal on which the synchronizing WM is superimposed and the superimposition/non-superimposition pattern or reversal/non-reversal pattern may be thereby detected.

Furthermore, in FIG. 8, the synchronizing WM is provided just before the superimposition/non-superimposition pattern or reversal/non-reversal pattern. The present invention should not be, however, limited thereto. The synchronizing WM may be provided between one superimposition/non-superimposition pattern and another superimposition/non-superimposition pattern or provided between one reversal/non-reversal pattern and another reversal/non-reversal pattern.

In other words, the synchronizing WM and the superimposition/non-superimposition pattern or reversal/non-reversal pattern may not be necessarily adjacent each other. The synchronizing WM may be added so that both the synchronizing WM and the superimposition/non-superimposition or reversal/non-reversal pattern can be detected.

In this way, by providing start information and end information or using the synchronizing WM, it is possible to transmit additional information together with various types of information signals, such as a voice signal, other than a video signal by means of the superimposition/non-superimposition pattern or reversal/non-reversal pattern of a spectrum spread signal. It is noted that the method described with reference to FIGS. 7 and 8 can be also applied to a case where an information signal is a video signal.

In the above-stated embodiments, the superimposition/non-superimposition patterns or reversal/non-reversal patterns for transmitting a plurality of additional information are formed using the same series of PN code strings PS. The present invention should not be, however, limited thereto.

For example, it is possible to transmit a plurality of additional information by differentiating PN code strings serving as spectrum spread signals while using the same pattern or to transmit more types of additional information by a plurality of different PN code strings and superimposition/non-superimposition patterns or reversal/non-reversal patterns.

Furthermore, in the above-stated embodiments, description has been given while assuming that all of the authoring apparatus, the DVD reproduction apparatus and the DVD recording apparatus have four pattern registers for generating attribute patterns to notify four duplication control information, respectively. The present invention should not be, however, limited thereto.

For example, in the authoring apparatus shown in FIG. 1, it is possible that the attribute patterns registered in the memory of the control section 20 in advance are supplied to the pattern switching section 5 and the superimposition/non-superimposition pattern or reversal/non-reversal pattern of the PN code string from the PN generation section 4 is switched based on information corresponding to the attribute pattern from this control section 20 without providing the superimposition pattern determination section 6 and the superimposition pattern generation section 7.

In that case, the block signal KS among the timing signals formed by the timing control section 3 may be supplied to the pattern switching section 5, the pattern switching section 5 may use the timing signal from the timing control section 3 and switch the superimposition/non-superimposition pattern or reversal/non-reversal pattern of the PN code string serving as a spectrum spread signal based on the information corresponding to the attribute pattern from the control section 20.

Likewise, in the DVD reproduction apparatus and DVD recording apparatus, information corresponding to an attribute pattern from the control section 30, 60 and the block signal from the timing control section 271 are supplied to the superimposition pattern determination section 274 and the superimposition/non-superimposition pattern or reversal/non-reversal pattern of the PN code string serving as a spectrum spread signal superimposed on a to-be-processed video signal can be discriminated based on the information.

Further, in the above-stated embodiments, attribute patterns should not be limited to those described above. Attribute pattern can be set according to, for example, M series codes.

Moreover, the repetition cycle of an attribute pattern, superimposition/non-superimposition blocks, reversal/non-reversal blocks and the like should not be limited to those in the above-stated embodiments. If an information signal is, for example, a video signal, the cycle and length synchronous with a video synchronizing signal may suffice.

Additionally, in the above-stated embodiments, description has been given while assuming that the information signal output apparatus according to the present invention is applied to an authoring apparatus, the information signal processing apparatus is applied to a video signal reproduction apparatus (DVD reproduction apparatus) and the information signal recording apparatus is applied to a DVD recording apparatus. The present invention should not be, however, limited thereto.

The information signal output apparatus according to the present invention can be applied to a broadcasting apparatus for transmitting a broadcast signal from a broadcasting station, an information signal recording apparatus and an information signal recording and reproduction apparatus such as a so-called recording and reproduction apparatus for a DVD used in household or a VTR (video tape recorder), as well as an information processing apparatus provided with communication function of transmitting and receiving information through communication media such as internet. Namely, the information signal output apparatus according to the present invention can be applied to various types of apparatuses for outputting various information signals such as a video signal, a voice signal and communication data.

Additionally, the information signal processing apparatus according to the present invention can be applied to, for example, a receiver referred to as a set-top box for receiving digital broadcasting and supplying it to a monitor receiver or a recording apparatus and to an information processing apparatus provided with communication function of transmitting and receiving information through communication media such as internet. Namely, the present invention can be applied to various types of processing apparatuses supplied with various information signals such as a video signal, a voice signal and communication data and processing them.

Further, the information signal recording apparatus according to the present invention can be applied to, for example, a VTR (video tape recorder), a small-sized magneto-optical disk recording apparatus and recording and reproduction apparatus referred to as (a mini-disk), a hard disk device or a computer recording an information signal on a hard disk device or the like. Namely, if an information signal is recorded on various types of recording media such as a magnetic tape, a magnetic disk, an optical disk, a magneto-optical disk and a semiconductor memory, the information signal recording apparatus according to the present invention can be applied to various types of recording apparatuses for conducting duplication control using duplication control information superimposed on the information signal.

Also, in the above-stated embodiments, a PN code is used as a spread code for forming a spectrum spread signal. The spread code should not be, however, limited thereto. Various types of spread codes can be used as a spread code for forming a spectrum spread signal.

Furthermore, in the above-stated embodiments, a spectrum spread signal is used as electronic watermark information. The electronic watermark information should not be, however, limited to the spectrum spread signal. Various types of electronic watermark information formed by means of the electronic watermark technique can be superimposed on an information signal in a superimposition/non-superimposition pattern or reversal/non-reversal pattern.

Additionally, in a case where a video signal on which electronic watermark information is superimposed, is a digital signal, the electronic watermark information is superimposed on a digital signal which is not MPEG-encoded yet. It is of course possible to superimpose the electronic watermark information on a digital video signal which has been MPEG-encoded.

Moreover, information notified by the superimposition/non-superimposition pattern or reversal/non-reversal pattern of electronic watermark information should not be limited to duplication control information. Various types of additional information such as copyright information can be transmitted by the superimposition/non-superimposition pattern or reversal/non-reversal pattern of electronic watermark information.

Figure 9:
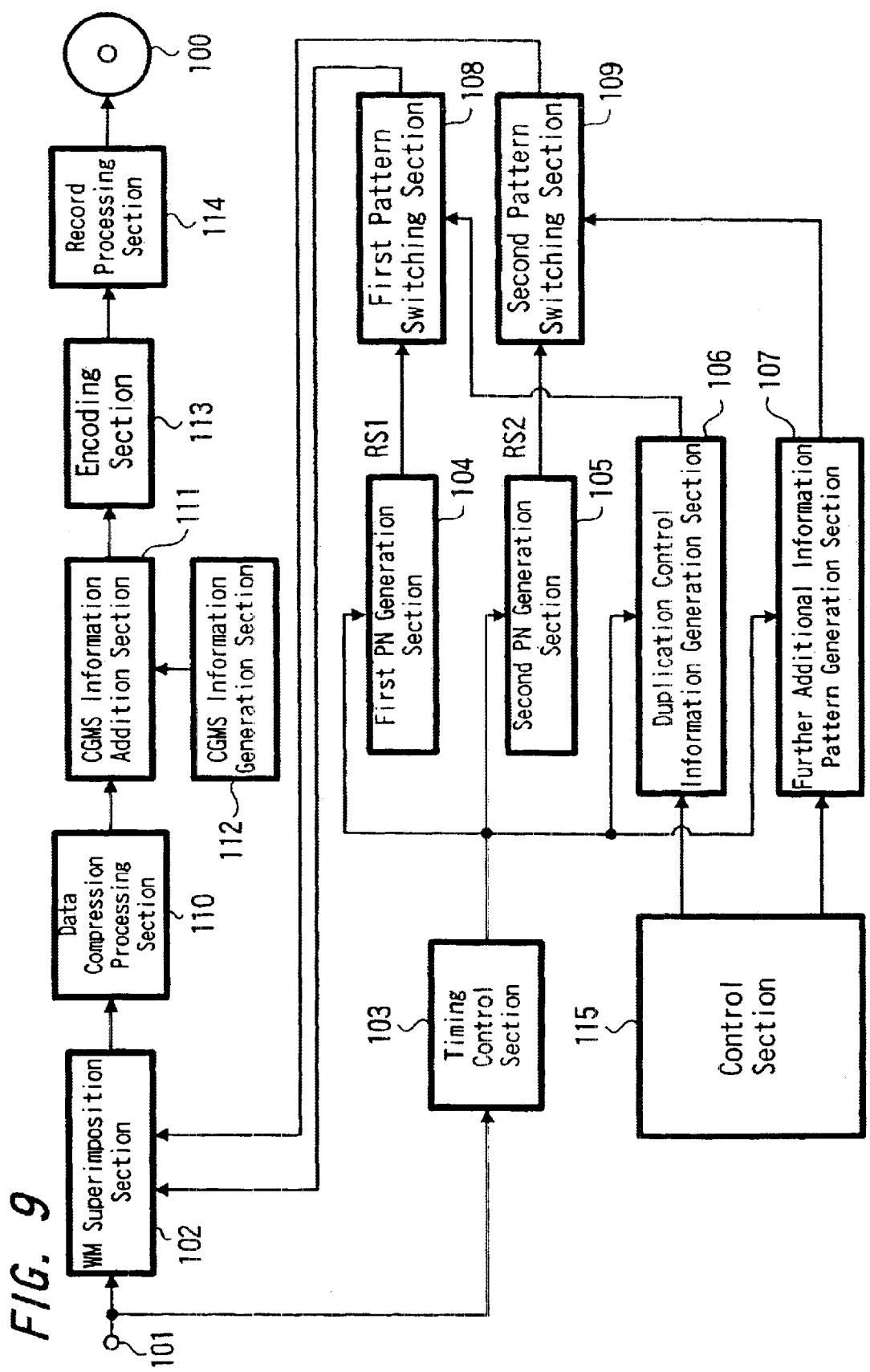
FIG. 9 is a block diagram for describing one embodiment of an information signal output apparatus according to the present invention.

FIG. 9 is a block diagram for describing a video signal recording apparatus in the second embodiment. The video signal recording apparatus in the second embodiment is designed to superimpose a spectrum spread signal for transmitting duplication control information and a spectrum spread signal for transmitting further additional information on a video signal at the same time with the same frequency with respect to the video signal and then to transmit them.

As shown in FIG. 9, the video signal recording apparatus in the second embodiment comprises a video signal input terminal 101, an electronic watermark information superimposition section (to be referred to as "WM superimposition section" hereinafter) 102, a timing control section 103, the first PN generation section 104, the second PN generation section 105, a duplication control information pattern generation section 106, a further additional information pattern generation section 107, the first pattern switching section 108, the second pattern switching section 109, a data compression processing section 110, a CGMS information addition section 111, a CGMS information generation section 112, an encoding section 113, a record processing section 114 and a control section 115.

In the video signal recording apparatus shown in FIG. 9, a video signal to be recorded on a DVD 100 is supplied to the WM superimposition section 102 and the timing control section 103 through the input terminal 101. The WM superimposition section 102 is designed to, as will be described later, superimpose a spectrum spread signal for transmitting duplication control information and a spectrum spread signal for transmitting further additional information such as copyright information on the video signal which has been inputted through the input terminal 101.

The timing control section 103 comprises a synchronism detection circuit and a PLL circuit, and detects a vertical synchronizing timing signal V and a horizontal synchronizing timing signal H from the supplied video signal. Using the detected vertical synchronizing timing signal V and the horizontal synchronizing timing signal H as reference signals, the timing control section 3 generates a PN code reset timing signal RE indicating timing at which the generation of a PN code starts (to be referred to as "reset signal RE"), a PN generation enable signal EN indicating a block in which the PN code is generated (to be referred to as "enable signal EN"), a signal indicating a block in which the spectrum spread signals are superimposed and that in which the spectrum spread signals are not superimposed, i.e., a block signal KS indicating a unit block in which the spectrum spread signals are superimposed/non-superimposed, and various timing signals such as a PN clock signal PNCLK.

In this embodiment, the reset signal RE, the enable signal EN and the PN clock signal PNCLK generated by the timing control section 103 are supplied to the PN generation section 104 and the PN generation section 105, and the block signal KS is supplied to the duplication control information pattern generation section 106 and the further additional information pattern generation section 107.

Each of the first PN generation section 104 and the second PN generation section 105 generates a PN code string used as a spread code based on the enable signal EN, the PN clock signal PNCLK and the reset signal RE, comprises a plurality of stages of shift registers which are not shown and is constituted by several exclusive OR circuits which operate the appropriate tap output of the shift registers.

Each of the first PN generation section 104 and the second PN generation section 105 is reset by the reset signal RE in an N-frame cycle and generates a PN code string PS having a preset code pattern from its leading portion. In this embodiment, the enable signal EN turns the first PN generation section 104 and the second PN generation section 105 into an enable state in any frame.

In the second embodiment, the first PN generation section 104 and the second generation section 105 generate PN code strings of different series. In this embodiment, the first PN generation section 104 generates a PN code string PS1 and the second PN generation section 105 generates a PN code string PS2.

The first PN generation section 104 and the second PN generation section 105 are turned into a state in which respective PN codes can be generated (in an enable state) by the enable signal EN. By generating a PN code in the order of one chip per clock of the clock signal PNCLK, the first PN generation section 104 and the second PN generation section 105 generate the PN code strings PS1 and PS2 having preset code patterns to be reset in an N-frame cycle or, in the second embodiment, in a five-frame cycle, respectively.

The PN code string PS1 generated by the first PN generation section 104 is used as a spectrum spread signal for transmitting duplication control information and supplied to the first pattern switching section 108. In addition, the PN code string PS2 generated by the second PN generation section 105 is used as a spectrum spread signal for transmitting further additional information and supplied to the second pattern switching section 109.

As already described above, in the second embodiment, the duplication control information is transmitted by the superimposition/non-superimposition pattern of the spectrum spread signal consisting of blocks in which the spectrum spread signal is superimposed and those in which the spectrum spread signal is not superimposed. Also, the further additional information of a plurality of bits is transmitted such that blocks in which the spectrum spread signal is superimposed and blocks in which the spectrum spread signal is not superimposed indicate one-bit information, respectively such as, for example, the former block indicates "1" and the latter block indicates "0".

Due to this, the first pattern switching section 108 is supplied with pattern information (to be referred to as "attribute pattern" hereinafter in this specification) for determining the superimposition/non-superimposition pattern of the PN code string PS1 from the duplication control information pattern generation section 106. In addition, the second pattern switching section 109 is supplied with an indication signal indicating the superimposition/non-superimposition of the PN code string PS2 from the further additional information pattern generation section 107.

The duplication control information pattern generation section 106 generates an attribute pattern for determining the superimposition/non-superimposition pattern of the PN code string PS1 from the first PN generation section 104 based on information from the control section 115 and the block signal KS from the timing control section 103.

In this embodiment, information indicating in which attribute pattern the PN code string PS1 is superimposed on the video signal among attribute patterns corresponding to four duplication control states, i.e., 1. Never copy; 2. Copy once (one generation); 3. No More Copy; and 4. Copy Free, respectively, that is, information for indicating an attribute pattern to determine the superimposition/non-superimposition pattern of the PN code string 101 is supplied from the control section 115 to the duplication control information pattern generation section 106.

In the second embodiment, if the superimposition of the spectrum spread signal and the non-superimposition thereof are represented by "1" and "0", respectively, the attribute patterns corresponding to the above-stated four duplication control states are preset as follows. Namely, in the second embodiment, the attribute pattern indicating No Copy is "10000000", that indicating Copy Once is "10101010", that indicating No More Copy is "11001100" and that indicating Copy Free is "11110600".

The control section 115 supplies eight-bit information corresponding to the above-stated attribute pattern as information indicating the attribute pattern to the duplication control information pattern generation section 106.

Here, which of the information indicating an attribute pattern among those attribute patterns is supplied to the duplication control information pattern generation section 106 depends on, for example, the copyright owner of a video signal recorded on the DVD. That is to say, the copyright owner of the video signal recorded on the DVD determines which duplication control information is to be superimposed on the video signal.

Then, if the user (operator) of the video signal recording apparatus in the second embodiment executes the recording of the video signal on the DVD, information indicating duplication control information to be superimposed on the video signal recorded on the DVD is inputted through a key operating section, which is not shown, in the video signal recording apparatus. The eight-bit information indicating an attribute pattern in accordance with this inputted indication information is supplied from the control section 115 to the duplication control information pattern generation section 106.

The duplication control information pattern generation section 106 generates an attribute pattern for determining the superimposition/non-superimposition pattern of the PN code string 101, that is, determining that the unit block for controlling the superimposition/non-superimposition of the PN code string PS1 (block in which the spectrum spread signal is superimposed or not superimposed) consists of five frames and that the repetition cycle consists of 40 frames, based on the information indicating the attribute pattern from the control section 115 and the block signal KS from the timing control section 103.

Figure 10:
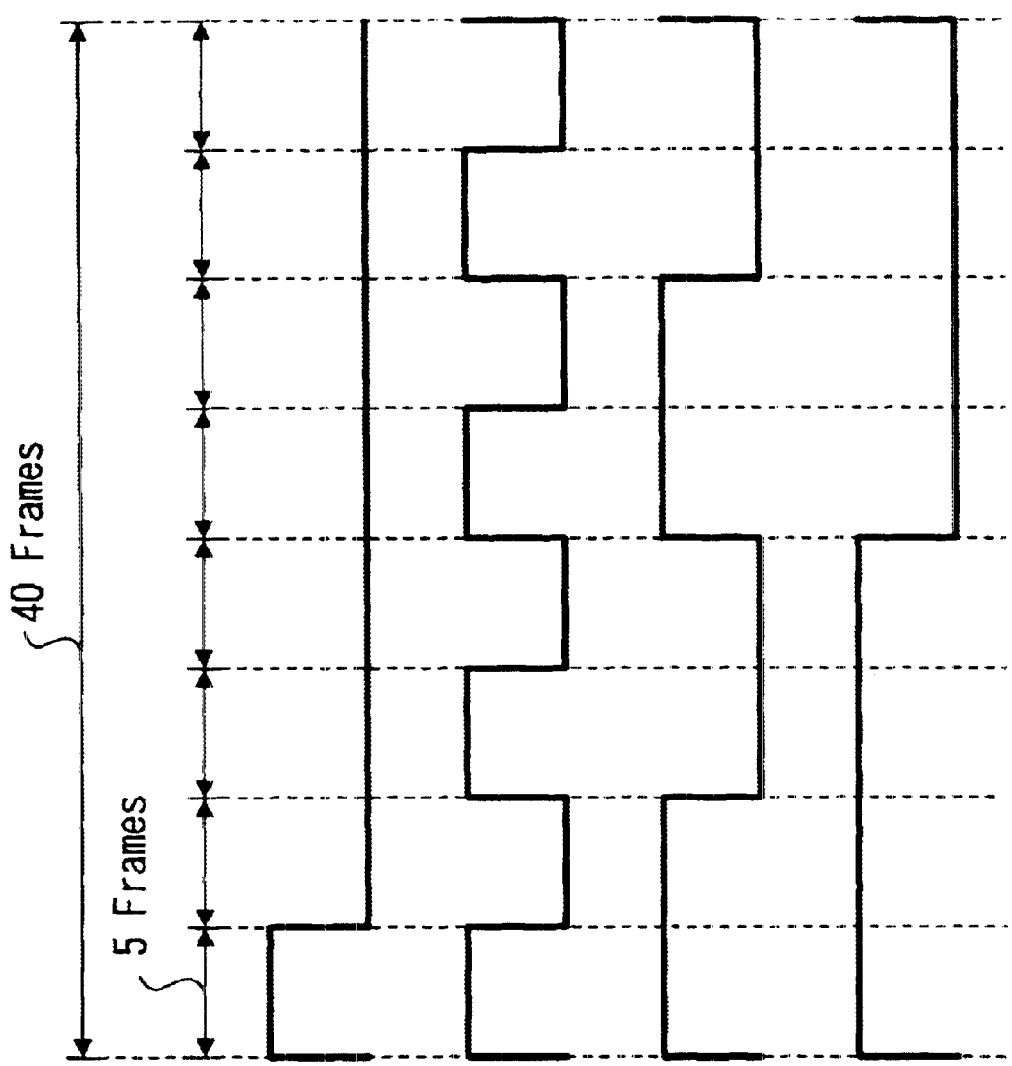
FIG. 10 is a view for describing attribute patterns for transmitting information.

FIG. 10 is a view for describing attribute patterns generated by the duplication control information pattern generation section 106. When the information indicating an attribute pattern from the control section 115 is "10000000" indicating Never Copy, the duplication control information pattern generation section 106 generates the attribute pattern in a 40-frame cycle in which the first block (five frames) constituting the attribute pattern is high level and the following seven blocks (35 frames) thereof are low level as shown in FIG. 10A.

When information indicating an attribute pattern from the control section 115 is "10101010" indicating Copy Once, the duplication control information generation section 106 generates the attribute pattern in a 40-frame cycle in which high and low levels are repeated for every block (five frames), that is, the first block (five frames) constituting the attribute pattern is high level and the second block (five frames) is low level as shown in FIG. 10B.

Further, when information indicating an attribute pattern from the control section 115 is "11001100" indicating No More Copy, the duplication control information generation section 106 generates the attribute pattern in a 40-frame cycle in which the high level and the low level are repeated for every two blocks (ten frames), that is, the first two blocks (ten frames) constituting the attribute pattern are high level and the next two blocks (ten frames) thereof are low level as shown in FIG. 10C.

Moreover, when information indicating an attribute pattern from the control section is "11110000" indicating Never Copy, the duplication control information pattern generation section 106 generates the attribute pattern in a 40-frame cycle in which the first four blocks (20 frames) constituting the attribute pattern are high level and the next four blocks (20 frames) thereof are low level as shown in FIG. 10D.

The first pattern switching section 108 outputs the PN code string PS1 in blocks in which this attribute pattern is high level and does not output the PN code string PS1 in blocks in which the attribute pattern is low level, based on the attribute pattern from the duplication control information pattern generation section 106. In this way, the PN code string PS1 controlled to be superimposed or not superimposed in accordance with the attribute pattern from the duplication control information pattern generation section 106 is supplied to the WM superimposition section 102.

In the second embodiment, the reason for setting the attribute pattern at a pattern in an eight-frame cycle having five frames per block is that further additional information to be described later is eight-bit information and that the data length of the superimposition/non-superimposition pattern for transmitting duplication control information is matched to that of further additional information so as to superimpose the duplication control information and the further additional information on the video signal at the same time with the same frequency.

Meanwhile, the further additional information pattern generation section 107 generates an indication signal indicating the superimposition/non-superimposition of the PN code string 102, that is, indicating that the unit block for controlling the superimposition/non-superimposition of the PN code string PS2 (block at electronic watermark information is superimposed or not superimposed) consists of five frames and that the superimposition cycle consists of 40 frames, based on the further additional information from the control section 115 and the block signal KS from the timing control section 103 as in the case of the duplication control information pattern generation section 106 stated above.

The further additional information mentioned herein is information inputted through the key operating section, which is not shown, in the video signal recording apparatus when the user (operator) of the video signal recording apparatus in the second embodiment executes the recording of the video signal on the DVD.

That is to say, further additional information of eight bits such as "11100110" is supplied from the control section 115 to the further additional information pattern generation section 107. The further additional information pattern generation section 107 expresses each bit of further additional information by one block (five frames) and forms an indication signal indicating that one block (five frames) corresponding to bit "1" of the further additional information is high level and that one block (five frames) corresponding to bit "0" is low level.

If the further additional information is, for example, "11100110" described above, the further additional information pattern generation section 107 forms an indication signal indicating that the first three blocks (15 frames) are high level, the next two blocks (ten frame) are low level, the next two blocks (ten frames) are high level and the last block (five frames) is low level, and supplies the indication signal to the second pattern switching section 109.

The second pattern switching section 109 outputs the PN code string PS2 in blocks in which the indication signal is high level and does not output the PN code string PS2 in blocks in which the indication signal is low level, based on the indication signal from the further information pattern generation section 107 as in the case of the above-stated first pattern switching section 108. In this way, the PN code string PS2 controlled to be superimposed or not superimposed is supplied to the WM superimposition section 102 in accordance with the indication signal from the further additional information pattern generation section 107.

The WM superimposition section 102 is supplied with the spectrum spread signals controlled to be superimposed or not superimposed from the first pattern switching section 108 and the second pattern switching section 109 and superimposes the spectrum spread signals on the video signal supplied through the input terminal 101. In this case, the PN code strings PS1 and PS2 controlled to be superimposed or not superimposed are superimposed on the video signal so as to be superposed on each other at the same time with the same frequency.

Figure 11:
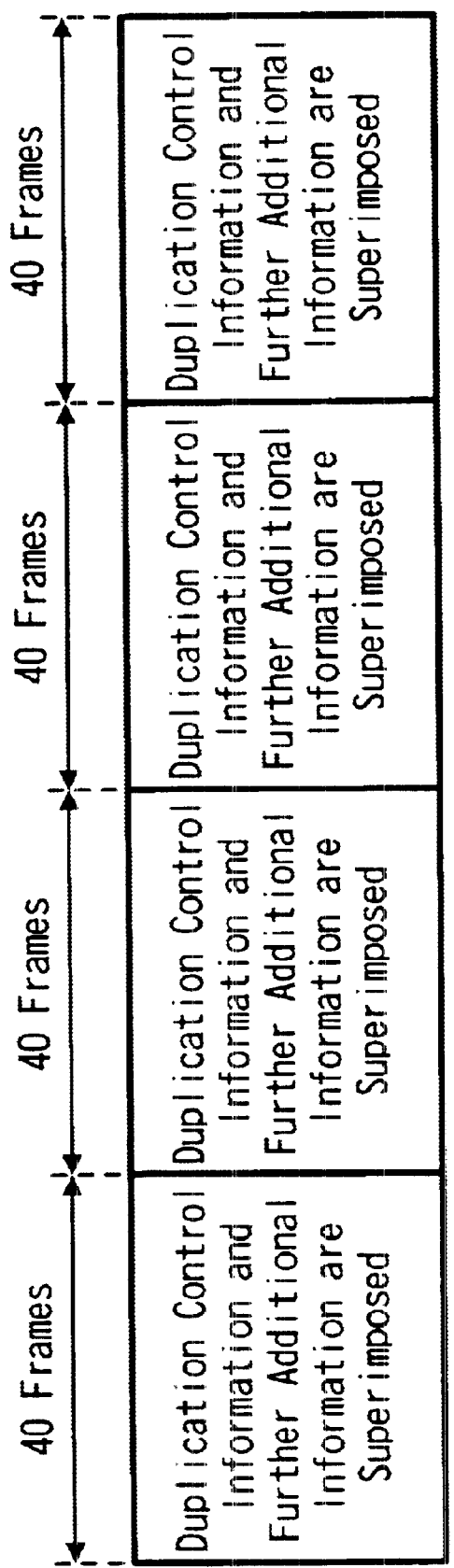
FIG. 11 is a view for describing a state in which duplication control information and further additional information are superimposed on a video signal.

FIG. 11 is a view for describing the duplication control information and the further additional information superimposed on the video signal in the second embodiment. As stated above, one block of the duplication control information consists of five frames and the duplication control information is transmitted by the superimposition/non-superimposition pattern of the PN code string PS1 of a 40-frame cycle (eight blocks). One block of the further additional information consists of five frames and the further additional information is transmitted depending on the superimposition/non-superimposition of the PN code string PS2 in each block in the 40-frame cycle (eight blocks).

These pieces of information are superposed on the video signal at the same time as shown in FIG. 11. Also, as will be described later, the PN code strings PS1 and PS2 are spectrum spread signals and superimposed on the video signal with the same frequency as that of the video signal.

Each of the PN code strings PS1 and PS2 is, however, formed by using different series of PN code strings as stated above. Due to this, by conducting de-spread using the PN code strings PS1 and PS2, it is possible to ensure detecting each of the PN code strings PS1 and PS2 superimposed on the video signal at the same time with the same frequency.

It is noted that the superimposition level of each of the PN code strings PS1 and PS2 supplied to the WM superimposition section 102 is adjusted so as not to deteriorate the video signal on which they are superimposed. In this embodiment, each of the PN code strings PS1 and PS2 is superimposed at a lower level than that of the dynamic range of the video signal.

Thereafter, the video signal on which the PN code string PS1, for transmitting duplication control information, controlled to be superimposed or not superimposed and the PN code string PS2 for transmitting further additional information are superimposed by the WM superimposition section 102 is supplied to the data compression processing section 110.

The data compression processing section 110 compresses the vide signal supplied thereto to the MPEG system. In this embodiment, the data compressed video signal is supplied to the CGMS (Copy Generation Management System) information addition section 111 so as to add the duplication control information of the CGMS to the data compressed video signal.

In the CGMS system, if the video signal is, for example, an analog video signal, two-bit additional information for duplication control is superimposed on the specific one horizontal block within the vertical blanking period of the video signal, and if the video signal is a digital image signal, two-bit additional information for duplication control (to be referred to as "CGMS information" hereinafter) is added to the digital image data and then transmitted.

The CGMS information addition section 111 adds the CGMS information supplied from the CGMS generation section 112 to the data compressed digital video signal. The CGMS information generation section 112 generates CGMS information added to the video signal to be transmitted, based on the control signal from the control section 115. The CGMS information generated by the CGMS information generation section 112 signifies one of "Copy [00]", "Copy Once [10]" and "Never Copy [11]".

The video signal to which the CGMS information is added by the CGMS information addition section 111 is supplied to the encoding section 113. In this embodiment, the encoding section 113 conducts encoding processing of CSS (Contents Scramble System) to the video signal. The encoding processing of the CSS system is a system conducted to an information signal if the information signal such as a video signal is recorded on and provided to a disk medium such as a DVD.

The video signal which has been subjected to encoding processing by the encoding section 113 is supplied to the recording processing section 114. The recording processing section 114 forms a video signal to be recorded on the DVD 100 from the supplied video signal and records the formed video signal on the DVD 100.

By doing so, the video signal on which the duplication control information transmitted according to the superimposition/non-superimposition pattern of the PN code string PS1 and the further additional information consisting of eight-bit information so that one-bit information is expressed by the superimposition/non-superimposition block of the PN code string PS2 are superimposed, is recorded on the DVD 100 and the video signal is provided to the user with the DVD 100 used as a transmission medium.

In this case, even if the PN code strings PS1 and PS2 serving as spectrum spread signals are superimposed on the video signal, the video signal is not deteriorated. Further, the spectrum spread signals superimposed on the video signal are difficult to remove or manipulate. Due to this, it is possible to ensure supplying the spectrum spread signals together with the information signal such as a video signal to the recording apparatus or the reproducing apparatus, and it is possible for the apparatus supplied with the signals to detect the spectrum spread signals to thereby ensure, for example, duplication control or reproduction control.

The video signal recording apparatus in this embodiment transmits the duplication control information by the superimposition/non-superimposition pattern of the spectrum spread signal and transmits the further additional information depending on the superimposition/non-superimposition of the spectrum spread signal for each preset block.

In this way, if using the blocks in which the spectrum spread signals are superimposed on the video signal and those in which the spectrum spread signals are not superimposed thereon and transmitting additional information, the meanings and contents of the spectrum spread signals cannot be discriminated only by detecting the spectrum spread signals.

Therefore, similar to the first embodiment it is not only difficult to simply remove or manipulate the duplication control information and the further additional information superimposed as the spectrum spread signals on the video signal, but also it is possible to ensure providing the additional information together with the video signal with the receiving side such as the reproduction apparatus or the other recording apparatus for the video signal, without easily leaking the meanings or contents of the additional information superimposed on the video signal due to the spectrum spread signals during, for example, transmission.

The reason is that the meanings or contents of the duplication control information and the additional information transmitted by using the spectrum spread signals cannot be discriminated only by detecting the spectrum spread signals superimposed on the video signal.

[Video Signal Reproduction Apparatus]

Figure 12:
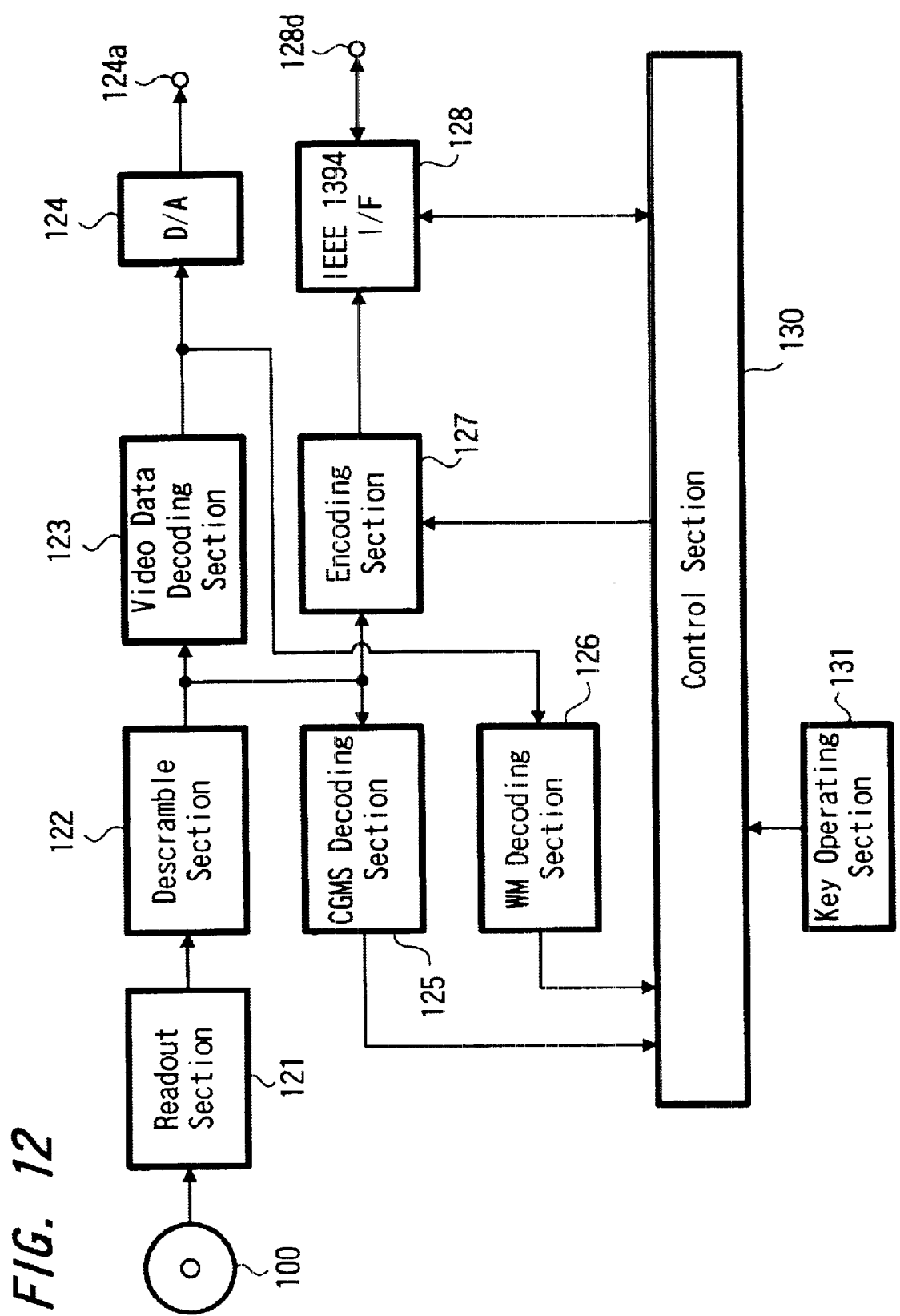
FIG. 12 is a block diagram for describing one embodiment of an information signal processing apparatus according to the present invention.

FIG. 12 is a block diagram for describing a video signal reproduction apparatus in the second embodiment for reproducing and outputting a video signal from a DVD 100 on which the video signal is recorded by the video signal recording apparatus described with reference to FIG. 9.

As described above, the superimposition/non-superimposition pattern of the PN code string PS1 for transmitting the duplication control information and a block group in which the superimposition/non-superimposition of the PN code string PS2 for transmitting further additional information is controlled, are superimposed on the video signal at the same time with the same frequency.

Due to this, in this reproduction apparatus, PN code strings PS1 and PS2 are generated at the same timing in which the PN code strings PS1 and PS2 are superimposed on the video signal, and de-spread is conducted using them as spread codes for de-spread, whereby it is possible to detect the PN code strings PS1 and PS2 and then to detect the superimposition/non-superimposition pattern of the PN code string PS1 for transmitting duplication control information and the further additional information.

During de-spread, however, it is difficult to promptly generate the PN code string PS1 for de-spread from the leading portion of the superimposition/non-superimposition pattern of the PN code string PS1 for transmitting duplication control information and to generate the PN code string PS2 for de-spread from the leading portion of a group of blocks in which the superimposition/non-superimposition of the PN code string PS2 for transmitting further additional information is controlled.

Considering this, in this second embodiment, the superimposition/non-superimposition pattern of the PN code string PS1 for transmitting the duplication control information is discriminated first. When it can be discriminated which duplication control state the superimposition/non-superimposition pattern indicates, it is judged that the PN code strings PS1 and PS2 superimposed on the video signal are synchronized with the de-spread PN code strings PS1 and PS2 to be generated in the video signal reproduction apparatus in the second embodiment, thereby surely detecting the further additional information. The video signal reproduction apparatus in the second embodiment will be described hereinafter.

As shown in FIG. 12, the reproduction apparatus in this embodiment comprises a readout section 121, a descramble section 122, a video data decoding section 123, a D/A converter circuit 124, an analog vide signal output terminal 124a, a CGMS decoding section 125, a WM decoding section 126, an encoding section 127, an IEEE1394 interface 128, a digital video signal output terminal 128d, a control section 130 and a key operating section 131.

If a user gives an instruction to reproduce a video signal recorded on a DVD 100 through the key operating section 131, the readout section 121 reads out the video signal from the DVD 100. The video signal read out by the readout section 121 is supplied to the descramble section 122 and descramble processing for descrambling the scramble of the video signal is conducted.

The descrambled video signal is supplied to the video decoding section 123. Since the descrambled video signal is MPEG-compressed, the video signal is MPEG-decoded and expanded by the video decoding section 123 so as to supply the video signal to, for example, a display monitor device. The MPEG-decoded video signal is supplied to the D/A converter circuit 124 and converted into an analog signal. Thereafter, the analog signal is outputted through the analog video signal output terminal 124a and supplied to, for example, a display monitor device or a recording apparatus.

Also, in this embodiment, the MPEG-compressed video signal from the descramble section 122 can be outputted as a digital signal through an IEEE1394 standard interface bus.

The IEEE1394 compliant interface encodes the transmission digital information so as to prevent illegal duplication. Also the interface verifies whether the output receiving side is a compliant apparatus and verifies the CGMS information and watermark information as duplication control information. In accordance with the verification results, it is determined whether or not a key for decoding the code is transmitted to the output receiving side. This communication control system is referred to as an IEEE 1394 secure bus and the digital interface can effectively prevent duplication.

The video signal outputted from the descramble section 122 is supplied to the CGMS decoding section 125 and CGMS information added to the video signal is extracted. The CGMS information is extracted as two-bit information at a specified position separated from video data by the CGMS information decoding section 125 and the two-bit information is supplied to the control section 130.

Further, the video signal which has been MPEG-decoded by the video data decoding section 123 is supplied to the electronic watermark information decoding section (to be referred to as "WM decoding section" hereinafter) 126, and the spectrum spread signals as electronic watermark information added to this video signal or, in the second embodiment, the PN code string PS1 and the PN code string PS2 superimposed in the above-stated video signal recording apparatus are detected, respectively.

Thereafter, the duplication control information indicated by the superimposition/non-superimposition pattern of the PN code string PS1 which is a spectrum spread signal for transmitting the duplication control information is discriminated and, at the same time, eight-bit further additional information is detected in accordance with the superimposition/non-superimposition blocks of the PN code string PS2 which is a spectrum spread signal for transmitting the further additional information.

Figure 13:
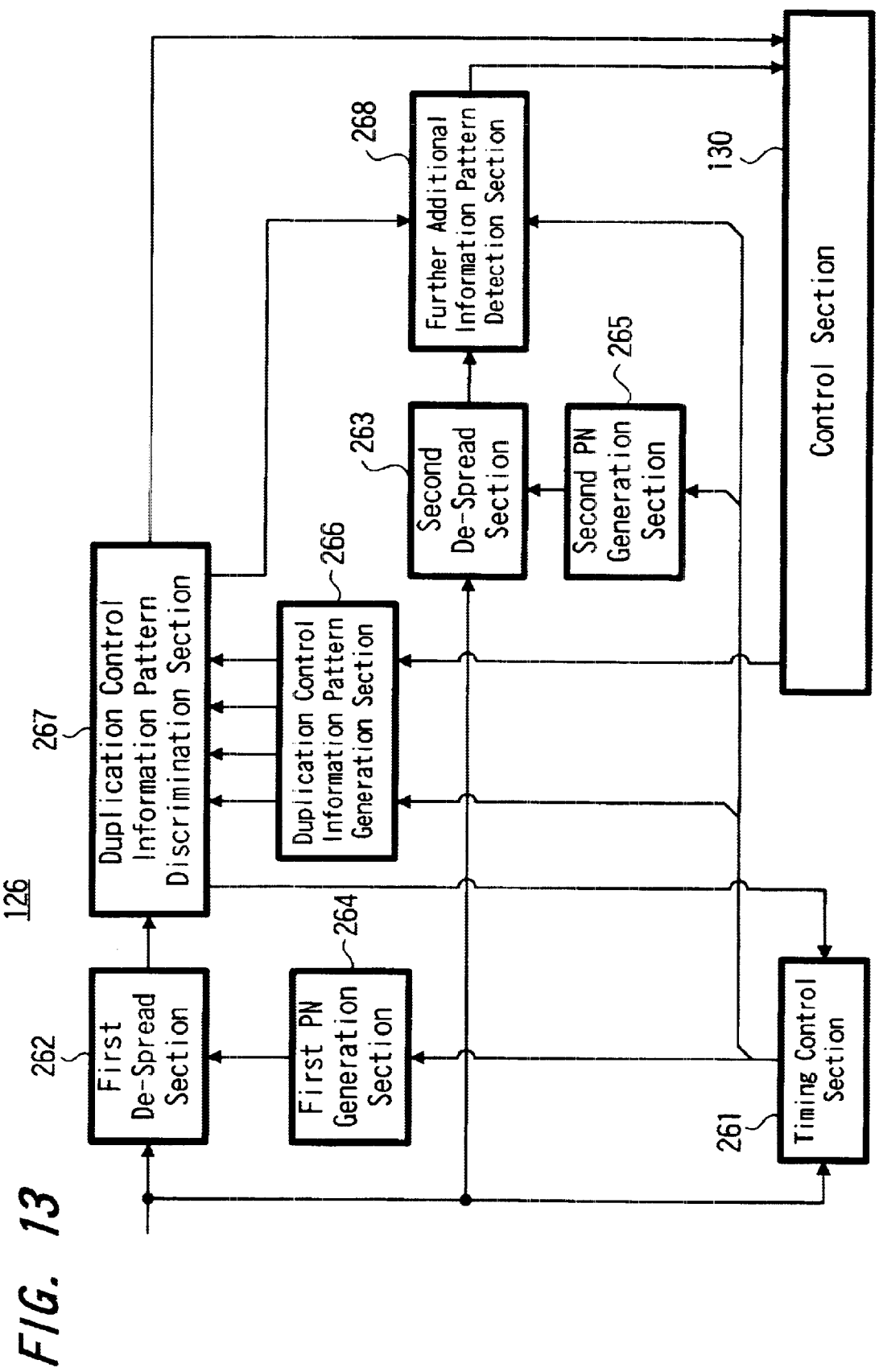
FIG. 13 is a view for describing a WM decoding section 26 shown in FIG. 12.

FIG. 13 is a block diagram for describing the WM decoding section 126. As shown in FIG. 13, the WM decoding section 126 in this embodiment comprises a timing control section 261, the first de-spread section 262, the second de-spread section 263, the first PN generation section 264, the second PN generation section 265, a duplication control information pattern generation section 266, a duplication control information pattern discrimination section 267 and a further additional information pattern detection section 268 in this embodiment. The timing control section 261 of the WM decoding section 126 is constituted in the same manner as the timing control section 103 of the authoring apparatus described above with reference to FIG. 9 and comprises a synchronism detection circuit and a PLL circuit.

Then, the MPEG-decoded video signal from the video data decoding section 123 is supplied to the timing control section 261, the first de-spread section 262 and the second de-spread section 263 as shown in FIG. 13. The timing control section 261 detects a vertical synchronizing timing signal V and a horizontal synchronizing timing signal H from the supplied video signal. Using the detected vertical synchronizing timing signal V and the horizontal synchronizing timing signal H as reference signals, various timing signals such as a reset signal RE, an enable signal EN, a block signal KS indicating superimposition/non-superimposition blocks and a PN clock signal PNCLK are formed.

That is to say, the timing control section 261 forms the respective signals for providing the inputted video signal with the same timing as that of the reset signal RE, the enable signal EN, the block signal KS and the PN clock signal PNCLK used in the video signal recording apparatus described above with reference to FIG. 9.

In the reproduction apparatus in this embodiment, therefore, the reset signal RE is a signal in a five-frame cycle and the enable signal EN is a signal for generating a de-spread PN code string for the video signal at any frame. The block signal KS is a signal having blocks consisting of five frames, respectively. The PN clock signal PNCLK is a signal for providing the same timing as that of the PN clock signal PNCLK used when generating PN code strings in the video signal recording apparatus shown in FIG. 9.

The reset signal RE, the enable signal EN and the PN clock signal PNCLK formed by the timing control section 261 are supplied to the first PN generation section 264 and the second PN generation section 265, and the block signal KS is supplied to the duplication control information pattern generation section 266 and the further additional information pattern generation section 268.

The first PN generation section 264 is constituted in the same manner as the first PN generation section 104 of the above-stated video signal recording apparatus and the second PN generation section 265 is constituted in the same manner as the second PN generation section 105 of the above-stated video signal recording apparatus. The first PN generation section 264 generates a de-spread PN code string PS1 having the same series as that of the PN code string PS1 as the spectrum spread signal at the same timing as the timing in which the PN code string PS1 as the spectrum spread signal is generated, for the video signal based on the timing signal from the timing control section 261 and supplies the de-spread PN code string PS1 to the first de-spread section 262.

Likewise, the second PN generation section 265 generates a de-spread PN code string PS2 having the same series as that of the PN code string PS2 as the spectrum spread signal at the same timing as the timing in which the PN code string PS2 as the spectrum spread signal is generated, for the video signal based on the timing signal from the timing control section 261 and supplies the de-spread PN code string PS2 to the second de-spread section 263.

The first de-spread section 262 conducts de-spread using the de-spread PN code string PS1 from the first PN generation section 264 and supplies the detection output to the duplication control information pattern discrimination section 267. In the second embodiment, as already described above, the PN code string PS1, which is reset for every frame and has blocks each consisting of five frames, is superimposed as a spectrum spread signal for transmitting duplication control information on the video signal read out from the DVD 100 synchronously with the vertical synchronizing timing signal in a preset superimposition/non-superimposition pattern.

Due to this, if de-spread is conducted while using the PN code string PS1 reset for every frame as a de-spread spread signal synchronously with the vertical synchronizing timing signal as stated above, the de-spread detection output to the blocks in which the PN code string PS1 is superimposed turns into a high level signal and the de-spread detection output to the blocks in which the PN code string PS1 is not superimposed turns into a low level signal. It is, therefore, possible to discriminate the blocks in which the PN code string PS1 is superimposed from those in which the PN code string PS1 is not superimposed in accordance with the level of the de-spread detection output from the first de-spread section 262.

In addition, the second de-spread section 263 conducts de-spread while using a de-spread PN code string PS2 from the second PN generation section 265 and supplies the detection output to the further additional information pattern detection section 268. In the second embodiment, the PN code string PS2 which is reset for every frame and has blocks each consisting of five frames, is superimposed on the video signal read out from the DVD 100 synchronously with the vertical synchronizing timing signal so as to discriminate the blocks in which the PN code string PS2 is superimposed from those in which the PN code string PS2 is not superimposed, as already described above.

Due to this, in the second de-spread section 263, as in the case of the above-stated first de-spread section 262, if de-spread is conducted while using the PN code string PS2 reset for every frame as a de-spread spread signal synchronously with the vertical synchronizing timing signal as stated above, high level detection outputs in the blocks in which the PN code string PS2 is superimposed and low level detection outputs in the blocks in which the PN code string PS2 is not superimposed are obtained and the detection outputs are supplied to the further additional information pattern detection section 268.

Furthermore, the duplication control information pattern discrimination section 267 supplied with the detection outputs from the first de-spread section 262 is supplied with pattern information for discriminating the superimposition/non-superimposition pattern of the PN code string PS1 from the duplication control pattern generation section 266.

Namely, the duplication control information pattern generation section 266 forms pattern information for discriminating the superimposition/non-superimposition pattern of the PN code string PS1 based on information from the control section 130 and the block signal KS from the timing control section 261 and supplies the formed pattern information to the duplication control information pattern discrimination section 267.

In this case, the information supplied to the duplication control information pattern generation section 266 from the control section 130 is the same eight-bit information as the information for indicating an attribute pattern supplied to the duplication control information pattern generation section 106 from the control 115 in the video signal recording apparatus.

That is to say, in this second embodiment, "10000000" which is information corresponding to an attribute pattern indicating Never Copy, "10101010" which is information corresponding to an attribute pattern indicating Copy Once, "11001100" which is information corresponding to an attribute pattern indicating No More Copy and "11110000" which is information indicating an attribute pattern indicating Copy Free are supplied from the control section 130 to the duplication control information pattern generation section 266.

Then, the duplication control information pattern generation section 266 forms the attribute pattern indicating Never Copy (FIG. 10A), that indicating Copy Once (FIG. 10B), that indicating No More Copy (FIG. 10C) and that indicating Copy Free (FIG. 10D) as already stated with reference to FIG. 10, and supplies them as pattern information for discriminating the superimposition/non-superimposition pattern of the PN code string PS1 to the duplication control information pattern discrimination section 267.

The duplication control information pattern discrimination section 267 compares the detection output from the first de-spread section with the attribute patterns from the duplication control information pattern generation section 266, discriminates an attribute pattern coincident with the superimposition/non-superimposition pattern of the PN code string PS1, determines which duplication control state the discriminated attribute pattern indicates and supplies the determination result to the control section 130.

If the attribute pattern coincident with the superimposition/non-superimposition pattern of the PN code string PS1 indicates, for example, Never Copy, Copy Once, No More Copy and Copy Free, information indicating the determination results of "11", "01", "10" and "00" are supplied to the control section 130, respectively. The information indicating these determination results are set according to the respective attribute patterns and managed by the duplication control information pattern discrimination section 267.

If the duplication control information pattern discrimination section 267 discriminates an attribute pattern coincident with the superimposition/non-superimposition pattern of the PN code string PS1 superimposed on the video signal, it notifies the further additional information pattern detection section 268 that the attribute pattern has been discriminated. By doing so, the further additional information pattern detection section 268 detects that the repetition cycle of the superimposition/non-superimposition pattern of the PN code string PS1 for transmitting duplication control information superimposed on the video signal and the duplication cycle of the PN code string PS2 for transmitting further additional information are synchronized with the repetition cycle of the superimposition/non-superimposition pattern of the PN code string PS1 formed by the video signal reproduction apparatus and the superimposition cycle of the PN code string PS2.

If the duplication control information pattern discrimination section 267 cannot discriminate an attribute pattern coincident with the superimposition/non-superimposition pattern of the PN code string PS1 superimposed on the video signal even after discriminating pattern throughout the 40 frames with one block of the superimposition/non-superimposition of the spectrum spread signal set at five frames, then the duplication control information pattern discrimination section 267 notifies the timing control section 261 that the attribute pattern has not been discriminated.

In this case, the timing control section 261 shifts the block signal KS by one frame and shifts the repetition cycle of the superimposition/non-superimposition pattern of the PN code string PS1 and the superimposition.cycle of the PN code string PS2, thereby synchronizing the repetition cycle of the superimposition/non-superimposition pattern of the PN code string PS1 and the superimposition cycle of the PN code string PS2 for transmitting the further additional information with the repetition cycle of the superimposition/non-superimposition pattern of the PN code string PS1 formed by this video signal reproduction apparatus and the superimposition cycle of the PN code string PS2.

Then, if the further additional information pattern discrimination section 268 detects that the repetition cycle of the superimposition/non-superimposition pattern of the PN code string PS1 and the superimposition cycle of the PN code string PS2 are synchronized with the repetition cycle of the superimposition/non-superimposition pattern of the PN code string PS1 formed in this video signal reproduction apparatus and the superimposition cycle of the PN code string PS2 based on the information from the duplication control information pattern discrimination section 267 as stated above, it detects the blocks of superimposition/non-superimposition of the PN code string PS2 based on the detection output from the second de-spread section 263 and the block signal KS from the timing control section 261, expresses the respective blocks as one-bit information and supplies them to the control section 130.

That is to say, if the further additional information pattern discrimination section 268 detects a block (five frames) in which the PN code string PS2 is superimposed, "1" is supplied to the control section 130, and if it detects a block (five frames) in which the PN code string PS2 is not superimposed, "0" is supplied to the control section 130. As a result, the control 130 is supplied with eight-bit further additional information having blocks each consisting of five frames and expressed by eight blocks (40 frames).

Consequently, the control section 130 can obtain the duplication control information transmitted by the superimposition/non-superimposition pattern of the PN code string PS1 and the further additional information of a total of eight bits in which one-bit information is expressed by a block of the superimposition/non-superimposition of the PN code string PS2.

The control section 130 is also supplied with the CGMS information from the CGMS decoding section 125 as already stated above. The control section 130 then determines whether or not an encoding key for decoding the encoded video signal outputted through the IEEE1394 interface 128 in view of the CGMS information from the CGMS decoding section and the duplication control information from the WM decoding section 126.

That is, as shown in FIG. 12, the output data of the descramble section 122 is also supplied to the encoding section 127, where encoding based on different encoding keys according to communications is conducted under the control of the control section 130. The encoded data from the encoding section 127 is supplied to an electronic equipment to which the data is outputted through the IEEE1394 interface 128 and through the output terminal 128*d*. The IEEE1394 interface 128 converts the data so as to comply with the interface standard and outputs the data.

At this moment, the control section 130 communicates with the equipment to which the data is outputted through the IEEE1394 interface 128, discriminates whether the equipment is a compliant apparatus and discriminates, if it is a compliant apparatus, whether or not the equipment is a recording apparatus.

The control section 130 determines whether or not encoding key information for decoding encoded data at the encoding section 127 is transmitted to the side to which the data is outputted, using the CGMS information from the CGMS decoding section 125, the duplication control information from the WM decoding section 126 and the discrimination information on the equipment to which the data is outputted through the IEEE1394 interface 128.

If the side to which the data is outputted is, for example, a non-compliant apparatus, the encoding key information is not fed to the apparatus. Even if the side to which the data is outputted is a compliant apparatus, the encoding key information is not fed to the apparatus when the apparatus is a recording apparatus and the CGMS information is [11] indicating "Never Copy" or the duplication control information from the WM decoding section 126 indicates "Never Copy".

Further, this video signal reproduction apparatus can also detect and utilize further additional information, such as copyright information, superimposed on the video signal. For example, by superimposing, on the video signal, information for specifying a contents provider formally permitted to provide the video signal as further additional information, it is possible to discriminate whether or not the contents provider providing the video signal is a formal provider of the video signal by detecting the further additional information even if the contents provider illegally duplicates the video signal on a DVD and sells the DVD while falsely stating that this DVD was formally formed. In that case, the further additional information can be used for revealing parties involved in the illegal duplication of video signals.

As stated above, in this second embodiment, duplication control information and further additional information can be superimposed on a video signal as spectrum spread signals at the same time with the same frequency and can be transmitted. The duplication control information is transmitted by the superimposition/non-superimposition pattern of a spectrum spread signal. As for the further additional information, the unit block of the superimposition/non-superimposition of a spectrum spread signal or, in the second embodiment, a block of five consecutive frames expresses one-bit information depending on the superimposition/non-superimposition of the spectrum spread signal and the further additional information of a plurality of bits can be transmitted.

Since the spectrum spread signal is superimposed on the video signal at the same time with the same frequency, it is difficult to remove or manipulate the signal and detection can be made relatively easily and accurately. As described above, however, duplication control information is transmitted according to the superimposition/non-superimposition pattern of the spectrum spread signal and further additional information is transmitted depending on the superimposition/non-superimposition of the spectrum spread signal for every preset block.

Owing to this, even if the spectrum spread signals are simply detected, the meanings and contents thereof cannot be discriminated. Thus, it is possible to accurately superimpose the duplication control information and further additional information on the video signal and transmit them while the duplication control information and further additional information superimposed on the video signal are not known during the transmission of the video signal.

Furthermore, if the duplication control information and further additional information superimposed on the video signal are to be removed or manipulated, such actions must be taken for every superimposition/non-superimposition pattern for transmitting the duplication control information and for a plurality of blocks constituting one piece of further additional information, whereby resistance against the illegal actions such as the removal or manipulation of data can be improved. In other words, the reliability of the duplication control information and further additional information superimposed on the video signal by means of spectrum spread signals can be enhanced.

In this second embodiment, the duplication control information is transmitted by the superimposition/non-superimposition pattern of the spectrum spread signal and the further additional information is transmitted such that blocks of the superimposition/non-superimposition of the spectrum spread signal express one-bit information, respectively. It is, however, possible to transmit information by the reversal/non-reversal of the spectrum spread signals between blocks in which the spectrum spread signals are superimposed as they are and those in which the spectrum spread signals are superimposed with phases thereof reversed instead of transmitting information by the superimposition/non-superimposition of the spectrum spread signals.

For example, based on the information corresponding to attribute patterns each consisting of eight-bit information stated above, among the eight-bit information corresponding to those attribute patterns, in case of information at bit "1", the spectrum spread signal is superimposed and incase of information at bit "0", a spectrum spread signal is superimposed with its phase reversed.

By doing so, an attribute pattern is expressed according to the reversal/non-reversal pattern of the spectrum spread signal and the duplication control information is transmitted by the reversal/non-reversal pattern of this spectrum spread signal.

Likewise, as for the further additional information, among eight-bit information constituting the further additional information, in the block corresponding to information at bit "1", the spectrum spread signal is superimposed as it is and in the block corresponding to information at bit "0", the spectrum spread is superimposed with its phase reversed. One-bit information is expressed by the block of reversal/non-reversal of the spectrum spread signal, thereby making it possible to transmit the further additional information.

In this way, in case of transmitting information by the reversal/non-reversal of the spectrum spread signals superimposed on the video signal, the reversal/non-reversal of the spectrum spread signals may be controlled by the first pattern switching section 108 and the first pattern switching section 109 of the video signal information recording apparatus stated above with reference to FIG. 9, based on the pattern information from the duplication control information pattern generation section 106 and the further additional information pattern generation section 107.

Furthermore, in the video signal reproduction apparatus shown in FIG. 12 for discriminating the blocks of the reversal/non-reversal of the spectrum spread signals superimposed on the video signal, the detection outputs from the first de-spread section 262 and the second de-spread section 263 of the WM decoding section 126 are positive (+) in non-reversal blocks and negative (−) in reversal blocks. Thus, based on these codes of the detection outputs, it is possible to discriminate the blocks of the reversal/non-reversal of the spectrum spread signals.

As can be seen from the above, if there are the blocks in which the spectrum spread signals are superimposed on the video signal without changing their phases and those in which the spectrum spread signals are superimposed on the video signal with their phases reversed, it is possible to increase the difference in the levels of the spectrum spread signals between the blocks in which the spectrum spread signals are superimposed without changing their phases and those in which the spectrum spread signals are superimposed with their phases reversed, compared with a case of the superimposition/non-superimposition of the spectrum spread signals.

Thus, if the reversal/non-reversal of the spectrum spread signals are made, it is possible to decrease the influence of the video signal on the spectrum spread signals superimposed on the video signal and, therefore, to ensure transmitting and detecting the spectrum spread signals.

Second Embodiment
[Video Signal Recording Apparatus]

Figure 14:
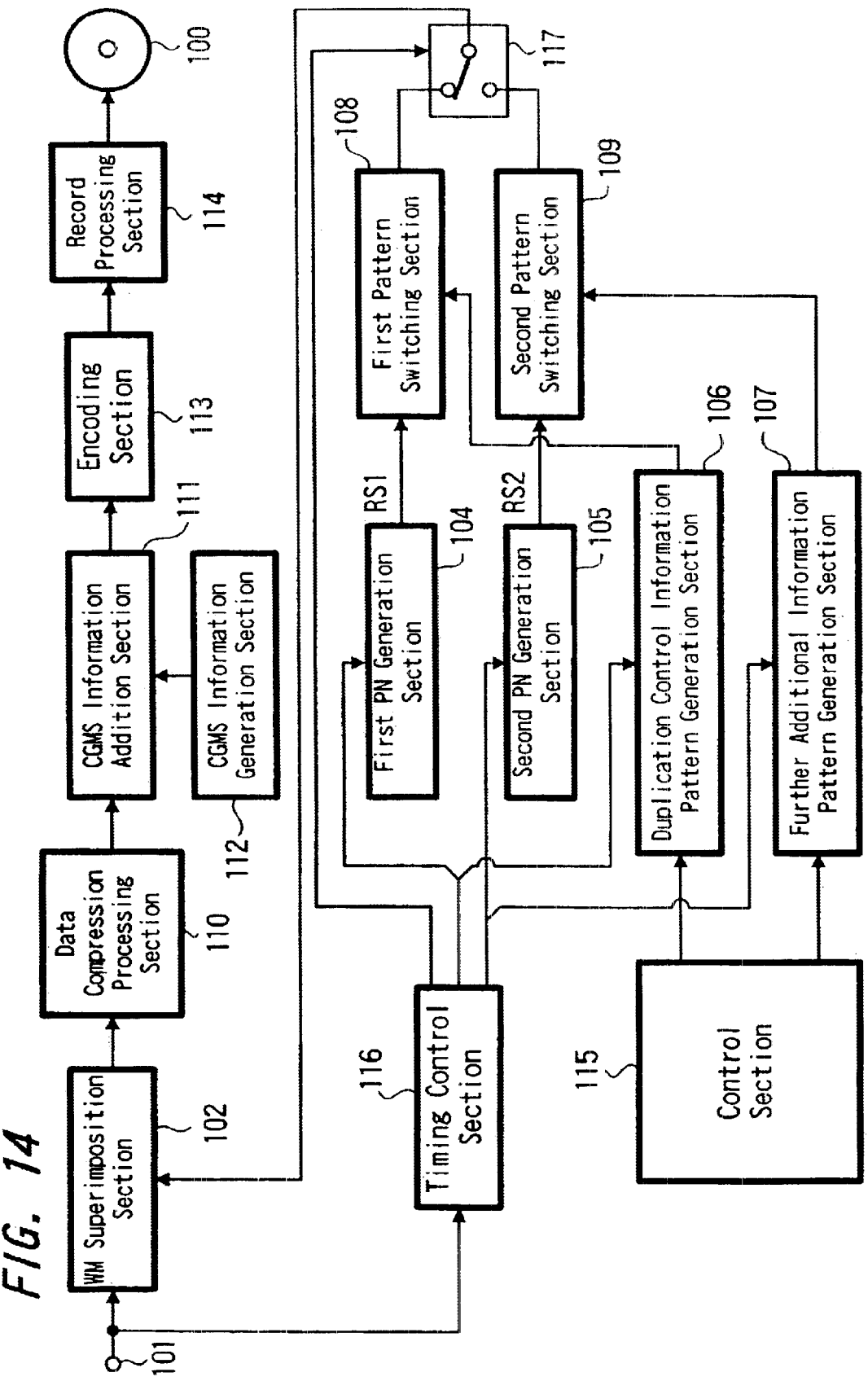
FIG. 14 is a block diagram for describing another embodiment of an information signal output apparatus according to the present invention.

FIG. 14 is a block diagram for describing a video signal recording apparatus in the third embodiment. The video signal recording apparatus in the third embodiment records a video signal on a DVD 100 as in the case of the video signal recording apparatus in the third embodiment.

Figure 15:
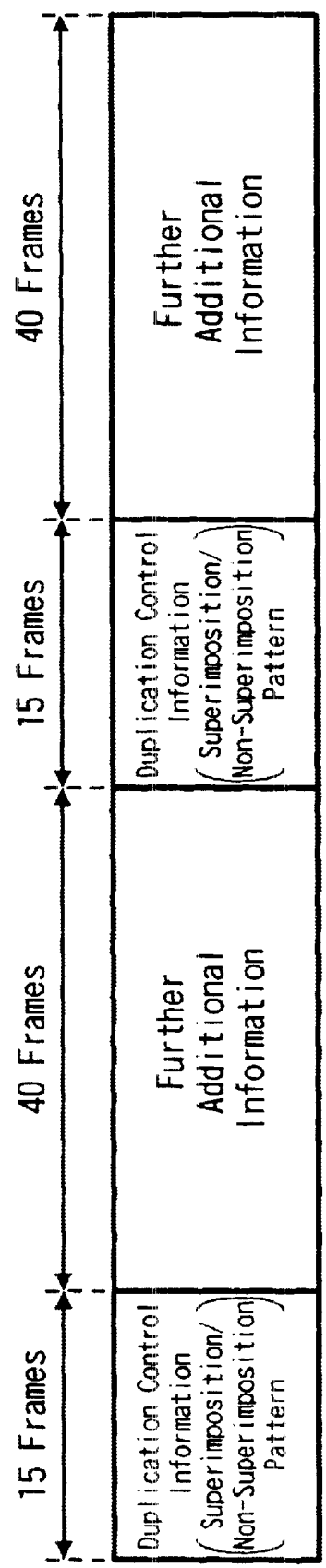
FIG. 15 is a view for describing a state in which duplication control information and further additional information are superimposed on a video signal.

While the above-stated video signal recording apparatus in the second embodiment transmits a spectrum spread signal for transmitting duplication control information and a spectrum spread signal for transmitting further additional information so as to be superposed at the same time with the same frequency as shown in FIG. 11, the video signal recording apparatus in the second embodiment transmits a spectrum spread signal for transmitting duplication control information and a spectrum spread signal for transmitting further additional information such that they are alternately superimposed on the video signal in a time division manner as shown in FIG. 15.

The video signal recording apparatus in the third embodiment will be described hereinafter. The video signal recording apparatus in the second embodiment differs from that in the second embodiment in a timing control section 116 and a switching circuit 17. The remaining elements in the second embodiment are constituted in the same manner as those of the video signal recording apparatus shown in FIG. 9. Owing to this, in the second video signal recording apparatus shown in FIG. 14, the elements constituted in the same manner as those of the video signal recording apparatus in the second embodiment described above with reference to FIG. 9 are denoted by the same reference symbols and the detailed description thereof will not be given herein.

The video signal recording apparatus in the third embodiment, as in the case of the above-stated video signal recording apparatus in the second embodiment, transmits duplication control information by the superimposition/non-superimposition pattern of a spectrum spread signal and also transmits further additional information utilizing the superimposition/non-superimposition blocks of a spectrum spread signal.

In this case, in the video signal recording apparatus in the third embodiment, the superimposition/non-superimposition pattern of a spectrum spread signal for transmitting duplication control information and a block group consisting of a plurality of blocks in which the superimposition/non-superimposition of a spectrum spread signal for transmitting further additional information is controlled, are alternately superimposed on a video signal as shown in FIG. 8.

In this third embodiment, if one superimposition/non-superimposition block of a spectrum spread signal consists of five frames, duplication control information is transmitted by the superimposition/non-superimposition pattern of three blocks (15 frames). Further, further additional information is eight-bit information in this second embodiment as in the case of the second embodiment, one block consists of five frames and the further additional information is transmitted by eight blocks (40 frames).

Unlike the above-stated second embodiment, the duplication control information can be expressed by the superimposition/non-superimposition pattern of three blocks. This is because the superimposition/non-superimposition pattern for transmitting the duplication control information and the block group for transmitting the further additional information are not superimposed on the video signal at the same time and the data lengths need not be, therefore, matched with each other.

The timing control section 116 in this embodiment detects a vertical synchronizing timing signal V detected from the video signal supplied through an input terminal 101 and a horizontal synchronizing timing signal H. Using the vertical synchronizing timing signal V and the horizontal synchronizing timing signal H as reference signals, the timing control section 16 forms a reset signal RE, a block signal KS and a PN clock signal PNCLK and also forms an enable signal EN1 for the first PN code generation section 104, an enable signal EN2 for the second PN code generation section 105 and a switching timing signal TS indicating switching timing for switching the superimposition/non-superimposition pattern of the spectrum spread signal for transmitting the duplication control information to/from the block group for transmitting the further additional information.

Here, the enable signal EN1 for the first PN code generation section 104 is a signal for turning the first PN generation section 104 and a duplication control information section 106 into an operable state only in the superimposition blocks of the superimposition/non-superimposition pattern of the spectrum spread signal for transmitting the duplication control information, and, in this second embodiment, the enable signal EN1 is a signal for operating the first PN generation section 104 and the duplication control information pattern generation section 106 in 15 frames at 40 frames' intervals.

In the third embodiment, the duplication control information and the further additional information are alternately superimposed on the video signal in this order. Due to this, the enable signal EN1 makes the first PN generation section 104 operable in the leading 15 frames of the video signal recorded on the DVD and, thereafter, makes the first PN generation section 104 operable in 15 frames at 40 frames' intervals.

Further, the enable signal EN2 for the second PN code generation section 105 is a signal for turning the second PN generation section 105 and the further additional information pattern generation section 107 into an operable state only in the superimposition blocks of the block group for transmitting the further additional information, and, in this third embodiment, the enable signal EN2 is a signal for operating the second PN generation section 105 and the further additional information pattern generation section 107 in 40 frames at 15 frames' intervals.

The reset signal RE, the enable signal EN1 and the clock signal PNCLK are supplied to the first PN code generation section 104, whereas the reset signal RE, the enable signal EN2 and the clock signal PNCLK are supplied to the second PN code generation section 105. In addition, the enable signal EN1 and the block signal KS are supplied to the duplication control information pattern generation section 106, whereas the enable signal EN2 and the block signal KS are supplied to the further additional information pattern generation section 107.

By doing so, the first PN generation section 104 generates a PN code string PS1 reset per frame only in the superimposition blocks of the superimposition/non-superimposition pattern and supplies the PN code string PS1 to the first pattern switching section 108. The second PN code generation section 105 generates a PN code string PS2 reset per frame only in the superimposition blocks of the block group for transmitting the further additional information and supplies the PN code string PS2 to the second pattern switching section 109.

Meanwhile, in the second embodiment, in the duplication control information pattern generation section 108, if the superimposition of a spectrum spread signal is represented by "1" and the non-superimposition thereof is represented by "0", attribute patterns corresponding to four duplication control states are preset as follows.

Namely, in the second embodiment, an attribute pattern indicating Never Copy is "100" and that indicating Copy Once is "101". An attribute pattern indicating No More Copy is "110" and that indicating Copy Free is "010".

Three-bit information corresponding to such attribute patterns are supplied to the duplication control information pattern generation section 106 from the control section 115 as information indicating the attribute patterns.

The duplication control information pattern generation section 106 generates an attribute pattern for determining the superimposition/non-superimposition pattern of the PN code string PS1 having blocks each consisting of five frames and having a repetition cycle of three blocks (15 frames) only in the superimposition blocks of the superimposition/non-superimposition pattern based on the information indicating the attribute pattern from the control section 115, the enable signal EN1 from the timing control section 16 and the block signal KS, and supplies the attribute pattern to the first pattern switching section 108.

Figure 16:
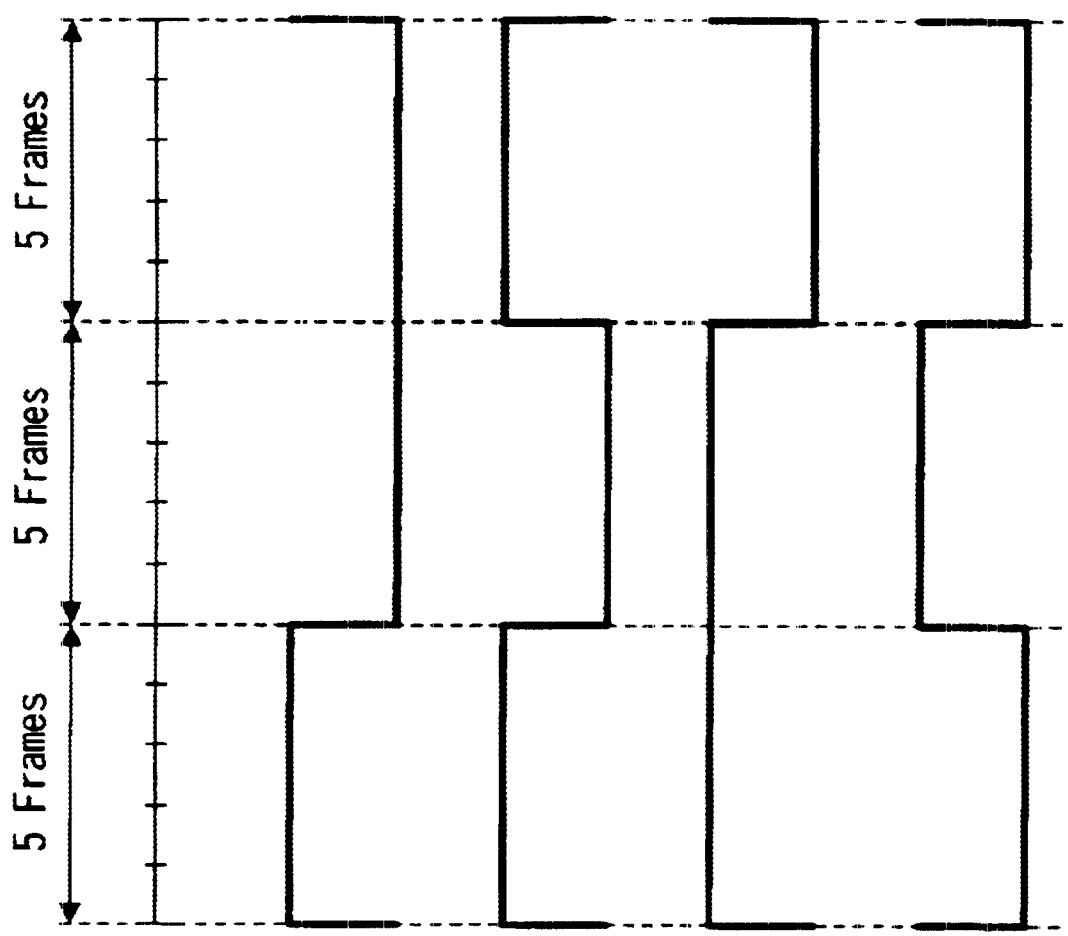
FIG. 16 is a view for describing attribute patterns for transmitting information.

FIG. 16 is a view for describing attribute patterns generated by the duplication control information pattern generation section 106. When the information indicating an attribute pattern from the control section 115 is "100" showing Never Copy, the duplication control information pattern generation section 106 generates an attribute pattern in a 15-frame cycle in which the first one block (five frames) constituting the attribute pattern is a high level and the following two blocks (ten frames) thereof are low levels as shown in FIG. 16A.

When the information indicating an attribute pattern from the control section 115 is "101" showing Copy Once, the duplication control information pattern generation section 106 generates an attribute pattern in a 15-frame cycle in which the first one block (five frames) constituting the attribute pattern is high level, the next one block (five frames) is a low level and the next one block (five frames) is a high level as shown in FIG. 16B.

When the information indicating an attribute pattern from the control section 115 is "110" showing Never Copy, the duplication control information pattern generation section 106 generates an attribute pattern in a 15-frame cycle in which the first two blocks (ten frames) constituting the attribute pattern are high levels and the next one block (five frames) is a low level as shown in FIG. 16C.

When the information indicating an attribute pattern from the control section 115 is "010" showing Copy Free, the duplication control information pattern generation section 106 generates an attribute pattern in a 15-frame cycle in which the first one block (five frames) constituting the attribute pattern is a low level, the next one block (five frames) is a high level and the next one block (five frames) is a low level as shown in FIG. 16D.

The first pattern switching section 108 switches operation such that it outputs a PN code string PS1 in a block in which this attribute pattern is a high level and that it does not output the PN code string PS1 in a block in which the attribute pattern is a low level, based on the attribute pattern from the duplication control information pattern generation section 106. By doing so, the superimposition/non-superimposition pattern of the PN code string PS1 is formed in accordance with the attribute pattern and is supplied to one of input terminals of the switching circuit 117.

Meanwhile, the further additional information pattern generation section 107 forms an indication signal indicating the superimposition/non-superimposition of a PN code string 102 having a superimposition cycle of 40 frames in which the unit block (superimposition/non-superimposition block of electronic watermark information) for controlling the superimposition/non-superimposition of the PN code string PS2 consists of five frames, only in the superimposition blocks of the block group for transmitting the further additional information, based on the further additional information from the control section 115 and the block signal KS from the timing control section 103.

Then, the further additional information pattern generation section 117 forms an indication signal which is a high level in one block (five frames) corresponding to bit "1" of the further additional information and is a low level in one block (five frames) corresponding to bit "0", in accordance with the further additional information from the control section 115 only in the superimposition blocks of the block group for transmitting the further additional information indicated by the enable signal EN2.

The second pattern switching section 109 switches operation such that it outputs a PN code string PS2 in a block in which this indication signal is a high level and that it does not output the PN code string PS2 in a block in which the indication signal is a low level, based on the indication signal from the further additional information pattern generation section 117. By doing so, the PN code string PS2 controlled to be superimposed or not superimposed is supplied to the other input terminal of the switching circuit 117 in accordance with the indication signal corresponding to the further additional information.

The switching circuit 117 is switched to output the superimposition/non-superimposition pattern of the PN code string PS1 from the first pattern switching section 108 in superimposition blocks of the superimposition/non-superimposition pattern and to output the PN code string PS2 controlled to be superimposed or not superimposed for every block (five frames) from the second pattern switching section 109 by the switching timing signal TS from the timing control section 116.

As a result, the WM superimposition section 102 is supplied with the superimposition/non-superimposition pattern of the PN code string PS1 from the first pattern switching section 108 in the superimposition blocks of the superimposition/non-superimposition pattern and supplied with the PN code string PS2 controlled to be superimposed or not superimposed for every block (five frames) from the second pattern switching section 109 for transmitting the further additional information in the superimposition blocks of the block group for transmitting the further additional information.

Due to this, the WM superimposition section 102 are alternately supplied with the superimposition/non-superimposition pattern covering three blocks (15 frames) of the PN code string PS1 for transmitting the duplication control information and the PN code string PS2 covering eight blocks (40 frames) controlled to be superimposed or not superimposed for every block for transmitting the further additional information. As shown in FIG. 15, these PN code strings are alternately superimposed on the video signal supplied through the input terminal 101.

As can be seen from the above, the video signal recording apparatus in the third embodiment, as in the case of the second embodiment, can transmit duplication control information by the superimposition/non-superimposition pattern of a spectrum signal and can transmit further additional information depending on the superimposition/non-superimposition of a spectrum spread signal for every preset block.

In this case, too, the meanings and contents of the duplication control information and the further additional information transmitted by means of the spectrum spread signals cannot be discriminated by simply detecting the spectrum spread signals superimposed on the video signal. Thus, the apparatus in this embodiment is designed to ensure that the duplication control information and the further additional information can be provided to the other side.

Next, description will be given to a video signal reproduction apparatus in the third embodiment for reproducing and outputting a video signal from a DVD 100 on which the video signal is recorded by the video signal recording apparatus described above with reference to FIG. 14.

In this third embodiment, too, duplication control information is transmitted by the superimposition/non-superimposition pattern of the PN code string PS1 and further additional information is transmitted by a block group in which the superimposition/non-superimposition of the PN code string PS2 is controlled.

Owing to this, this reproduction apparatus generates PN code strings PS1 and PS2 at the same timing as that in which the PN code strings PS1 and PS2 are superimposed on the video signal and conducts de-spread using them as de-spread spread codes, whereby the PN code strings PS1 and PS2 can be detected and the superimposition/non-superimposition pattern of the PN code string PS1 for transmitting the duplication control information and the further additional information can be detected.

In the third embodiment, however, it is again difficult to promptly generate the de-spread PN code string PS1 from the leading portion of the superimposition/non-superimposition pattern of the PN code string PS1 for transmitting the duplication control information and to generate the de-spread PN code string PS2 from the leading portion of the block group in which the superimposition/non-superimposition of the PN code string PS2 for transmitting the further additional information is controlled.

Considering this, in the third embodiment, too, the superimposition/non-superimposition pattern of the PN code string PS1 for transmitting the duplication control information is discriminated first. When it can be discriminated which duplication control state the superimposition/non-superimposition pattern indicate, it is judged that the PN code string PS1 superimposed on the video signal is synchronized with the de-spread PN code string PS1 to be generated in the video signal reproduction apparatus in the third embodiment.

It is then judged that following the superimposition/non-superimposition pattern of the PN code string PS1 for transmitting the duplication control information, a group of blocks, in which the superimposition/non-superimposition of the PN code string PS2 for transmitting the further additional information is controlled, are superimposed and the superimposition/non-superimposition of the PN code string PS2 is discriminated based on the detection output obtained by conducting de-spread to the video signal right after the superimposition/non-superimposition pattern with the de-spread PN code PS2, thereby ensuring that the further additional information is detected. The video signal reproduction apparatus in the second embodiment will be described hereinafter.

The video signal reproduction apparatus in this third embodiment has almost the same constitution as that of the video signal reproduction apparatus in the second embodiment described above with reference to FIG. 12. The apparatus in this embodiment differs from that in the second embodiment in a WM decoding section 126.

Description will be, therefore, given to the WM decoding section 126 in the reproduction apparatus in the second embodiment and the same constituent elements as those in the video signal reproduction apparatus in the second embodiment shown in FIG. 12 will not be described.

Figure 17:
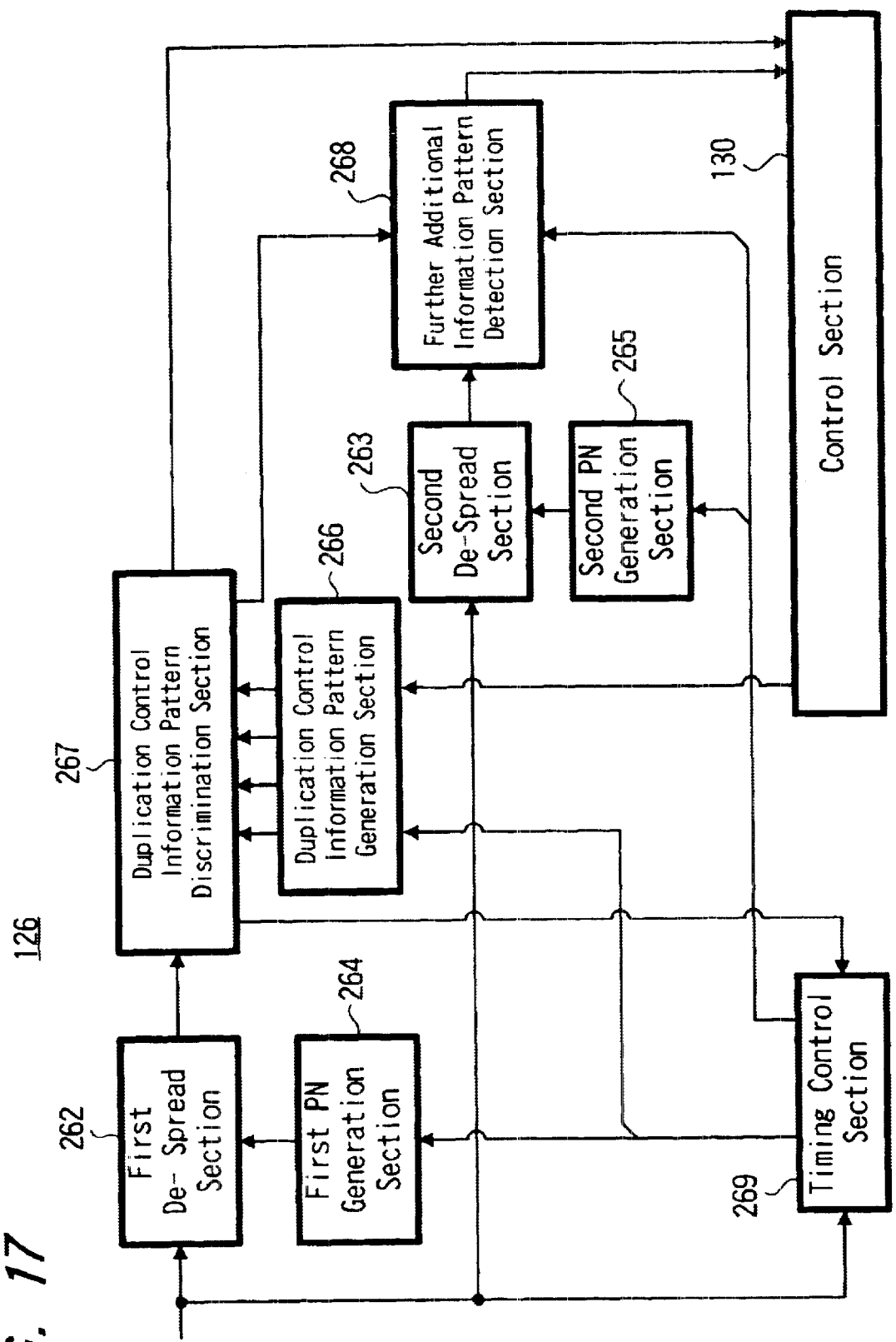
FIG. 17 is a view for describing a WM decoding section 26 in another embodiment of an information signal processing apparatus according to the present invention.

FIG. 17 is a block diagram for describing the WM decoding section 126 in the video signal reproduction apparatus in the second embodiment. As regards the WM decoding section 126 shown in FIG. 17, the same constituent elements as those of the WM decoding section 126 in the second embodiment shown in FIG. 13 are denoted by the same reference symbols and the detailed description thereof will not be given herein.

As already described above, in case of the video signal recording apparatus in the third embodiment, the superimposition blocks of a superimposition/non-superimposition pattern and the superimposition blocks of a block group for transmitting further additional information are alternately superimposed on the video signal in a time division manner. Further, the length of the superimposition blocks of the superimposition/non-superimposition pattern differs from the length of the superimposition blocks of the further additional information, i.e., the former is three blocks (15 frames) and the latter is eight blocks (40 frames).

Due to this, in the WM decoding section 126 of the video signal reproduction apparatus in the third embodiment, a timing signal indicating the superimposition blocks of a superimposition/non-superimposition pattern and a timing signal indicating the superimposition blocks of a block group for transmitting the further additional information are used to thereby allow the superimposition/non-superimposition pattern for transmitting the duplication control information to be accurately determined and the further additional information to be accurately detected, as in the case of the above-stated video signal recording apparatus in the third embodiment where the two enable signals EN1 and EN2 are used.

Namely, in the third embodiment, the timing control section 269 of the WM decoding section 126 is constituted in the same manner as the timing control section 116 of the above-stated video signal recording apparatus in the third embodiment and the timing control section 269 detects a vertical synchronizing timing signal V and a horizontal synchronizing timing signal H from the video signal.

Further, using the vertical synchronizing timing signal V and the horizontal synchronizing timing signal H as reference signals, the timing control section 269 forms timing signals for providing, to the video signal, the same timing as that of the respective timing signals formed by the timing control section 116 in the above-stated video signal recording apparatus.

That is to say, the timing control section 269, as in the case of the timing control section 103 of the above-stated video signal recording apparatus, forms a reset signal RE, a block signal KS, a PN clock signal PNCLK, an enable signal EN1 and an enable signal EN2. The timing control section 269 supplies the reset signal RE, the PN clock signal PNCLK and the enable signal EN1 to the first PN generation section 264, and supplies the reset signal RE, the PN clock signal PNCLK and the enable signal EN2 to the second PN generation section 265.

Furthermore, the timing control section 269 supplies the block signal KS and the enable signal EN1 to a duplication control information pattern generation section 266 and supplies the block signal KS and the enable signal EN2 to a further additional information pattern detection section 268.

By doing so, the first PN generation section 264 generates a PN code string PS1 reset per frame only in superimposition blocks of the superimposition/non-superimposition pattern indicated by the enable signal EN1 based on the reset signal RE and the PN clock signal PNCLK, and supplies the PN code string PS1 to the first de-spread section 262.

Likewise, the second PN generation section 265 generates a PN code string PS2 reset per frame only in superimposition blocks in the block group for transmitting the further additional information indicated by the enable signal EN2 based on the reset signal RE and the PN clock signal PNCLK, and supplies the PN code string PS2 to the second de-spread section 262.

The first de-spread section 262 conducts de-spread to the supplied video signal using the PN code string PS1 as a de-spread spread code and supplies the detection output to a duplication control information pattern discrimination section 267. As already stated above, the detection output from the first de-spread section 262 is a signal which is a high level in a block in which the PN code string PS1 is superimposed and a low level in a block in which the PN code string PS1 is not superimposed.

Likewise, the second de-spread section 263 conducts de-spread to the supplied video signal using the PN code string PS2 as a de-spread spread code and supplies the detection output to a further additional information pattern detection section 268. In this case, too, as stated above, the detection output from the second de-spread section 263 is a signal which is a high level in a block in which the PN code string PS2 is superimposed and a low level in a block in which the PN code string PS2 is not superimposed.

Furthermore, the duplication control information pattern generation section 266 forms pattern information for discriminating the superimposition/non-superimposition pattern of the PN code string PS1 only in the superimposition blocks of the superimposition/non-superimposition pattern based on information from the control section 130 and the enable signal EN1 and the block signal KS from the timing control section 261, and supplies the pattern information to the duplication control information pattern discrimination section 267.

In this case, the information supplied from the control section 130 to the duplication control information pattern generation section 266 is the same as that indicating the attribute pattern supplied to the duplication control information pattern generation section 106 from the control 115 in the video signal recording apparatus.

In this third embodiment, "100" which is information corresponding to an attribute pattern indicating Never Copy, "101" which is information corresponding to an attribute pattern indicating Copy Once, "110" which is information corresponding to an attribute pattern indicating No More Copy and "010" which is information indicating an attribute pattern indicating Copy Free are supplied from the control section 130 to the duplication control information pattern generation section 266.

Then, the duplication control information pattern generation section 266 forms an attribute pattern indicating Never Copy (FIG. 16A), that indicating Copy Once (FIG. 16B), that indicating No More Copy (FIG. 16C) and that indicating Copy Free (FIG. 16D) as described above with reference to FIG. 16 and supplies them as pattern information for discriminating the superimposition/non-superimposition pattern of the PN code string PS1 to the duplication control information pattern discrimination section 267.

Further, as in the case of the video signal reproduction apparatus in the second embodiment, the duplication control information pattern discrimination section 267 compares the detection output from the first de-spread section to the attribute patterns from the duplication control information pattern generation section 266, discriminates an attribute pattern coincident with the superimposition/non-superimposition pattern of the PN code string PS1, determines which duplication control state the discriminated attribute pattern indicates and supplies the determination result to the control section 130.

If the duplication control information pattern discrimination section 267 discriminates an attribute pattern coincident with the superimposition/non-superimposition pattern of the PN code string PS1 superimposed on the video signal, it notifies the further additional information pattern detection section 268 that the attribute pattern has been discriminated. Thus, the further additional information pattern detection section 268 detects that the superimposition/non-superimposition pattern is detected and the further additional information is superimposed next to the superimposition/non-superimposition pattern.

Moreover, in the video signal reproduction apparatus in the third embodiment, too, if the duplication control information pattern discrimination section 267 cannot discriminate an attribute pattern coincident with the superimposition/non-superimposition pattern of the PN code string PS1 superimposed on the video signal even after conducting pattern discrimination to the 15 frames with one superimposition/non-superimposition block of the spectrum spread signal consisting of five frames, it notifies the timing control section 269 that the attribute pattern has not been discriminated.

As a result, the timing control section 269 shifts the block signal KS by one frame and shifts the repetition cycle of the superimposition/non-superimposition pattern of the PN code string PS1, thereby synchronizing the repetition cycle of the superimposition/non-superimposition pattern of the PN code string PS1 with the repetition cycle of the superimposition/non-superimposition pattern of the PN code string PS1 formed in the video signal reproduction apparatus in the third embodiment.

If the further additional information pattern detection section 268 detects that the superimposition/non-superimposition pattern of the PN code string PS1 has been determined based on the information from the duplication control information pattern discrimination section 267 as stated above, it detects the superimposition/non-superimposition blocks of the PN code string PS2 based on the detection output from the second de-spread section 263, the enable signal EN2 from the timing control section 261 and the block signal KS. Then, the further additional information pattern detection section 268 forms information for setting "1" in a block in which the PN code string PS2 is superimposed and "0" in a block in which the PN code string PS2 is not superimposed, and supplies the information to the control section 130.

In other words, in the video signal reproduction apparatus in the third embodiment, the WM decoding section 126 can detect further additional information while using the superimposition/non-superimposition pattern of the PN code string PS1 as a synchronizing signal for detecting the further additional information.

Further, in the third embodiment, too, if the further additional information pattern detection section 268 detects a block (five frames) in which the PN code string PS2 is superimposed, it supplies "1" to the control section 130 and if detects a block (five frame) in which the PN code string PS2 is not superimposed, it supplies "0" to the control section 130. By doing so, the control 130 is supplied with the further additional information of eight bits having blocks each consisting of five frames and expressed by eight blocks (40 frames).

In this way, the control section 130 can obtain the duplication control information transmitted by the superimposition/non-superimposition pattern of the PN code string PS1 and the further additional information of a total of eight bits in which one-bit information is indicated by one superimposition/non-superimposition block of the PN code string PS2.

As can be seen from the above, in the third embodiment, it is possible to alternately superimpose, as spectrum spread signals, the duplication control information and the further additional information on a video signal in a time division manner and then to transmit them. The duplication control information is transmitted by the superimposition/non-superimposition pattern of the spectrum spread signal. As for the further additional information, one-bit information is expressed depending on the superimposition/non-superimposition of the spectrum spread signal in the unit block of the superimposition/non-superimposition of a spectrum spread signal or, in the third embodiment, a block of five consecutive frames and the further additional information of a plurality of bits can be thereby transmitted.

As stated above, in the third embodiment, too, duplication control information is transmitted by the superimposition/non-superimposition pattern of a spectrum spread signal and further additional information is transmitted depending on the superimposition/non-superimposition of the spectrum spread signal for every preset block.

Owing to this, even if the spectrum spread signals are simply detected, the meanings and contents thereof cannot be discriminated. Thus, it is possible to accurately superimpose the duplication control information and the further additional information on the video signal and transmit them while the duplication control information and further additional information superimposed on the video signal are not known during the transmission of the video signal.

In the third embodiment, too, if the duplication control information and further additional information superimposed on the video signal are to be removed or manipulated, such actions must be taken for every superimposition/non-superimposition pattern for transmitting the duplication control information and for each of a plurality of blocks constituting one further additional information, whereby strength against illegal actions such as the removal or manipulation of data can be intensified. In other words, the reliability of the duplication control information and further additional information superimposed on the video signal by means of spectrum spread signals can be enhanced.

In the third embodiment, the superimposition blocks of the superimposition/non-superimposition pattern and the superimposition blocks of the further additional information are alternately superimposed on the video signal so as to be adjacent one another. The present invention should not be, however, limited thereto. For example, the superimposition blocks of the further additional information provided between the superimposition blocks of one superimposition/non-superimposition pattern and the superimposition blocks of the other superimposition/non-superimposition pattern may be provided with blocks in which nothing is superimposed between the superimposition blocks of the front and back superimposition patterns.

For example, a clearance of several frames may be provided between the superimposition blocks of the superimposition/non-superimposition pattern and those of the further additional information. In that case, timing signals such as the enable signal EN2 formed by the timing control section 269 may be formed while considering a so-called interval block provided between the superimposition blocks of the superimposition/non-superimposition pattern and those of the block group for transmitting further additional information.

Needless to say, a clearance may be provided between the superimposition blocks of one of the superimposition/non-superimposition patterns between which the superimposition blocks of the block group for transmitting the further additional information are put, and the superimposition blocks of the further additional information.

Furthermore, in the third embodiment, too, it is also possible to transmit information by the reversal/non-reversal of spectrum spread signals between the blocks in which the spectrum spread signals are superimposed without changing their phases and those in which the spectrum spread signals are superimposed with their phases reversed as stated above.

Moreover, in the third embodiment, the PN code string for transmitting duplication control information and that for transmitting further additional information different in series are used. However, the PN code strings of the same series may be used.

Fourth Embodiment

The above-stated video signal recording apparatus in the third embodiment transmits a spectrum spread signal for transmitting duplication control information and that for transmitting further additional information by alternately superimposing them on a video signal in a time division manner.

There are, however, cases where the further additional information need not be superimposed on the video signal so frequently. This is because the further additional information is, for example, copyright information as described above and does not relate, unlike the duplication control information, to the controlling of a recording apparatus and a reproduction apparatus.

In the fourth embodiment, as in the case of the above-stated second and third embodiments, duplication control information is transmitted by the superimposition/non-superimposition pattern of a spectrum spread signal, whereas further additional information is transmitted depending on the superimposition/non-superimposition of the preset blocks of a spectrum spread signal. The further additional information is superimposed on a video signal at need.

For example, every time the superimposition/non-superimposition pattern of the spectrum spread signal for transmitting duplication control information is superimposed a plurality of times, a block group for transmitting further additional information is superimposed once. Alternatively, after the superimposition/non-superimposition pattern of the spectrum spread signal for transmitting the duplication control information is superimposed three times, the block group for transmitting the further additional information is superimposed once. Thereafter, the superimposition/non-superimposition pattern of the spectrum spread signal for transmitting the duplication control information is superimposed five times and the block group for transmitting the further additional information is superimposed once. In this way, the block group for transmitting the further additional information is superimposed on the video signal at preset timing.

In this case, if the block group for transmitting the further additional information is superimposed on the video signal at random timing, in particular, it is difficult to surely detect the information. Considering this, in the fourth embodiment, before the block group for transmitting the further additional information is superimposed, a specific superimposition/non-superimposition pattern for duplication control information indicating that further additional information is superimposed after the pattern, is superimposed as shown in FIG. 18.

Figure 18:
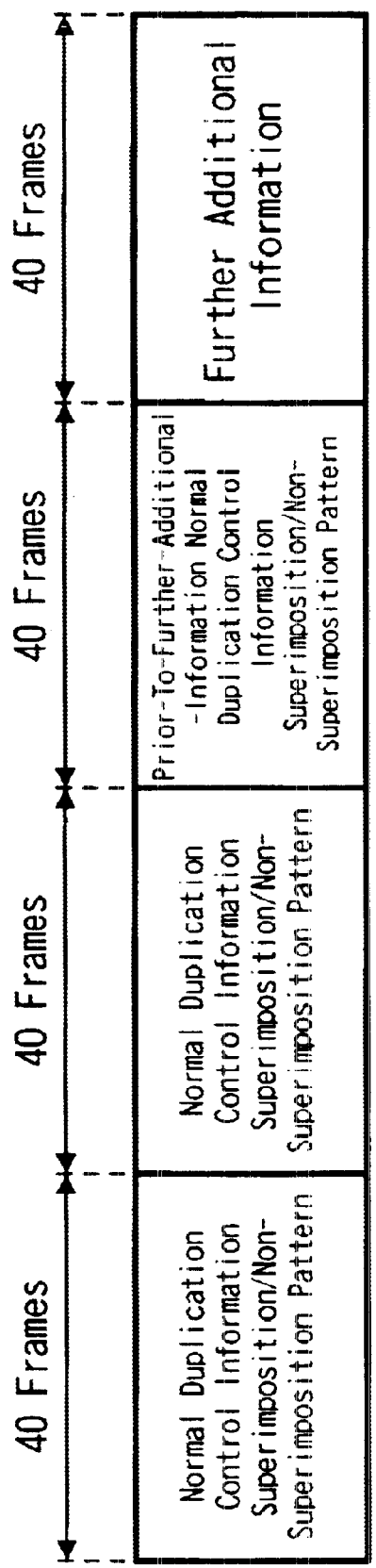
FIG. 18 is a view for describing a state in which duplication control information and further additional information are superimposed on a video signal.

That is to say, as shown in FIG. 18, the duplication control information is normally transmitted by a superimposition/non-superimposition pattern for the duplication control information for transmitting duplication control information (to be referred to as "normal superimposition/non-superimposition pattern" hereinafter). Right before further additional information is superimposed, duplication control information is transmitted by a prior-to-further-additional-information superimposition/non-superimposition pattern for duplication control information (to be referred to as "prior-to-further-additional-information superimposition/non-superimposition pattern" hereinafter).

In the second embodiment, the normal superimposition/non-superimposition pattern is one according to an attribute pattern shown in FIG. 10. The prior-to-further-additional-information superimposition/non-superimposition is one according to an attribute pattern shown in FIG. 19. Therefore, if the normal superimposition/non-superimposition pattern is expressed by an eight-bit binary system, a superimposition/non-superimposition pattern indicating Never Copy is "10000000" and that indicating No More Copy is "10101010". Also, a superimposition/non-superimposition pattern indicating No More Copy is "11001100" and that indicating Copy Free is "11110000".

Figure 19:
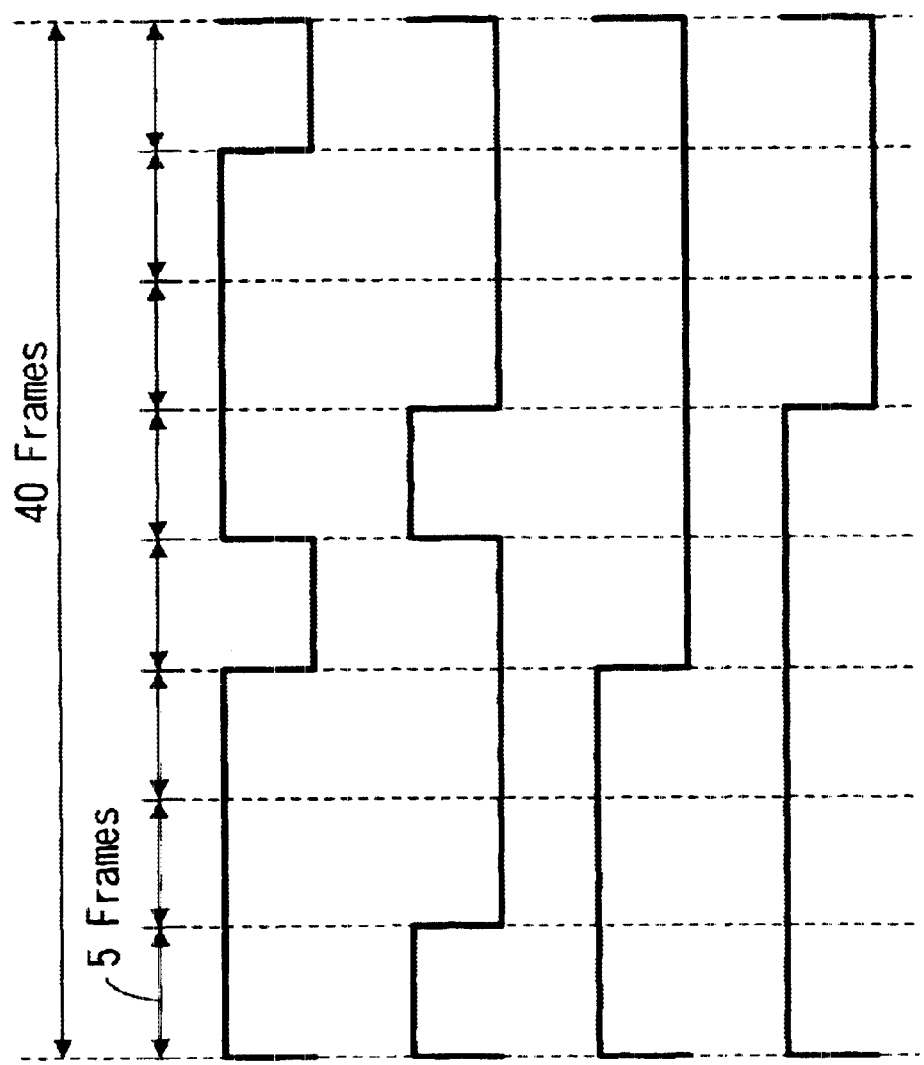
FIG. 19 is a view for describing the superimposition/non-superimposition patterns (attribute patterns) of prior-to-further-additional-information duplication control information.

On the other hand, if the prior-to-further-additional-information superimposition/non-superimposition pattern is expressed by an eight-bit binary system, as shown in FIG. 19, a superimposition/non-superimposition pattern indicating Never Copy is "11101110" and that indicating No more Copy is "10001000". Also, a superimposition/non-superimposition pattern indicating No More Copy is "11100000" and that indicating Copy Free is "11111000".

As can be seen from the above, the reason for setting a superimposition/non-superimposition pattern for transmitting duplication control information is to prevent the erroneous detection of the superimposition/non-superimposition pattern for transmitting duplication control information. That is, if synchronism is not established during detection, the same pattern as the superimposition/non-superimposition pattern for the duplication control information is prevented from occurring.

Further, in the third embodiment as in the case of the second and third embodiments, the magnitude of one block of the superimposition/non-superimposition of a spectrum spread signal consists of five frames and one duplication control information is transmitted in an eight-block (40-frame) cycle. As for the further additional information, one block (unit block) of superimposition/non-superimposition consists of five frames and eight-bit information is transmitted in an eight-block (40-frame) cycle.

Then, as shown in FIG. 18, the video signal recording apparatus in the fourth embodiment wherein the further additional information is superimposed on the video signal at preset timing and a prior-to-further-additional-information superimposition/non-superimposition pattern is superimposed just before the further additional information, can be constituted almost in the same manner as the video signal recording apparatus in the third embodiment described above with reference to FIG. 14. In this embodiment, however, a duplication control information pattern generation section 106 is constituted as shown in FIG. 20 and a timing control section 106 forms a timing signal indicating the start and the end of the superimposition blocks of a superimposition/non-superimposition pattern for duplication control information before further additional information is superimposed.

In this case, the timing control section 106 can form a timing signal indicating the start and the end of a prior-to-further-additional-information superimposition/non-superimposition pattern based on a vertical synchronizing timing signal V, by receiving information indicating superimposition timing for the further additional information from, for example, a control section 115 and by holding the superimposition position of the further additional information relative to the video signal determined by, for example, the vertical synchronizing timing signal V.

Figure 20:
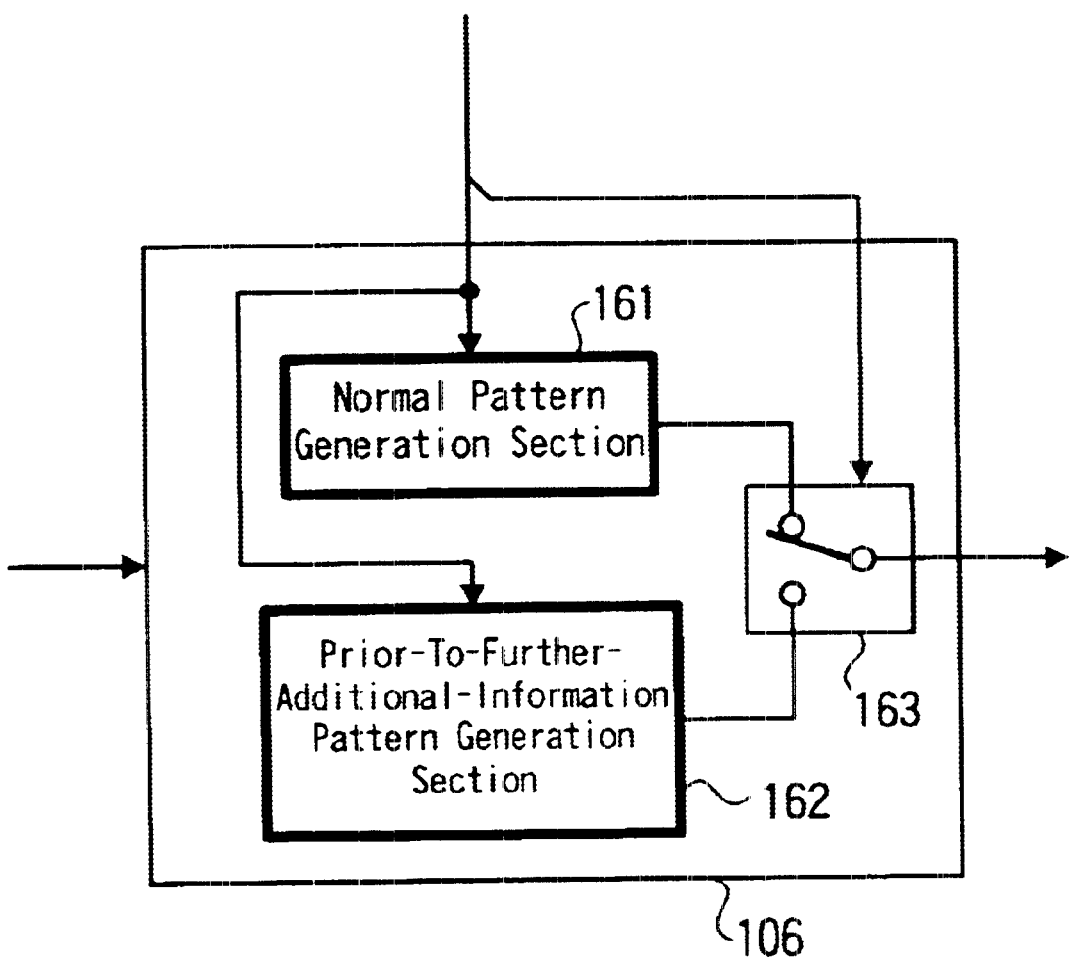
FIG. 20 is a block diagram for describing a duplication control information pattern generation section in another embodiment of an information signal output apparatus according to the present invention.

Description will be, therefore, given while assuming that the video signal recording apparatus in the third embodiment is constituted as shown in FIG. 14 and the duplication control information pattern generation section 6 is constituted as shown in FIG. 20.

As shown in FIG. 20, in the video signal recording apparatus in the fourth embodiment, the duplication control information pattern generation section 106 comprises a normal pattern generation section 161, a further additional information pattern generation section 162 and a switching circuit 163.

The normal pattern generation section 161 and the further additional information pattern generation section 162 are supplied with eight-bit information corresponding to an attribute pattern from the control section 115. For instance, if a video signal recorded on a DVD is a Never Copy video signal, the normal pattern generation section 161 is supplied with information of "10000000" as information corresponding to an attribute pattern and the further additional information pattern generation section 62 is supplied with information of "11101110" as information corresponding to an attribute pattern.

The normal pattern generation section 161 generates an attribute pattern as shown in FIG. 10 based on a block signal KS from the timing control section 103 and supplies the attribute pattern to one end of the switching circuit 163. The normal pattern generation section 162 generates an attribute pattern shown in FIG. 19 based on the block signal KS from the timing control section 103 and supplies the attribute pattern to the switching circuit 103.

This switching circuit 163 is switched by a timing signal indicating the start and the end of the superimposition blocks of a prior-to-further-additional-information superimposition/non-superimposition pattern of the duplication control information from the timing control section 103. As shown in FIG. 18, just before the further additional information is superimposed, an attribute pattern from the further additional information pattern generation section 162 is supplied to the first pattern switching section 108, the prior-to-further-additional-information superimposition/non-superimposition pattern is superimposed on the video signal and then a block group for transmitting the further additional information is superimposed.

Further, as shown in FIG. 18, a video signal reproduction apparatus in the fourth embodiment for detecting duplication control information and further additional information from the video signal on which the superimposition/non-superimposition pattern for transmitting duplication control information and the block group for transmitting the further additional information are superimposed, can be constituted in the same manner as that having the WM decoding section 126 in the third embodiment shown in FIG. 17.

In case of the video signal reproduction apparatus in the fourth embodiment, a prior-to-further-additional-information superimposition/non-superimposition pattern must be discriminated. Due to this, the duplication control information pattern generation section 266 is supplied with information corresponding to an attribute pattern for generating a prior-to-further-additional-information superimposition/non-superimposition pattern from the control section 130.

The duplication control information pattern generation section 266 supplies the attribute pattern corresponding to the prior-to-further-additional-information superimposition/non-superimposition pattern as well as an attribute pattern corresponding to the normal superimposition/non-superimposition pattern to the duplication control information pattern determination section 267.

By doing so, the duplication control information pattern generation section 267 can discriminate the prior-to-further-additional-information superimposition/non-superimposition pattern superimposed on the video signal. When discriminating this prior-to-further-additional-information superimposition/non-superimposition pattern, the duplication control information pattern generation section 267 supplies this pattern to the further additional information pattern detection section 263, whereby it is possible for the further additional information pattern detection section 268 to detect the further additional information.

As can be seen from the above, in the fourth embodiment, the duplication control information and the further additional information can be superimposed as spectrum spread signals on the video signal and transmitted. The prior-to-further-additional-information superimposition/non-superimposition pattern is used as a synchronizing signal for detecting further additional information to thereby make it possible to ensure detecting the further additional information.

In the fourth embodiment, too, since the meanings and contents of spectrum spread signals cannot be discriminated by simply detecting the spectrum spread signals, it is possible to surely, accurately superimpose the duplication control information and the further additional information on the video signal and transmit them while the duplication control information and the further additional information superimposed on the video signal are not known during the transmission of the video signal.

It is, therefore, possible to intensify strength against illegal actions such as the removal or manipulation of the duplication control information and the further additional information. In other words, it is possible to enhance the reliability of the duplication control information and the further additional information superimposed on the video signal by means of spectrum spread signals.

It is noted that a block in which nothing is imposed may be provided between the superimposition blocks of the prior-to-further-additional-information superimposition/non-superimposition pattern and those of the further additional information in the fourth embodiment, as well.

In the fourth embodiment, too, it is possible to transmit information by the reversal/non-reversal of spectrum spread signals between blocks in which the spectrum spread signals are superimposed without changing their phases and blocks in which the spectrum spread signals are superimposed with their phases reversed as already stated above.

Furthermore, the video signal recording apparatus in the fourth embodiment is constituted in the same manner as the video signal in the third embodiment. Due to this, the duplication control information and the further additional information are transmitted using different PN code strings. It goes without saying that the same PN code string may be used. Besides, the normal superimposition/non-superimposition pattern, the prior-to-further-additional-information superimposition/non-superimposition pattern and the further additional information may be transmitted using individually different spread code strings.

The descriptions of the above-stated second, third and fourth embodiments have been given, taking, as an example, a case where a unit block for the controlling of the superimposition/non-superimposition or reversal/non-reversal of spectrum spread signals consists five frames so as to transmit the duplication control information and further additional information.

Fifth Embodiment

The descriptions of the above-stated first, third and fourth embodiments have been given to a case where the duplication control information and further additional information are superimposed on the video signal using spectrum spread signals; however an information signal should not be limited to the video signal.

For example, it is possible to superimpose further additional information which is a spectrum spread signal on a voice signal. In that case, too, it is possible to superimpose the further additional information on this voice signal depending on the superimposition/non-superimposition or reversal/non-reversal of the spectrum spread signal for every preset block.

In case of a voice signal or the like, however, a video synchronizing signal cannot be used as a reference signal. Due to this, it is possible to surely detect further additional information even if the further additional information as a spectrum spread signal is superimposed on an information signal, such as a voice signal, other than the video signal by doing as follows.

Figure 21:
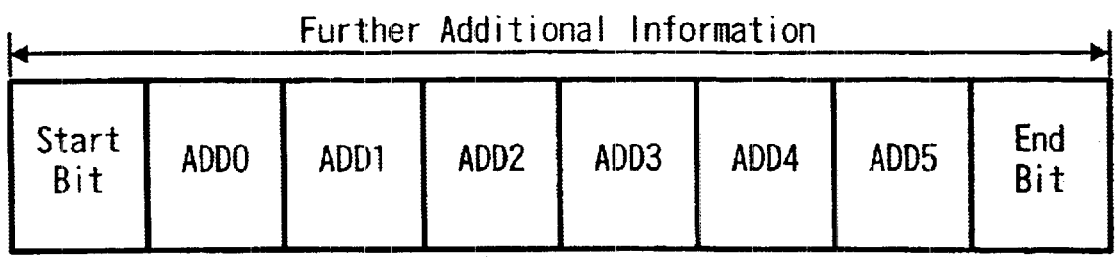
FIG. 21 is a view for describing an example of a case where further additional information is superimposed on an information signal, such as a voice signal, other than a video signal.

FIGS. 21 and 22 are views for describing a case of superimposing, as a spectrum spread signal, further additional information on a voice signal and transmitting the information depending on the superimposition/non-superimposition of the spectrum spread signal for every preset block.

In the example shown in FIG. 21, a start bit and an end bit are added to further additional information to be represented by a spectrum spread signal and the respective bits of the further additional information are synchronized with one another using these start and end bits.

In a case where a superimposition/non-superimposition pattern for duplication control information and a block group for transmitting further additional information are alternately superimposed, for example, when the duplication control information superimposition/non-superimposition pattern is detected and then a preset start bit of the spectrum spread signal is detected, the respective blocks until the preset end bit of the spectrum spread signal is detected are regarded as those for transmitting further additional information, the superimposition/non-superimposition for every preset block is discriminated to thereby allow detecting the further additional information.

In this case, a unit block in which the superimposition/non-superimposition of this spectrum spread signal is controlled is determined by the data amount or time length of the voice signal. If the voice signal is, for example, a digital signal, the unit block in which superimposition/non-superimposition is controlled is set for with reference to blocks dealt with as one unitary data or set for every predetermined time.

By providing the further additional information with the start bit and the end bit expressed by the spectrum spread signals as stated above, it is possible to surely detect the further additional information superimposed as the spectrum spread signals on the voice signal. Also, in this case, the start and end bits as well as the respective bits of the further additional information indicated by ADD0 to ADD6 in FIG. 21 can be expressed using PN code strings of same series.

Figure 22A:
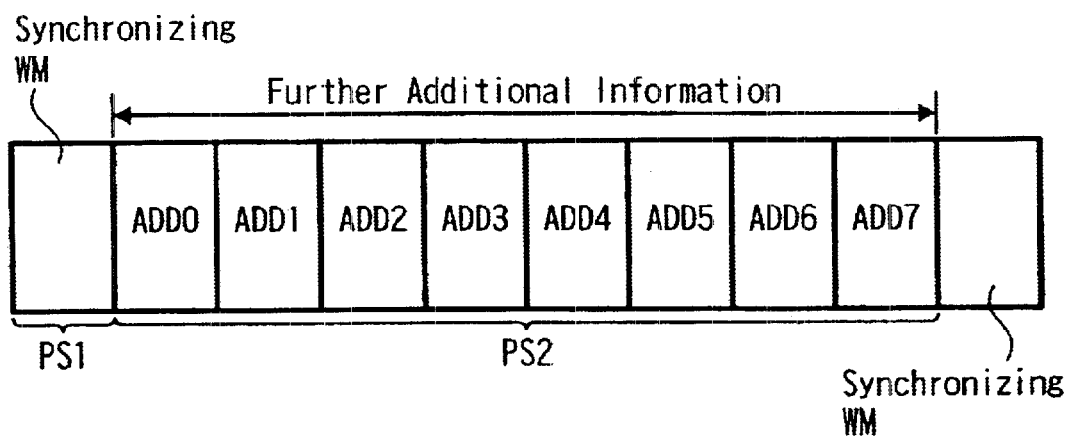
FIG. 22 is a view for describing another example of a case where further additional information is superimposed on an information signal, such as a voice signal, other than a video signal.

In the example shown in FIG. 22A, a spectrum spread signal for generating a synchronizing pulse is added to further additional information. That is to say, as shown in FIG. 22A, a spectrum signal as a synchronizing signal (described as a synchronizing WM in FIG. 22B) is added in front of the further additional information transmitted by controlling the superimposition/non-superimposition of the spectrum spread signal for each of the blocks ADD0 to ADD7.

A spectrum spread signal used for transmitting this synchronizing WM and that used for transmitting further additional information are formed by using different PN code strings. In the example shown in FIG. 22, the synchronizing WM is formed by using a PN code string PS1, whereas the further additional information is formed by using a PN code string PS2.

In case of detecting the synchronizing WM, it is judged that further additional information is superimposed in back of the synchronizing WM, to thereby make it possible to detect the further additional information.

Figure 22B:
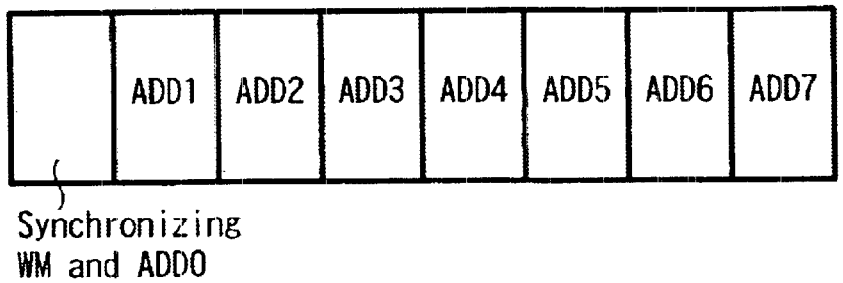

Since the synchronizing WM and the further additional information are transmitted by the spectrum spread signals formed out of the different PN code strings, it is possible to surely detect them separately even if they are superposed on each other. For that reason, as shown in FIG. 22B, the synchronizing WM may be superposed on the first bit of the further additional information and the synchronizing WM and the further additional information may be superimposed on a voice signal.

In that case, it is judged that further additional information is superimposed from the position of the voice signal on which the synchronization WM is superimposed and the further additional information can be detected. In addition, a superimposition/non-superimposition pattern for transmitting the duplication control information as the first additional information or part of the superimposition/non-superimposition pattern for transmitting the duplication control information can be used as a synchronizing WM.

The method described using FIGS. 21 and 22 is applicable to the above-stated second to fourth embodiments. Namely, it is possible to provide a block group for transmitting further additional information with a start bit and an end bit or to provide a synchronizing WM to superpose in front of the block group for transmitting the further additional information or on the first bit of the further additional information.

In this way, by providing a start bit and an end bit and using a synchronizing WM, it is possible to superimpose, as electronic watermark information, further additional information on various information signals, such as a voice signal, other than the video signal and transmit the information.

In the above-stated first, third and fourth embodiments, the number of the superimposition/non-superimposition blocks each consisting of five frames is, for example, eight (40 frames) and duplication control information and further additional information are transmitted. The present invention should not be limited thereto. The length of the superimposition/non-superimposition blocks and a superimposition cycle can be freely set based on a video synchronizing signal. Further, if an information signal on which duplication control information and further additional information are superimposed is a voice signal or data transmitted and received between computers, the length of superimposition/non-superimposition blocks and the superimposition cycle can be set according to the data amount and time length of the information signal.

Moreover, the superimposition/non-superimposition blocks of the spectrum spread signal for transmitting duplication control information may be made different from those for transmitting further additional information. For example, in case of transmitting duplication control information, one block may consist of five frames, and in case of transmitting further additional information, one block may consist of two, five or ten frames differently from the block for the duplication control information. If so, different block signals may be used between the duplication control information and the further additional information.

In addition, duplication control information can be transmitted by the superimposition/non-superimposition pattern of a spectrum spread signal, whereas the further additional information can be transmitted by the reversal/non-reversal blocks of a spectrum spread signal. Conversely, the duplication control information can be transmitted by the reversal/non-reversal pattern of a spectrum spread signal, whereas the further additional information can be transmitted by the superimposition/non-superimposition blocks of a spectrum spread signal.

Attribute patterns for setting superimposition/non-superimposition patterns and reversal/non-reversal patterns should not be limited to the above-mentioned patterns and various attribute patterns may be used.

Further, in the above-stated embodiments, descriptions have been given while assuming that the information signal output apparatus according to the present invention is applied to a video signal recording apparatus (recording apparatus for a DVD) and that the information signal processing apparatus is applied to a video signal reproduction apparatus (reproduction apparatus for a DVD); however, the present invention should not be limited thereto.

The information signal output apparatus according to the present invention can be applied to a broadcasting apparatus for transmitting a broadcast signal from a broadcasting station, an information signal recording apparatus and an information signal recording and reproduction apparatus such as a recording and reproduction apparatus for a DVD used in household or a VTR (video tape recorder), as well as an information processing apparatus provided with communication function for transmitting and receiving information through communication media such as internet. Namely, the information signal output apparatus according to the present invention can be applied to various apparatuses for outputting various information signals such as a video signal, a voice signal and communication data.

Additionally, the information signal processing apparatus according to the present invention can be applied to, for example, a receiver referred to as set-top box for receiving digital broadcasting and supplying it to a monitor receiver or a recording apparatus and to an information processing apparatus provided with communication function for transmitting and receiving information through communication media such as internet. Namely, the present invention can be applied to various processing apparatuses supplied with various information signals such as a video signal, a voice signal and communication data and processing them.

Moreover, if an information signal on which spectrum spread signals are superimposed is a digital signal, the spectrum spread signals are superimposed on the digital signal before being MPEG-encoded as stated above. It is, of course, possible to superimpose spectrum spread signals on a digital information signal after being MPEG-encoded.

The spread signals for spectrum-spreading additional information should not be limited to PN codes and various spread codes may be used.

Also, in the above-stated embodiments, a spectrum spread signal is used as electronic watermark information; however, electronic watermark information should not be limited thereto and various electronic watermark information formed by means of the electronic watermark technique may be used.

As described so far, according to the additional information transmission method of the present invention, additional information is transmitted by using the superimposition/non-superimposition pattern or reversal/non-reversal pattern of electronic watermark information. Due to this, a side supplied with an information signal on which the electronic watermark information is superimposed detects the superimposition/non-superimposition pattern of the electronic watermark information superimposed on the information signal, whereby it is possible to surely detect the additional information.

In addition, the content of the additional information cannot be known by simply detecting the electronic watermark information and it is required to detect the superimposition/non-superimposition pattern or reversal/non-reversal pattern of the electronic watermark information and then to discriminate additional information corresponding to the superimposition/non-superimposition pattern or reversal/non-reversal pattern. Thus, it is possible to enhance the concealment characteristics of the additional information and to transmit it more surely without leaking the information during the transmission process or the like, thus making it possible to enhance the reliability of the additional information.

Furthermore, if the additional information superimposed on the information signal is to be removed or manipulated, it is required to remove or manipulate the entire superimposition/non-superimposition pattern or reversal/ non-reversal pattern of the electronic watermark information. Thus, it is possible to make it more difficult to remove or manipulate the additional information superimposed on the information signal. Besides, if only part of the superimposition/non-superimposition pattern or reversal/non-reversal pattern of the electronic watermark information is removed or manipulated, the additional information superimposed on the information signal is not completely removed or manipulated. Thus, it is possible to intensify the strength of the additional information superimposed on the information signal and to enhance the reliability of the additional information.

Additionally, by providing a plurality of superimposition/non-superimposition patterns or reversal/non-reversal patterns of the electronic watermark information corresponding to a plurality of additional information, it is possible to surely transmit all of the plural additional information on the information signal.

Furthermore, by employing a plurality of superimposition/non-superimposition patterns or reversal/non-reversal patterns of the electronic watermark information, it is possible to surely transmit all of the plural additional information on the information signal.

Also, if the information signal is a video signal, the blocks of superimposition/non-superimposition or reversal/non-reversal of electronic watermark information are set as blocks synchronous with a video synchronizing signal and the spectrum spread signal formed by using a spectrum spread signal generated synchronously with the video synchronizing signals is superimposed as electronic watermark information in accordance with a superimposition/non-superimposition pattern or reversal/non-reversal pattern, whereby it is possible to easily and surely transmit additional information on the video signal on the video signal and then to transmit it.

In that case, a side which receives the video signal on which this additional information is superimposed, can promptly and accurately detect the superimposition/non-superimposition pattern or reversal/non-reversal pattern of the spectrum spread signal superimposed on the video signal and promptly and accurately discriminate additional information corresponding to the detected pattern.

In addition, even if the information signal on which additional information is superimposed by the superimposition/non-superimposition pattern or reversal/non-reversal pattern of the electronic watermark information and which is transmitted is a voice signal or computer data other than the video signal, it is possible to surely detect the superimposition/non-superimposition pattern or reversal/non-reversal pattern of the electronic watermark information and to surely detect the additional information corresponding to the detected pattern by superimposing synchronism detection electronic watermark information for detecting the superimposition/non-superimposition pattern or reversal/non-reversal pattern on the information signal.

Further, by surely transmitting the additional information by the superimposition/non-superimposition pattern or reversal/non-reversal pattern of the electronic watermark information to the other side, to which the electronic watermark information is transmitted, and causing the side to detect synchronism detection electronic watermark information, it is possible to match synchronizing timing, surely and accurately detect the . superimposition/non-superimposition pattern of the electronic watermark information and to discriminate the additional information superimposed on the transmitted information signal.

Further, by surely transmitting the additional information by the superimposition/non-superimposition pattern or reversal/non-reversal pattern of the electronic watermark information to the other side to which the electronic watermark information is transmitted and causing the other side to detect synchronism detection electronic watermark information, it is possible to match synchronizing timing, to surely and accurately the superimposition/non-superimposition pattern of the electronic watermark information and to discriminate the additional information superimposed on the transmitted information signal.

As stated so far, according to an additional information transmission method of the present invention, the first and second additional information are transmitted as information signals using electronic watermark information difficult to remove or manipulate. The first additional information can be transmitted by the superimposition/non-superimposition pattern of electronic watermark information or the reversal/non-reversal superimposition pattern thereof and the second additional information can be transmitted by the superimposition/non-superimposition of electronic watermark information for every preset block or by the reversal/non-reversal thereof.

Due to this, neither the first nor second additional information cannot be detected by simply detecting the watermark information and it is necessary to detect the superimposition/non-superimposition pattern of the electronic watermark information or the reversal/non-reversal superimposition pattern thereof or to detect information indicated by the superimposition/non-superimposition of the electronic watermark information or the reversal/non-reversal superimposition thereof. Thus, it is possible to make more difficult to remove or manipulate the first and second additional information and to ensure the transmission of both the first and second additional information. In other words, it is possible to enhance the reliability of the first and second additional information to be transmitted together with an information signal.

Furthermore, since the first and second additional information are alternately superimposed on an information signal in a time division manner, it is possible to transmit two different information by superimposing them on the information signal. In addition, when the superimposition/non-superimposition pattern or reversal/non-reversal superimposition pattern for transmitting the first additional information is detected, it is discriminated that the second additional information is superimposed in back of the first additional information to thereby make it possible to ensure detecting the second additional information.

Further, it is possible to superimpose the second additional information on an information signal at necessary timing at need. In this case, the superimposition/non-superimposition pattern or reversal/non-reversal superimposition pattern of the electronic watermark information suggesting that the second additional information is superimposed in front of the second additional information. Therefore, if the suggested superimposition/non-superimposition pattern or suggested reversal/non-reversal superposition pattern are detected, it is discriminated that the second additional information is superimposed in back of the suggested pattern, thereby making it possible to ensure detecting the second additional information.

Moreover, even if two electronic watermark information are superimposed on an information signal at the same time with the frequency, it is possible to ensure detecting the respective electronic watermark information by making spread codes used for forming the respective electronic watermark information different.

In addition, even if the superimposition/non-superimposition pattern or reversal/non-reversal superimposition pattern of the first additional information and the superimposition/non-superimposition blocks of electronic watermark information or reversal/non-reversal superimposition blocks thereof for transmitting the second additional information are superimposed at chronically distant positions, it is possible to ensure detecting the second additional information by using timing at which the superimposition/non-superimposition pattern or reversal/non-reversal superimposition pattern of the first additional information or part of the pattern is detected, as timing for detecting the second additional information.

Further, even if the superimposition/non-superimposition pattern of electronic watermark information suggesting that the second additional information is superimposed on an information signal and the superimposition/non-superimposition blocks of electronic watermark information for transmitting the second additional information are superimposed on one another, it is possible to ensure detecting the second additional information by using timing at which the superimposition/non-.superimposition pattern or reversal/non-reversal superimposition pattern of the suggesting electronic watermark information or part of the pattern thereof is detected, as timing for detecting the second additional information.

Additionally, even if electronic watermark information for transmitting the first additional information and that for transmitting the second additional information are superimposed on an information signal at the same time with the same frequency, it is possible to ensure detecting the second additional information by containing a synchronizing signal in the second additional information and by using this synchronizing signal.

Furthermore, it is possible to set the superimposition/non-superimposition blocks of electronic watermark information or reversal/non-reversal superimposition blocks thereof based on the unity of information signal data and it is possible to surely, accurately detect the superimposition/non-superimposition blocks of the electronic watermark information or reversal/non-reversal superimposition blocks thereof.

Also, it is possible to set the superimposition/non-superimposition blocks of electronic watermark information or reversal/non-reversal superimposition blocks thereof as constant blocks according to time and to surely, accurately detect the superimposition/non-superimposition blocks of the electronic watermark information or reversal/non-reversal superimposition blocks thereof.

Likewise, it is possible to promptly, surely detect the superimposition/non-superimposition blocks of electronic watermark information or reversal/non-reversal superimposition blocks thereof using the electronic watermark information as a reference signal by setting the superimposition/non-superimposition blocks of the electronic watermark information or reversal/non-reversal superimposition blocks thereof based on a video synchronizing signal.

Additionally, if there are blocks in which electronic watermark information is superimposed on an information signal as it is and those in which the electronic watermark information is reversed and superimposed thereon, it is possible to make large the difference in the level of electronic watermark information between the blocks in which the electronic watermark information is superimposed as it is and the blocks in which the electronic watermark information is superimposed with its phase reversed. This makes it possible to reduce information of the information signal on the electronic watermark information superimposed on the information signal and thereby to transmit and detect the electronic watermark information more surely.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An additional information transmission method for transmitting an information signal and additional information comprising the steps of:

a first step for generating electronic watermark information; and a second step for superimposing and transmitting said electronic watermark information on the information signal so as to be a superimposition/non-superimposition pattern corresponding to first additional information and transmitting second additional information on said information signal such that one value of one-bit information is expressed by a period in which electronic watermark information is superimposed on said information signal and other value of one-bit information is expressed by a period in which the electronic watermark information is not superimposed.

2. An additional information transmission method according to claim 1, characterized in that said second step performs such an operation that N periods (N is an integer equal to or more 1) in which superimposition/non-superimposition of the electronic watermark information is determined according to said second additional information, are inserted between one said superimposition/non-superimposition pattern of said first additional information and the other superimposition/non-superimposition pattern of said first additional information, thereby transmitting said second additional information.

3. An additional information transmission method according to claim 2, characterized in that said second step performs such an operation that detection timing for indicating that an entirety of or a part of the superimposition/non-superimposition pattern of said electronic watermark information suggesting that said second additional information is superimposed has been detected, is substantially coincident with synchronizing timing for detecting said second additional information superimposed on said information signal.

4. An additional information transmission method according to claim 1, characterized in that said second step inserts a superimposition/non-superimposition pattern of electronic watermark information suggesting that said second additional information is superimposed, before the electronic watermark information for transmitting said second additional information is superimposed on said information signal.

5. An additional information transmission method according to claim 1, characterized in that said second step perform such an operation that the electronic watermark information for transmitting said first additional information and the electronic watermark information for transmitting said second additional information are spectrum spread signals formed by different spread codes.

6. An additional information transmission method according to claim 1, characterized in that said second step performs such an operation that a detection timing for indicating that an entirety of or a part of said superimposition/non-superimposition pattern of said first additional information has been detected, is substantially coincident with a synchronizing timing for detecting said second additional information superimposed on said information signal.

7. An additional information transmission method according to claim 1, characterized in that said second step performs such an operation that a synchronizing signal for detecting said second additional information is contained in said second additional information.

8. An additional information transmission method according to claim 1, characterized in that said second step performs such an operation that said superimposition/non-superimposition period of said electronic watermark information is set as a period for every predetermined data amount of said information signal.

9. An additional information transmission method according to claim 1, characterized in that said second step performs such an operation that said superimposition/non-superimposition period of said electronic watermark information is set as a period for every predetermined time length of said information signal.

10. An additional information transmission method according to claim 1, characterized in that said information signal is a video signal and said superimposition/non-superimposition period of said electronic watermark information is set as a period synchronous with a video synchronizing signal.

11. An additional information transmission method for transmitting an information signal and additional information comprising the steps of:
   a first step for generating electronic watermark information; and
   second step for superimposing and transmitting said electronic watermark information on the information signal so as to be a superimposition/non-superimposition pattern corresponding to first additional information and transmitting second additional information on said information signal such that one values of one-bit information is expressed by a period in which electronic watermark information is superimposed on said information signal and other values of one-bit information is expressed by a period in which the electronic watermark information is reversed and superimposed on said information signal.

12. An additional information transmission method according to claim 11, characterized in that said second step performs such an operation that N periods (N is an integer equal to or more than 1 in which reversal/non-reversal of the electronic watermark information is determined according to said second additional information, are inserted between one said reversal/non-reversal pattern of said first additional information and another said reversal/non-reversal pattern of said first additional information, thereby transmitting said second additional information.

13. An additional information transmission method according to claim 11, characterized in that said second step inserts a reversal/non-reversal pattern of electronic watermark information suggesting that said second additional information is superimposed, before the electronic watermark information for transmitting said second additional information is superimposed on said information signal.

14. An additional information transmission method according to claim 13, characterized in that said second step performs such an operation that detection timing for indicating that an entirety of or a part of the reversal/non-reversal pattern of said electronic watermark information suggesting that said second additional information is superimposed have been detected, is used as synchronizing timing for detecting said second additional information superimposed on said information signal.

15. An additional information transmission method according to claim 11, characterized in that said second step performs such an operation that the electronic watermark information for transmitting said first additional information and the electronic watermark information for transmitting said second additional information are spectrum spread signals formed by different spread codes.

16. An additional information transmission method according to claim 11, characterized in that said second step performs such an operation that detection timing for indicating that an entirety of or a part of said reversal/non-reversal pattern of said first additional information has been detected, is used as synchronizing timing for detecting said second additional information superimposed on said information signal.

17. An additional information transmission method according to claim 11, characterized in that said second step performs such an operation that a synchronizing signal for detecting said second additional information is contained in said second additional information.

18. An additional information transmission method according to claim 11, characterized in that said second step performs such an operation that said reversal/non-reversal period of said electronic watermark information is set as a period for every predetermined data amount of said information signal.

19. An additional information transmission method according to claim 11, characterized in that said reversal/non-reversal period of said electronic watermark information is set as a period for every predetermined time length of said information signal.

20. An additional information transmission method according to claim 11, characterized in that said second step performs such an operation that said information signal is a video signal and said reversal/non-reversal period of said electronic watermark information is set as a period synchronous with a video synchronizing signal.

21. An information signal output apparatus characterized by comprising:
   pattern generation means for generating a superimposition/non-superimposition pattern consisting of a preset combination of a period in which electronic watermark information is superimposed on said information signal and said period in which the electronic watermark information is not superimposed on said information signal, for transmitting first additional information on said information signal by said superimposition/non-superimposition pattern;
   indication signal generation means for generating an indication signal for indicating superimposition/non-superimposition for transmitting second additional information on said information signal such that one of values of one-bit information is expressed by a period in which electronic watermark information is superimposed on said information signal and that the other value of one-bit information is expressed by a period in which the electronic watermark information is not superimposed on said information signal; and
   superimposition means for superimposing the electronic watermark information by generating the period in which the electronic watermark information for transmitting said first additional information is superimposed on said information signal and said period in which the electronic watermark information is not superimposed on said information signal based on said superimposition/non-superimposition pattern from said pattern generation means, and for superimposing the electronic watermark information by generating the period in which electronic watermark information for transmitting said second additional information is superimposed on said information signal and the period in which the electronic watermark information is not superimposed on said information signal based on said indication signal from said indication signal generation means.

22. An information signal output apparatus according to claim 21, characterized in that said superimposition means inserts N periods, where N is an integer not less than 1, in which the superimposition/non-superimposition of the electronic watermark information is determined according to said indication signal from said indication signal generation means, between one said superimposition/non-superimposition pattern of said first additional information and another said superimposition/non-superimposition pattern of said first additional information.

23. An information signal output apparatus according to claim 21, characterized in that suggestion pattern generation means for generating a superimposition/non-superimposition pattern of electronic watermark information suggesting that said second additional information is superimposed on said information signal; and said superimposition means superimposes the electronic watermark information on said information signal by generating the period in which the electronic watermark information is superimposed and the period in which the electronic watermark information is not superimposed, based on said superimposition/non-superimposition pattern for suggestion from said pattern generation means for suggestion before the electronic watermark information for transmitting said second additional information is superimposed on said information signal.

24. An information signal output apparatus according to claim 21, characterized in that the electronic watermark information for transmitting said first additional information superimposed on said information signal outputted from said information signal output apparatus and the electronic watermark information for transmitting said second additional information are spectrum spread signals formed by using different spread codes.

25. An information signal output apparatus according to claim 21, characterized in that said superimposition/non-superimposition period of said electronic watermark information is set as a period for every predetermined data amount of said information signal.

26. An information signal output apparatus according to claim 21, characterized in that said superimposition/non-superimposition period of said electronic watermark information is set as a period for every predetermined time length of said information signal.

27. An information signal output apparatus according to claim 21, characterized in that said information signal is a video signal and said superimposition/non-superimposition period of said electronic watermark information is set as a period synchronous with a video synchronizing signal.

28. An information signal processing apparatus for processing an information signal wherein first additional information on the information signal is transmitted by superimposition/non-superimposition pattern consisting of a preset combination of a period in which electronic watermark information is superimposed on the information signal and said period in which the electronic watermark information is not superimposed and second additional information on said information signal is transmitted such that one of values of one-bit information is expressed by a period in which electronic watermark information is superimposed on said information signal and the other value of one-bit information is expressed by a period in which the electronic watermark information is not superimposed, characterized by comprising:

first electronic watermark information detection means for detecting said electronic watermark information superimposed in said superimposition/non-superimposition pattern on said information signal;

processing apparatus-side pattern generation means for generating said superimposition/non-superimposition pattern;

pattern discrimination means for discriminating said superimposition/non-superimposition pattern of said electronic watermark information superimposed on said information signal based on detection output from said first electronic watermark detection means and on said superimposition/non-superimposition pattern from said processing apparatus-side pattern generation means;

second electronic watermark information detection means for detecting the electronic watermark information for transmitting said second additional information; and second additional information detection means for discriminating the period in which the electronic watermark information for transmitting said second additional information superimposed on said information signal is superimposed and the period in which the electronic watermark information is not superimposed on said information signal based on detection output from said second additional information detection means, and for detecting said second additional information.

29. An information signal processing apparatus according to claim 28, characterized in that the electronic watermark information for transmitting said first additional information superimposed on said information signal and the electronic watermark information for transmitting said second additional information are spectrum spread signals formed by using different spread codes;

said first electronic watermark information detection means conducts de-spread using the spread code used for forming the electronic watermark information for transmitting said first additional information, and thereby detects the electronic watermark information for transmitting said first additional information; and said second electronic watermark information detection means conducts de-spread using the spread code used for forming the electronic watermark information for transmitting said second additional information, and thereby detects the electronic watermark information for transmitting said second additional information.

30. An information signal processing apparatus according to claim 28, characterized in that said second electronic watermark information detection means uses timing at which an entirety of or a preset part of said superimposition/non-superimposition pattern of said first additional information is discriminated by said pattern discrimination means, as synchronizing timing for detecting the electronic watermark information for transmitting said second additional information, and detects said electronic watermark information for transmitting said second additional information.

31. An information signal processing apparatus according to claim 28, characterized in that a superimposition/non-superimposition pattern of electronic watermark information suggesting that said second additional information is superimposed, is inserted into said information signal before the electronic watermark information for transmitting said second additional information is superimposed on said information signal;

said information signal processing apparatus comprises:
suggestion electronic watermark information detection means for detecting said electronic watermark information for suggestion superimposed in said suggestion superimposition/non-superimposition pattern on said information signal;
processing apparatus-side suggestion pattern generation means for generating said suggestion superimposition/non-superimposition pattern; and
suggestion pattern discrimination means for discriminating said suggestion superimposition/non-superimposition pattern of the electronic watermark information inserted into said information signal based on the detection output from said suggestion electronic watermark information detection means and said suggestion superimposition/non-superimposition pattern from said processing apparatus-side suggestion pattern generation means; and in that
said second electronic watermark information detection means uses timing at which an entirety of or a preset part of the superimposition/non-superimposition pattern of the electronic watermark information suggesting that said second additional information is superimposed by said suggestion pattern discrimination means, as synchronizing timing for detecting the electronic watermark information for transmitting said second additional information, and detects said electronic watermark information for transmitting said second additional information.

32. An information signal processing apparatus according to claim 28, characterized in that a synchronizing signal for detecting said second additional information is contained in said second additional information;

said second electronic watermark information detection means uses said synchronizing signal contained in said second additional information, and detects said electronic watermark information for transmitting said second additional information.

33. An information signal output apparatus characterized by comprising:

pattern generation means for generating a reversal/non-reversal pattern consisting of a preset combination of a period in which electronic watermark information is superimposed on said information signal as it is and said period in which the electronic watermark information is reversed and superimposed on said information signal, for transmitting first additional information on said information signal by said reversal/non-reversal pattern;

indication signal generation means for generating an indication signal for indicating reversal/non-reversal for transmitting second additional information on said information signal such that one of values of one-bit information is expressed by a period in which electronic watermark information is superimposed on said information signal as it is and that the other value of one-bit information is expressed by a period in which the electronic watermark information is reversed and superimposed on said information signal; and superimposition means for superimposing the electronic watermark information by generating the period in which the electronic watermark information for transmitting said first additional information is superimposed on said information signal as it is and said period in which the electronic watermark information is reversed and superimposed on said information signal based on said reversal/non-reversal pattern from said pattern generation means, and for superimposing the electronic watermark information by generating the period in which electronic watermark information for transmitting said second additional information is superimposed on said information signal as it is and the period in which the electronic watermark information is reversed and superimposed on said information signal based on said indication signal from said indication signal generation means.

34. An information signal output apparatus according to claim 33, characterized in that said superimposition means inserts N periods (N is an integer equal to or more than 1) in which the reversal/non-reversal of the electronic watermark information is determined according to said indication signal from said indication signal generation means, between one said reversal/non-reversal pattern of said first additional information and another said reversal/non-reversal pattern of said first additional information.

35. An information signal output apparatus according to claim 33, characterized in that said information signal output apparatus comprises suggestion pattern generation means for generating a reversal/non-reversal pattern of electronic watermark information suggesting that said second additional information is superimposed on said information signal;

said superimposition means superimposes the electronic watermark information on said information signal by generating the period in which the electronic watermark information is superimposed as it is and the period in which the electronic watermark information is reversed and superimposed, based on said suggestion reversal/non-reversal pattern from said suggestion pattern generation means before the electronic watermark information for transmitting said second additional information is superimposed on said information signal.

36. An information signal output apparatus according to claim 33, characterized in that the electronic watermark information for transmitting said first additional information superimposed on said information signal outputted from said information signal output apparatus and the electronic watermark information for transmitting said second additional information are spectrum spread signals formed by using different spread codes.

37. An information signal output apparatus according to claim 33, characterized in that said reversal/non-reversal period of said electronic watermark information is set as a period for every predetermined data amount of said information signal.

38. An information signal output apparatus according to claim 33, characterized in that said reversal/non-reversal period of said electronic watermark information is set as a period for every predetermined time length of said information signal.

39. An information signal output apparatus according to claim 33, characterized in that said information signal is a video signal and said reversal/non-reversal period of said electronic watermark information is set as a period synchronous with a video synchronizing signal.

40. An information signal processing apparatus for processing an information signal wherein first additional information on an information signal is transmitted by reversal/non-reversal pattern consisting of a preset combination of a period in which electronic watermark information is superimposed on the information signal as it is and said period in which the electronic watermark information is reversed and superimposed on the information signal, and second additional information on said information signal is transmitted such that one of values of one-bit information is expressed by a period in which electronic watermark information is superimposed on said information signal as it is and another one of values of one-bit information is expressed by a period in which the electronic watermark information is reversed and superimposed on said information signal, characterized by comprising:

first electronic watermark information detection means for detecting said electronic watermark information superimposed in said reversal/non-reversal pattern on said information signal from said information signal output apparatus;

processing apparatus-side pattern generation means for generating said reversal/non-reversal pattern;

pattern discrimination means for discriminating said reversal/non-reversal pattern of said electronic watermark information superimposed on said information signal based on detection output from said first electronic watermark detection means and on said reversal/non-reversal pattern from said processing apparatus-side pattern generation means;

second electronic watermark information detection means for detecting the electronic watermark information for transmitting said second additional information; and second additional information detection means for discriminating the period in which the electronic watermark information for transmitting said second additional information superimposed on said information signal is superimposed as it is and the period in which the electronic watermark information is reversed and superimposed on said information signal based on detection output from said second additional information detection means, and for detecting said second additional information.

41. An information signal processing apparatus according to claim 40, characterized in that the electronic watermark information for transmitting said first additional information superimposed on said information signal and the electronic watermark information for transmitting said second additional information are spectrum spread signals formed by using different spread codes;

said first electronic watermark information detection means conducts de-spread using the spread code used for forming the electronic watermark information for transmitting said first additional information, and thereby detects the electronic watermark information for transmitting said first additional information; and said second electronic watermark information detection means conducts de-spread using the spread code used for forming the electronic watermark information for transmitting said second additional information, and thereby detects the electronic watermark information for transmitting said second additional information.

42. An information signal processing apparatus according to claim 40, characterized in that said second electronic watermark information detection means uses timing at which an entirety of or a preset part of said reversal/non-reversal pattern of said first additional information is discriminated by said pattern discrimination means, as synchronizing timing for detecting the electronic watermark information for transmitting said second additional information, and detects said electronic watermark information for transmitting said second additional information.

43. An information signal processing apparatus according to claim 40, characterized in that a reversal/non-reversal pattern of electronic watermark information suggesting that said second additional information is superimposed, is inserted into said information signal before the electronic watermark information for transmitting said second additional information is superimposed on said information signal;

said information signal processing apparatus comprises:

suggestion electronic watermark information detection means for detecting said electronic watermark information for suggestion superimposed in said suggestion reversal/non-reversal pattern on said information signal;

processing apparatus-side suggestion pattern generation means for generating said suggestion reversal/non-reversal pattern; and pattern discrimination means for suggestion for discriminating said suggestion reversal/non-reversal pattern of the electronic watermark information inserted into said information signal based on the detection output from said suggestion electronic watermark information detection means and said suggestion reversal/non-reversal pattern from said processing apparatus-side suggestion pattern generation means, and in that said second electronic watermark information detection means uses timing at which an entirety of or a preset part of the reversal/non-reversal pattern of the electronic watermark information suggesting that said second additional information is superimposed by said suggestion pattern discrimination means as synchronizing timing for detecting the electronic watermark information for transmitting said second additional information, and detects said electronic watermark information for transmitting said second additional information.

44. An information signal processing apparatus according to claim 40, characterized in that a synchronizing signal for detecting said second additional information is contained in said second additional information;

said second electronic watermark information detection means uses said synchronizing signal contained in said second additional information, and detects said electronic watermark information for transmitting said second additional information.

* * * * *